United States Patent [19]
Tanaka et al.

[11] Patent Number: 5,991,439
[45] Date of Patent: Nov. 23, 1999

[54] HAND-WRITTEN CHARACTER RECOGNITION APPARATUS AND FACSIMILE APPARATUS

[75] Inventors: Junji Tanaka, Tottori-ken; Takatoshi Yoshikawa; Hiromitsu Kawajiri, both of Gifu-ken; Hideko Taniguchi; Shigetoshi Matsubara, both of Tottori-ken, all of Japan

[73] Assignees: Sanyo Electric Co., Ltd, Osaka; Tottori Sanyo Electric Co., Ltd., Tottori, both of Japan

[21] Appl. No.: 08/648,299

[22] Filed: May 15, 1996

[30] Foreign Application Priority Data

| May 15, 1995 | [JP] | Japan | 7-141255 |
| Mar. 19, 1996 | [JP] | Japan | 8-101818 |
| Apr. 26, 1996 | [JP] | Japan | 8-106561 |

[51] Int. Cl.$^6$ ..................................................... G06K 9/34
[52] U.S. Cl. ..................... 382/178; 382/179; 382/186; 382/317; 358/402; 358/434; 358/468
[58] Field of Search ............................. 382/177, 174, 382/178, 179, 187, 209, 176, 309, 317, 186; 358/402, 440, 442, 438, 468

[56] References Cited

U.S. PATENT DOCUMENTS

| 4,562,594 | 12/1985 | Bednar et al. | 382/174 |
| 4,635,290 | 1/1987 | Tsuji et al. | 382/174 |
| 4,731,861 | 3/1988 | Blanton et al. | 382/174 |
| 5,003,614 | 3/1991 | Tanaka et al. | 382/171 |
| 5,033,097 | 7/1991 | Nakamura | 382/174 |
| 5,046,114 | 9/1991 | Zobel | 382/171 |
| 5,099,340 | 3/1992 | Kamada et al. | 358/403 |
| 5,123,062 | 6/1992 | Sangu | 382/174 |
| 5,138,668 | 8/1992 | Abe | 382/177 |
| 5,247,591 | 9/1993 | Baran | 382/179 |
| 5,321,768 | 6/1994 | Fenrich et al. | 382/178 |
| 5,335,289 | 8/1994 | Abdelazim | 382/177 |
| 5,581,366 | 12/1996 | Merchant et al. | 358/400 |
| 5,663,808 | 9/1997 | Park | 358/440 |

FOREIGN PATENT DOCUMENTS

| 0 054 439 | 6/1982 | European Pat. Off. | G06K 9/34 |
| 0 138 445 | 4/1985 | European Pat. Off. | G06K 9/34 |
| 2-50567 | 2/1990 | Japan | H04N 1/32 |
| 2-113665 | 4/1990 | Japan | H04N 1/32 |
| 5-344248 | 12/1993 | Japan . | |
| 7-79311 | 3/1995 | Japan | H04N 1/00 |
| 2 218 839 | 11/1989 | United Kingdom | G06K 9/34 |

OTHER PUBLICATIONS

Raytheon Co.'s Application No. 17, Dec. 9, 1993, R.P.C.

*Primary Examiner*—Jon Chang
*Attorney, Agent, or Firm*—Darby & Darby

[57] ABSTRACT

A hand-written character recognition apparatus includes a CIS, and image data of each character of addressing information hand-written on a transmission original, which is read by the CIS, is stored in a bit-mapped line buffer. A histogram of one direction, e.g. an X direction (main scanning direction) is produced on the basis of the image data, and the histogram is stored in the histogram buffer. A rough position of each of the characters is evaluated on the basis of the histogram, and a character width of each of the characters, preferably an average character width is evaluated with referring to the line buffer. Then, a blank portion having a size of 1.5 times or less the average character width is detected as a space between characters.

18 Claims, 47 Drawing Sheets

| BYTE DATA | BIT DATA | NUMBER OF DOTS |
|---|---|---|
| 00 | 0 0 0 0 0 0 0 0 | 0 |
| 01 | 0 0 0 0 0 0 0 1 | 1 |
| 02 | 0 0 0 0 0 0 1 0 | 1 |
| 03 | 0 0 0 0 0 0 1 1 | 2 |
| | | |
| FE | 1 1 1 1 1 1 1 0 | 7 |
| FF | 1 1 1 1 1 1 1 1 | 8 |

| AF | EF | NZF | CCF | PCNT | LCNT |
|----|----|-----|-----|------|------|
| BCNT | | | | XCNT | |
| MCNT | | | | YCNT | SUMT |

36a

| len | no | b_x_len |
|-----|----|---------|
| b_y_len | b_xy_len | b_x_mean |
| b_y_mean | b_xy_mean | w_mean |
| space_max | space_min | cut_size |
| edge_size | x_noise | y_noise |
| dx | dy | dxy |
| w_len | w_no | |
| xs1 | xs2 | ys1 |
| ys2 | xb2 | yb2 |
| slice_count | | |

| | |
|---|---|
| IMAGE BUFFER   image_buf | 38 |
| HISTOGRAM BUFFER   hst_buf | 40 |
| FIRST CHARACTER CUT-OUT BUFFER   cut_pos1 | 42 |
| SECOND CHARACTER CUT-OUT BUFFER   cut_pos2 | 44 |
| OBSCURATION BUFFER   bokashi_buf | |
| SLICE BUFFER   slice_buf | |
| SLICE LINK BUFFER   slice_link | |
| FIFO BUFFER   fifo_buf | |
| STACK BUFFER   stack_buf | |
| CIRCUMSCRIBED RECTANGULAR BUFFER   rect_pos | |
| EDGE BUFFER   edge_pos | |
| PROCESSED BUFFER   tail_pos | |

FIG. 13
(A)
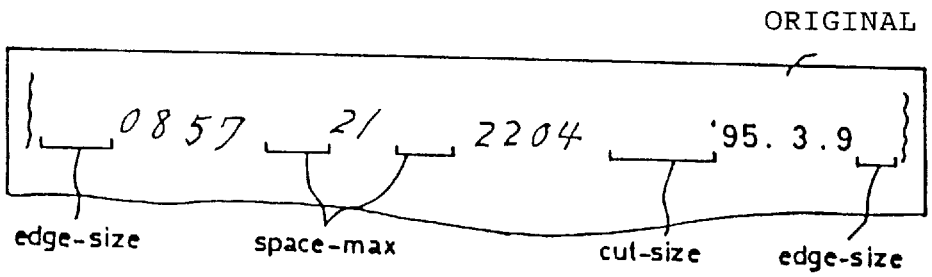
(B)
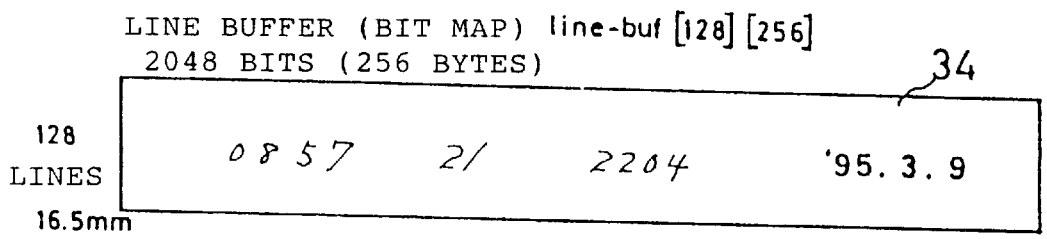
(C)
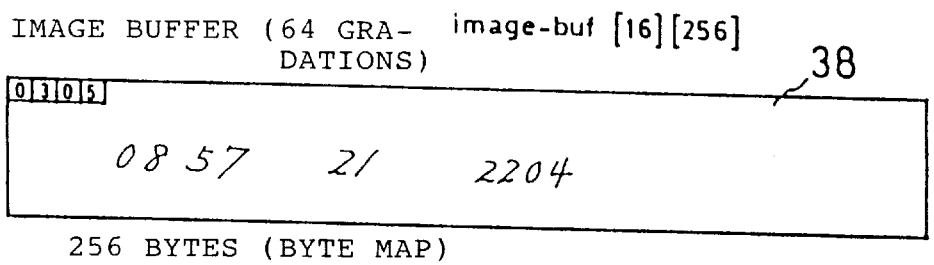
(D)
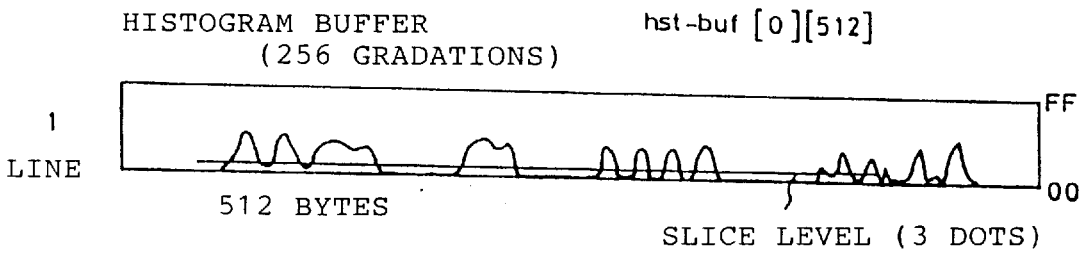
(E)
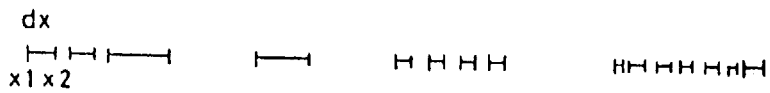

S=S1+S2

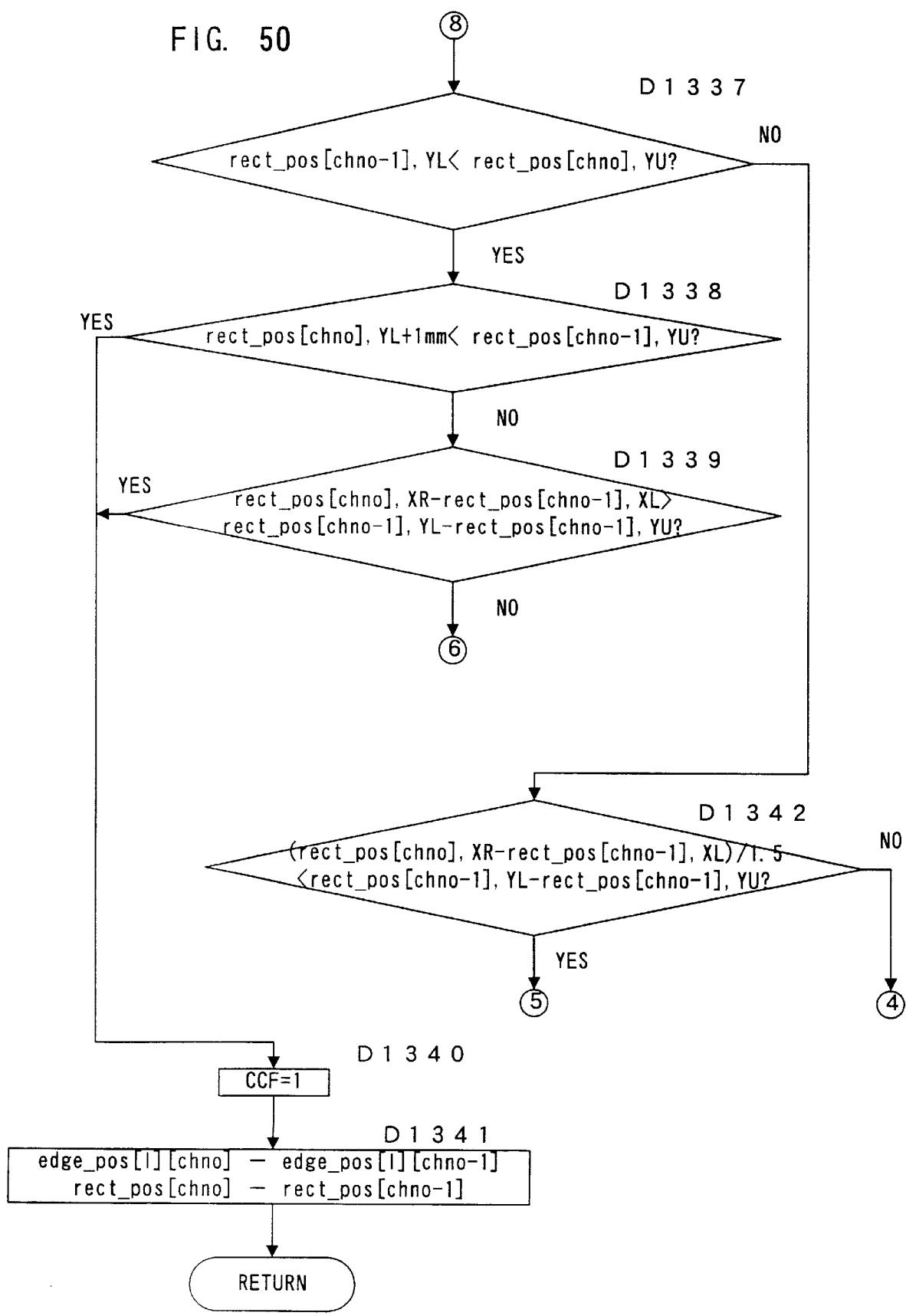

HAND-WRITTEN CHARACTER RECOGNITION APPARATUS AND FACSIMILE APPARATUS

BACKGROUND OF THE INVENTION

1. Field of the Invention

The present invention relates to a hand-written character recognition apparatus and a facsimile apparatus utilizing the recognition apparatus. More specifically, the present invention relates to a hand-written character recognition apparatus in a facsimile apparatus in which addressing information hand-written on a transmission original is read and a calling operation is performed on the basis of the addressing information as read.

2. Description of the Prior Art

In Japanese Patent Application Laying-Open No. 1-175363 [H04N 1/32] laid-open on Jul. 11, 1989, for example, there is disclosed a facsimile apparatus in which addressing information written on a transmission original is read and an automatic dialing operation is performed on the basis of the addressing information as read. In this prior art, a hand-writing space is formed at a predetermined position of the transmission original, and an addressing telephone number is hand-written in the hand-writing space, and the hand-written addressing telephone number is read by a character recognition portion.

In such an automatically dialing facsimile apparatus, it is necessary to correctly recognize characters of the hand-written addressing information so as to prevent an erroneous transmission. To this end, it is necessary to correctly cut-out each of the hand-written characters. However, in the above described prior art, a specific recognition method of the hand-written addressing information as well as a cut-out method of the characters are not disclosed.

On the other hand, in a case where the characters of the addressing information are hand-written on the transmission original, the characters are not always written by a user with an equal space between characters. Therefore, it is very important to correctly recognize whether or not a blank between the characters is the space between characters.

However, in any of prior arts, no method for correctly detecting the space between characters. Therefore, in most of the prior arts, as disclosed in, for example, Japanese Patent Publication No. 4-21914 [G06K 9/03] published on Apr. 14, 1993, and Japanese Patent Application Laying-Open No. 5-207256 [H04N 1/32] laid-open on Aug. 13, 1994, or Japanese Patent Application Laying-Open No. 6-105025 [H04N 1/00] laid-open on Apr. 25, 1995, discrete entry spaces for respective characters are formed in advance with constant intervals, and the characters of the addressing information hand-written in the entry spaces are cut-out. However, in the prior art in which the discrete entry spaces for the respective characters are designated in advance, it is troublesome for the user to hand-write the characters in the entry spaces, and therefore, such a kind of automatically dialing facsimile apparatus has not being put into practical use.

SUMMARY OF THE INVENTION

Therefore, a principal object of the present invention is to provide a facsimile apparatus capable of correctly recognizing the addressing information as well as the space between characters.

Another object of the present invention is to provide a hand-written character recognition apparatus capable of correctly cutting-out the hand-written characters.

A further object of the present invention is to provide a hand-written character recognition apparatus capable of correctly recognizing even complicated and superposed characters.

A still further object of the present invention is to provide a facsimile apparatus capable of correctly recognizing the hand-written characters.

The present invention is a hand-written character recognition apparatus which recognizes hand-written characters on the basis of image data obtained by reading the hand-written characters, comprising: a character width detection means (S4503) which detects a character width of each of the hand-written characters; and a space width detection means (S4511, S4514) which detects a space width between characters on the basis of the character width.

Image data of the respective characters which are of the hand-written addressing information on the transmission original and read by a CIS (Contact Image Sensor), for example, is stored in a line buffer means of a bit-map system, for example. A histogram producing means produces a histogram of one direction, e.g. an X direction (main scanning direction), and stores the same in a histogram buffer means. A rough position of each of the characters is evaluated on the basis of the histogram, and the character width, preferably an average character width of the characters is evaluated with referring to the line buffer means. Then, a blank portion having a size of 1.5 times or less than the average character width is detected as a space between characters.

In accordance with the present invention, since it is possible to surely detect the space between characters according to the character width, in comparison with the prior art in which the hand-written characters are entered with constant intervals, a freedom in entering the band-written characters can be increased. Furthermore, since the space between characters can be surely detected, there occurs no erroneous cut-out of the character.

In one aspect of the present invention, even if actually hand-written characters adjacent to each other are complicated, it is possible to cut-out such superposed characters with accuracy.

In this aspect, the present invention is a hand-written character recognition apparatus which recognizes hand-written characters on the basis of image data obtained by reading the hand-written characters, comprising: a character tracing means (D2–D10) which respectively traces a plurality of characters in a superposition area where the plurality of characters are superposed on each other; and a character processing means (D13) which connects or separates two characters to or from each other on the basis of a tracing result by the character tracing means.

Image data of the respective characters which are of the hand-written addressing information on the transmission original and read by a CIS (Contact Image Sensor), for example, is stored in a line buffer means of a bit-map system, for example. A histogram producing means produces a histogram of one direction, e.g. an X direction (main scanning direction), and stores the same in a histogram buffer means. A rough position of each of the characters is evaluated on the basis of the histogram, and the character width, preferably an average character width of the characters is evaluated with referring to the line buffer means. Then, a blank portion having a size of 1.5 times or less than the average character width is detected as a space between characters.

However, in the superposition area in which the plurality of characters are superposed on each other, the plurality of characters are respectively traced by the character tracing means, and on the basis of the tracing result, the character processing means connects or separates the two characters adjacent with each other in a vertical or column direction or a horizontal or row direction to or from each other.

At this time, if an obscuration buffer in which the image data is obscured with a unit of a plurality of dots, it is possible to rapidly perform such the character tracing.

In addition, in order to trace the characters, in an embodiment, a superposition of line segments in the obscuration buffer is detected, and by evaluating an external form of the character through the tracing of the superposition of the line segments, it is determined that the adjacent characters must be connected to each other or separated from each other.

In accordance with the present invention, it is possible to surely cut-out the respective characters even in the superposition area, and therefore, the erroneous recognition can be extremely effectively prevented. Therefore, if such the hand-written character recognition apparatus is utilized in the facsimile apparatus, it is possible to automatically perform a calling operation by reading the hand-written addressing information with accuracy.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing a storage area of an SRAM shown in FIG. 2;

FIG. 13 is an illustrative view showing an operation for evaluating a rough horizontal position on the basis of a histogram;

FIG. 43 to FIG. 50 are flowcharts showing an operation for connecting two characters.

DETAILED DESCRIPTION OF THE PREFERRED EMBODIMENTS

Figure 1:
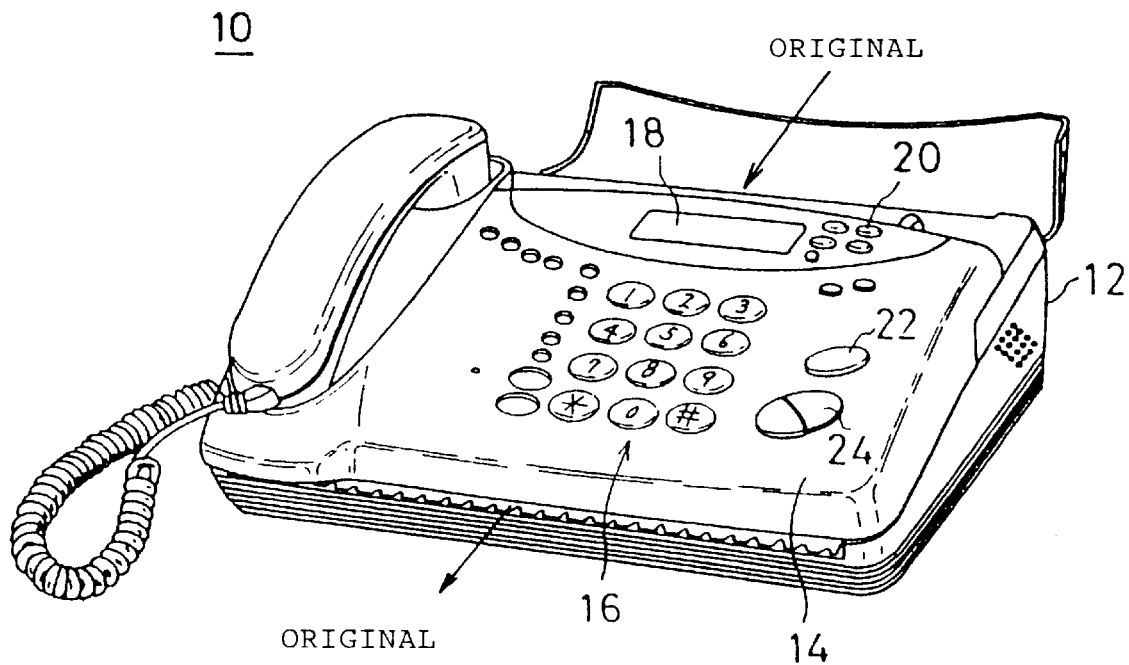
FIG. 1 is a perspective view showing one embodiment according to the present invention.
Figure 2:
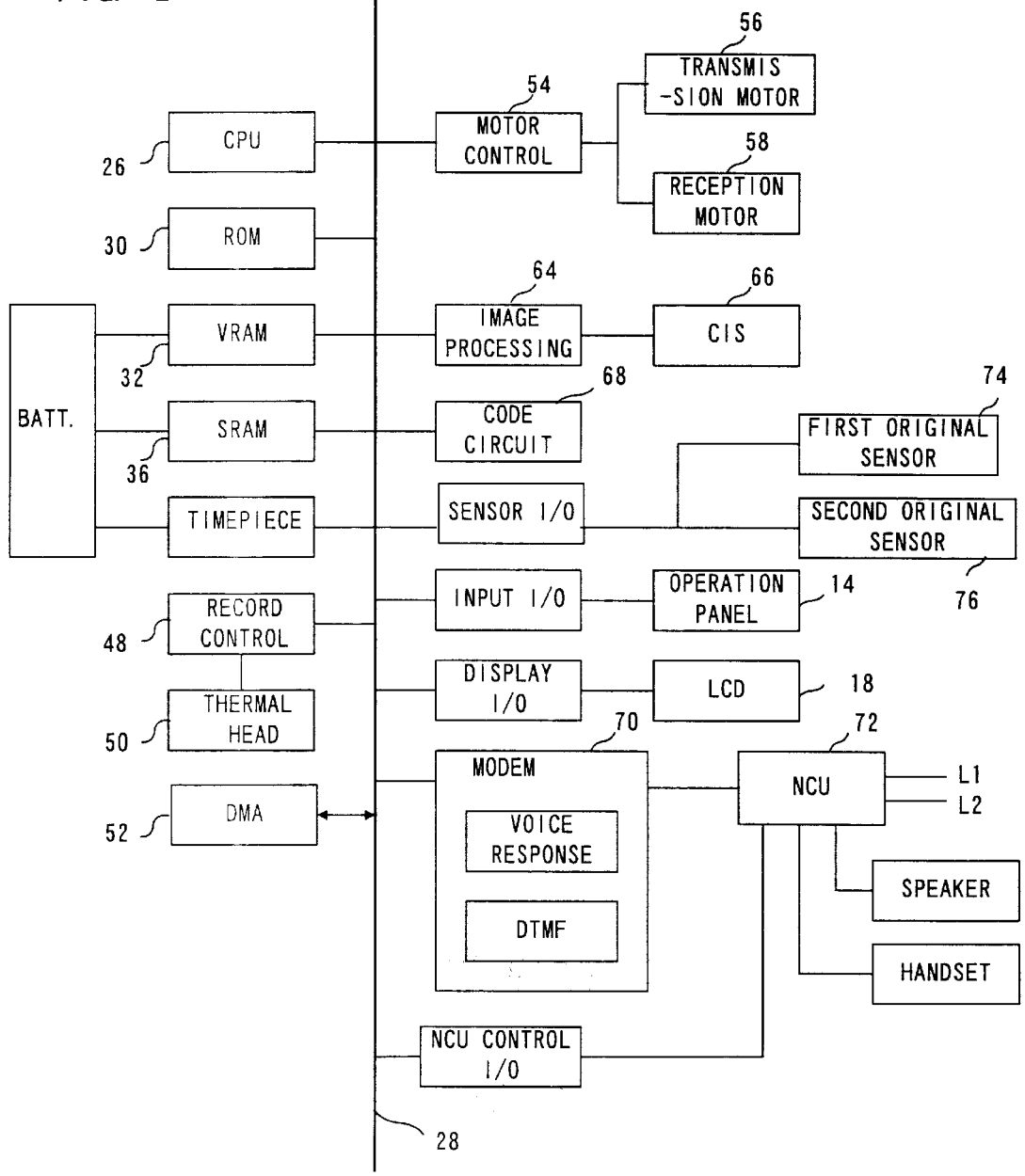
FIG. 2 is a block diagram showing whole structure of FIG. 1 embodiment.

A facsimile apparatus 10 of one embodiment according to the present invention shown in FIG. 1 includes a housing 12, and on an upper surface of the housing 12, there is formed with an operation panel 14. In the operation panel 14, various kinds of keys shown in detail in FIG. 2 are arranged. More specifically, on the operation panel 14, a ten key 16 including "0"–"9", "*" and "#" is provided, and the ten key 16 is utilized in manually entering addressing information. Above the ten key 16, a liquid crystal display (LCD) 18 is provided, by the LCD 18, messages for urging a user to enter various kinds of inputs or a message for notifying to the user an error are displayed. Of course, on the LCD 18, addressing information recognized in an addressing information recognition operation is also displayed. In the vicinity of the LCD 18, there is provided with a quality selection key 20 which selects one of a normal transmission mode, a fine transmission mode and a half tone transmission mode.

Figure 11:
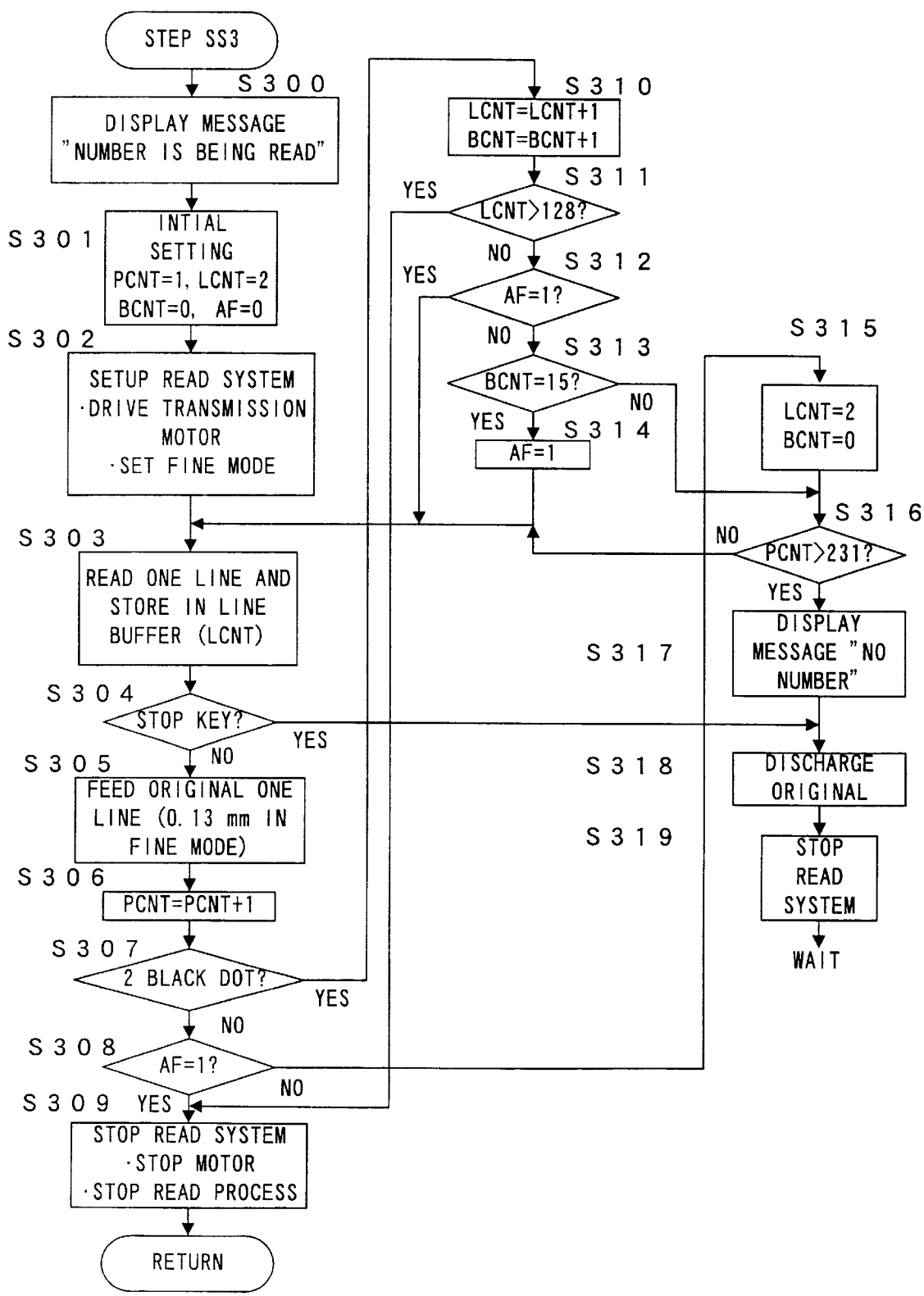
FIG. 11 is a flowchart showing operations for checking absence or presence of addressing inforrnation and for fetching image data of the addressing information in FIG. 10.

A stop/clear key 22 is further provided on the operation panel 14, the stop/clear key 22 plays a function for stopping an operation being executed, a function for clearing a number inputted in a registration mode (one touch registration or a registration of a name/number of own facsimile apparatus), and a function for releasing its registration mode. Furthermore, the stop/clear key 22 is operated in a recognition operation of the addressing information as described later. For example, after the original is inserted as shown in FIG. 11 if the stop/clear key 22 is operated until an operation for recognizing the addressing information is started, the original is forcedly discharged. Furthermore, during a time that the addressing information of the original as inserted is recognized (message of "NUMBER IS BEING READ" is displayed on the LCD 18), if the stop/clear key 22 is operated, the recognition operation of the addressing information is suspended, and a recognition result is canceled. However, in such a case, image data read by a CIS (Contact Image Sensor) 66 (described later) is held in a line buffer 34 (described later).

A start key 24 is operated at a time that an operation is to be started. For example, in a state where a handset shown in FIG. 1 is brought into an off-hook state, if the start key 24 is operated, a transmission operation is started in response to the insertion of the original, or a reception operation is started when no original is inserted. Furthermore, at a time of an on-book state of the handset, if the addressing information is manually inputted, a dialing operation is started in response to the operation of the start key 24. Furthermore, after the addressing information hand-written on the transmission original is recognized, if the start key 24 is operated, the dialing operation, i. e. calling operation according to the addressing information as recognized is started.

Figures 3, 4:
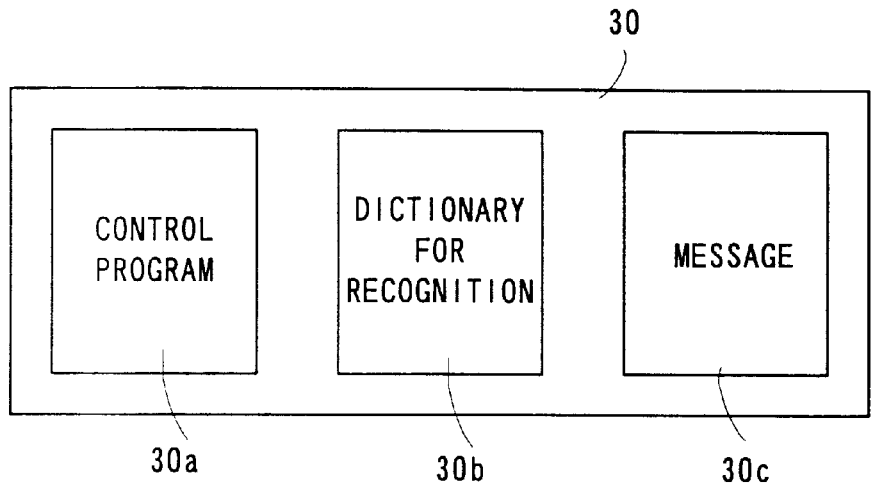
FIG. 3 is an illustrative view showing a storage area of a ROM shown in FIG. 2.
FIG. 4 is an illustrative view showing a bit mumber detection table included in a dictionary for recognition area shown in FIG. 3.

FIG. 2 is a block diagram of FIG. 1 embodiment including a single-chip facsimile processor such as "TC35167F" manufactured by Toshiba, for example. A CPU 26 and other components are coupled to each other through a bus 28. As shown in FIG. 3, a ROM 30 includes a control program area 30a, a recognition dictionary area 30b and a message data area 30c wherein data for message (an audible message or a visible message), i.e. message data. The control program area 30a includes a control program according to flowcharts described later. The recognition dictionary area 30b is a dictionary for recognizing the hand-written addressing information, and includes vectors and a plurality of neural networks for a pattern matching. By selecting a neural network according to a vector of the pattern matching, the addressing information hand-written on the transmission original can be recognized.

The recognition dictionary area 30b further includes a bit number detection table 30d as shown in FIG. 4. The bit number detection table 30d is a table indicating the number of the black dots in 1 byte, and referred to in detecting the number of the black dots within a range of 8×8 dots in the line buffer 34 or the image buffer 38 at a time that rough image data to be stored in an image buffer 38 (described later) is produced, or a histogram is to be produced in a histogram buffer 40 (described later). In a method that the bit number detection table 30d is utilized in detecting the number of the black dots within the range of 8×8 dots, for example, in comparison with a normal method that the number of the black dots is counted while the image data in the image buffer 34 is shifted, it is possible to very rapidly (8 times, for example) detect the number of the black dots. In addition, a variable for the bit number detection table is "bit-pat-tbl".

A VRAM 32 includes the line buffer 34 of a bit-map system (accessible bit by bit) of 32.25 K byte (=129×2048 bits), for example. The line buffer 34 stores the image data obtained by reading the addressing information hand-written on the original by the CIS 66. In addition, a variable for the line buffer 34 is "line-buf[X][Y]".

On the other hand, the SRAM 36 is a memory of a byte-map system (accessible byte by byte), and includes a flag area, a counter area, a variable area, and etc. as shown in FIG. 6.

A valid image area flag AF is a flag showing whether or not an area of the original being presently read-by the CIS 66 is an area in which the addressing information is hand-written, and AF="0" indicates an area other than the addressing information area, and AF="1" indicates the addressing information area. An error flag EF indicates that a rejected character occurs at a time that the addressing information is recognized or that instruction for suspending the recognition occurs, and EF="0" indicates that both of the occurrence of the rejected character and the occurrence of the instruction for suspending the recognition do not exist, and EF="3" indicates that the occurrence of the rejected character or the occurrence of the instruction for suspending the recognition exists.

An original feed counter PCNT is a counter for counting the number of the lines in the sub-scanning direction of the original, which are read by the CIS 66 for recognizing the addressing information. A write line counter LCNT is a write pointer for writing the image data read by the CIS 66 for recognizing the addressing information into the line buffer 34. A valid line counter BCNT is a counter for counting the number of times that lines in each of which there are two or more successive black dots in the main scanning direction (valid line) successively appear.

An X counter XCNT is a counter for counting an X direction position, i. e. a column position in the line buffer 34, and a Y counter YCNT is a counter for counting a Y direction position, i. e. a line position in the line buffer 34. A character number counter MCNT is a counter for counting the number of the characters in cutting-out the respective characters of the addressing information, and there is a case where two character number counters MCNT1 and MCNT2 may be used. Furthermore, a total dot number counter SUM is a counter for counting the number of the black dots included in a given column or line in the line buffer 34, and utilized at a time that an image buffer 38 and a histogram buffer 40 (described later) are produced.

Now, respective variables stored in the variable register area 36a of the SRAM 36 will be described. A variable "len" indicates a whole length of the characters to be cut-out, and the number of the characters cut-out is indicated by a variable "no". Variables indicating a whole length of a portion of the characters hand-written on the original are three of "b-x-len", "b-y-len" and "b-xy-len", and the variable "b-x-len" indicates a total length of the character portion in the X direction (row direction or horizontal direction or main scanning direction), and the variable "b-y-len" indicates a whole length of the character portion in the Y direction (column direction or vertical direction or sub-scanning direction) and a product value thereof is indicated by the variables "b-xy-len". Then, average values of the variables "b-x-len", "b-y-len" and "b-xy-len" are indicated by variables "b-x-mean", "b-y-mean" and "b-xy-mean". An average value of a size of a blank portion is represented by a variable "w-mean", and a size of the space between characters is indicated by "space-max". Furthermore, a size of a character break, that is, a separation width of a case one character is separately hand-written is indicated by a variable "space-min". A size of a punctuation between a date and the character is represented by a variable "cut-size". Furthermore, a variable "edge-size" indicates a size of a width between a left or right end (edge) of the transmission original and the hand-written character. Then, a size of a noise for determining the image data having a size smaller than that of the hand-written character as noise or dust is indicated by variables "x-noise" and "y-noise", and the former indicates the X direction, and the latter indicates the Y direction. Furthermore, variables "dx" and "dy" indicates length of the character in the X direction and the length of the character of the Y direction, and a variable "dxy" indicates an area of the character or the blank. A length of the blank is indicated by a variable "w-len" and the number of the spaces between characters are applied by a variable "w-no". Then, a variable "xs" indicates a length of the blank portion in the X direction.

In addition, all variables necessary for the processing described later are held in the register area 36a in the SRAM 36 although not described especially.

The SRAM 36 further includes the image buffer 38 and the histogram buffer 40 necessary for cutting-ut respective characters of the hand-written addressing information as shown in FIG. 6. The image buffer 38 is formed as an area of 256 bytes×16 lines, and stores the image data from the line buffer 34 in a byte-map fashion. More specifically, as described later, the image buffer 38 holds byte-map data (64 gradations) in which the image data of the line buffer 34 is obscured with a size of 8×8 dots, i.e. rough image data, and utilized for evaluating a rough cut-out position of the hand-written character. A variable for the image buffer 38 is "image-buf[Y][X]". The histogram buffer 40 has a storage capacity of 512 bytes×1 line, and holds histogram data (256 gradations) obtained by adding the columns of the bit image data in the line buffer 34 to each other at every 4 bits. The histogram buffer 40 is utilized for evaluating a rough cut-out position (X direction) of the hand-written character. A variable for the histogram buffer buffer 40 is "hst-buf[512]".

Figure 7:
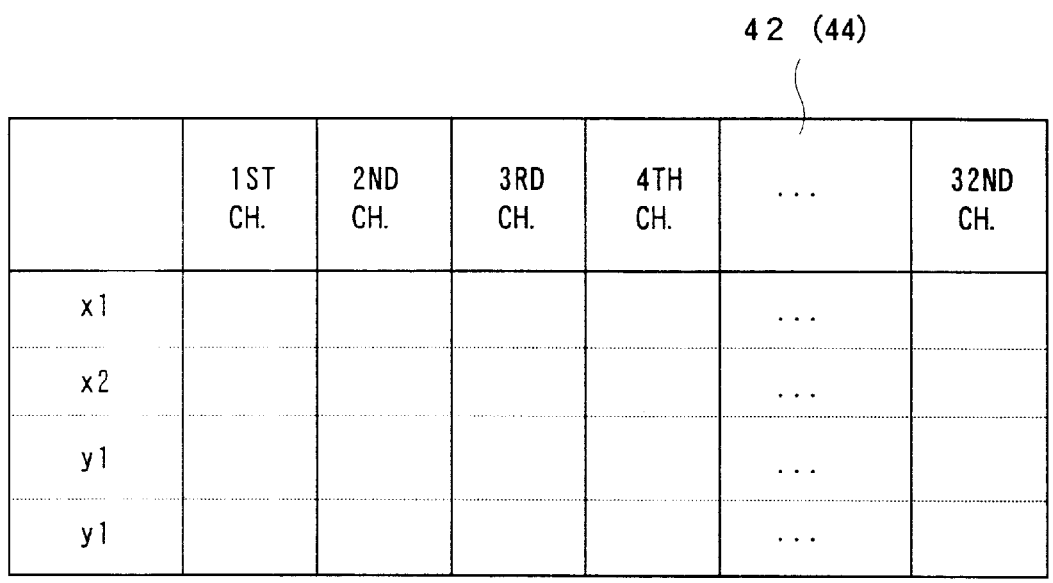
FIG. 7 is an illustrative view showing a first character cut-out buffer (a second character cut-out buffer) shown in FIG. 6.
Figure 8:
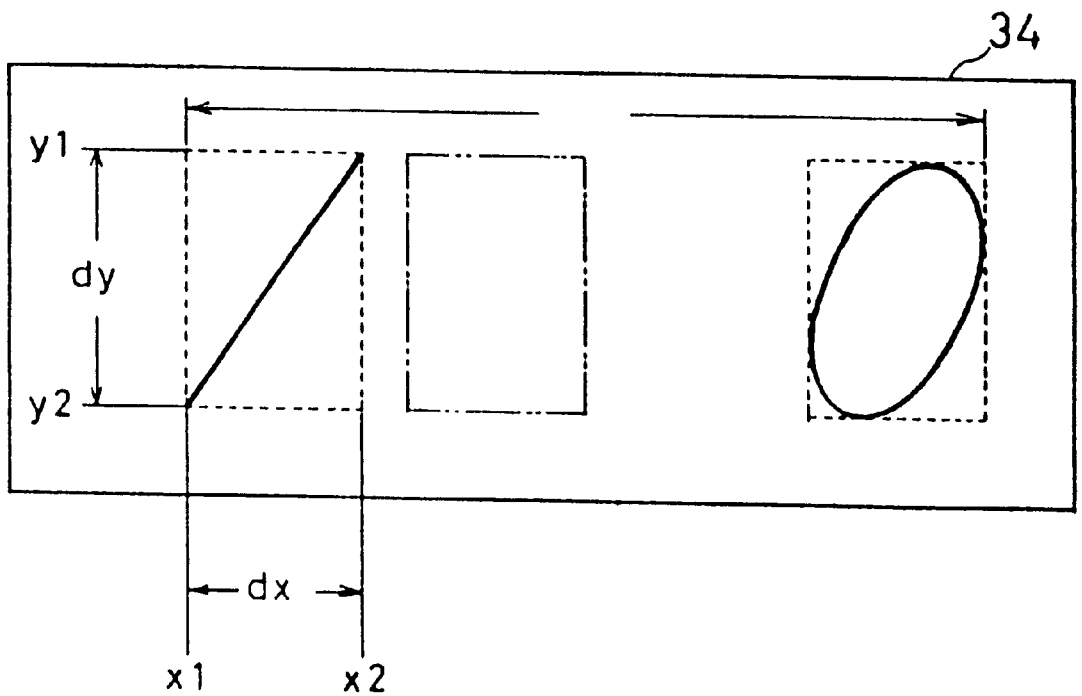
FIG. 8 is an illustrative view showing respective positions (areas) of image data in the line buffer.

The SRAM 36 also includes a first character cut-out buffer 42 and a second character cut-out buffer 44. Each of the first character table 42 and the second character table 44 has a storage capacity of 10×32 byte as shown in FIG. 7, a and holds data of cut-out positions for 32 characters (indicated by the character number "no"). The first character cut-out buffer 42 holds rough character cut-out positions obtained by referring to the image buffer 38, and the second character cut-out buffer 44 holds character cut-out positions finally calculated in detail. The second character cut-out buffer 44 holds data of the detailed cut-out positions of the characters, that is, a left end x1, a right end x2, an upper end y1 and a lower end y2 of a circumscribed rectangular of each of the characters shown by a dotted line in FIG. 8.

Respective variables for the character cut-out buffers 42 and 44 are "cut-pos1[no]" and "cut-pos2[no]". In the same manner, third and fourth character cut-out buffers may be utilized. In such a case, variables of "cut-pos3[no]" and "cut-pos4[no]" are utilized. However, by alternately utilizing two character cut-out buffers, the first to fourth cut-out buffers may be formed.

Returning back to FIG. 2, a record control circuit 48 is a circuit for printing-out the data on the facsimile paper in a confirmation print operation, a facsimile reception operation or a copying operation, and includes a thermal head driver for thermal head 50. A DMA circuit 50 is a circuit for controlling a direct memory access operation by which the data is read from the line buffer 34 or the data is written in the line buffer 34 without a control of the CPU 26.

A motor control circuit 54 controls a transmission motor 56 and a reception motor 58. The transmission motor 56 and the reception motor 58 are stepping motors. The transmission motor 56 drives an original feed roller 60 and a pressure roller 62 shown in FIG. 9. The reception motor 58 feeds the facsimile paper or recording paper (not shown). An image processing circuit 64 includes a half tone processing circuit which receives the bit image data outputted from the CIS 66 as "1" or "0". In addition, in the half tone processing circuit, a slice level of the CIS 66 is changed according to a dither method, for example.

A code circuit 68 converts the data of one line from the CIS 66 into a modified Haffmann code which is then applied to the SRAM 36. Accordingly, in the SRAM 36, the MH code of the data for one line from the CIS 66 is stored for each line. Then, the MH code to which a fill code is added by the CPU 26 is supplied to a modem 70 in a FIFO system. The modem 70 applies a transmission signal to a NCU (Network Control Circuit) 72 and receives a reception signal from the NCU 72.

Figure 9:
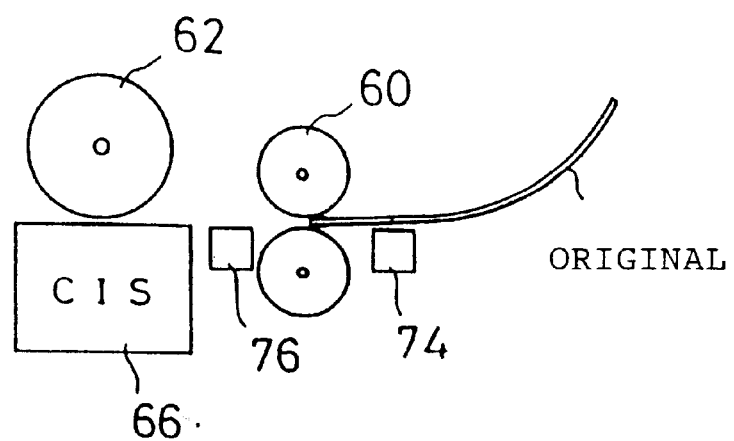
FIG. 9 is an illustrative view showing a fact that an original is read by a CIS in FIG. 1 embodiment.

In addition, a first original sensor 74 and ascond original sensor 76 are arranged at positions sandwiching the original feed roller 60 as shown in FIG. 9. The first original sensor 74 detects a fact that the original is fed to a position of the original feed roller 60, i.e. presence of the original. The second original sensor 76 detects a fact that the original is fed to a position of the CIS 66, that is, a fact that the original reaches a read position.

Figure 10:
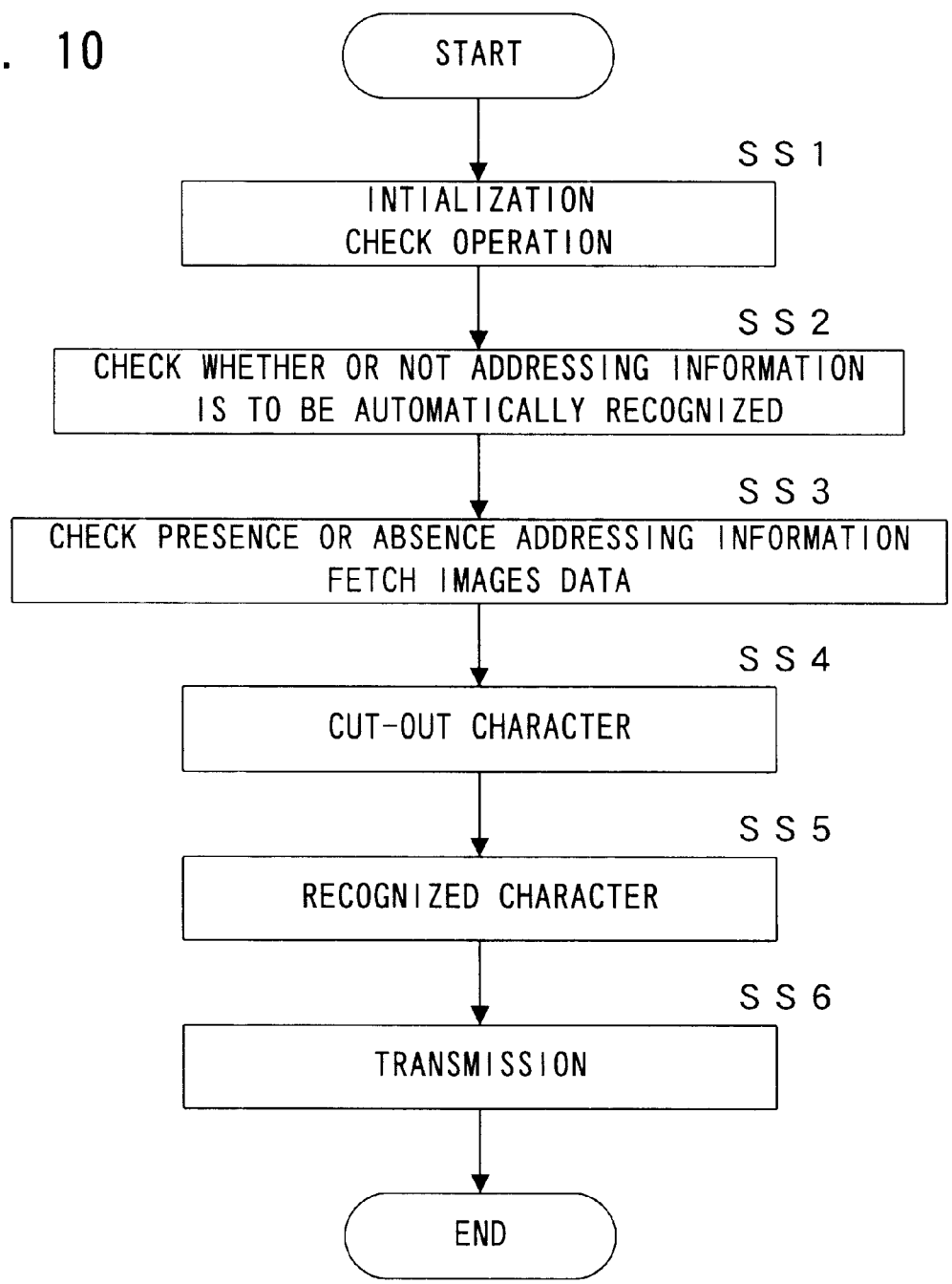
FIG. 10 is a schematic flowchart showing a whole operation of the embodiment.

FIG. 10 is a flowchart showing a schematic operation of the facsimile apparatus 10. In a first step SS1, the CPU 26 (FIG. 2) executes initialization, and checks operations of the respective keys on the operation panel 14, and perform the process according to an operated key. In a next step SS2, the CPU 26 checks whether or not the addressing information hand-written on the transmission original is to be automatically recognized. Therefore, in a case where it is determined that the addressing information is to be recognized in the step SS2, in a next step SS3, the presence or absence of the addressing information on the transmission original is checked, and when the addressing information is hand-written on the transmission original, the image data of the addressing information is fetched into the line buffer 34. Then, in a step SS4, pattern data of each character of the hand-written addressing information is cut-out, and in a step SS5, the character as cut-out is recognized. In a step SS6, a transmission process is executed according to the addressing information recognized in the step SS5.

Figure 5:
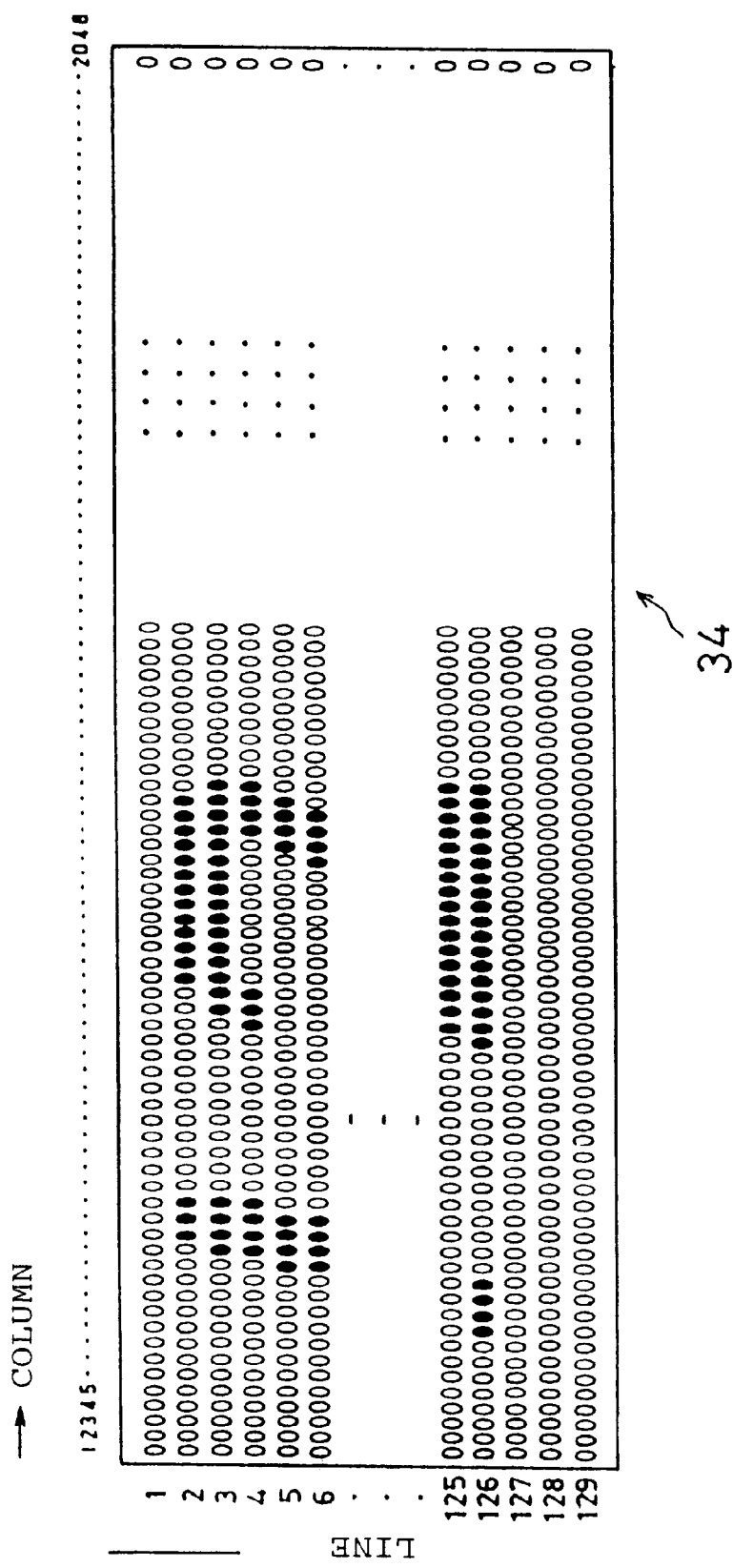
FIG. 5 is an illustrative view showing a line buffer included in a VRAM shown in FIG. 2.

After the step SS2 of FIG. 10, in a first step S300 in FIG. 11, the CPU 26 displays an message of "NUMBER IS BEING READ" on the LCD 18. In a next step S301., the CPU 26 initialize the counters and the variable registers in the VRAM 32. That is, the original feed counter PCNT is set at its initial value "1". The original feed counter PCNT is incremented at every timing that the original is fed by one line in the sub-scanning direction by the transmission motor 56, and therefore, with referring to the paper feed counter PCNT, it is possible to determine a position of the end line or the number of the lines in the area into which the addressing information is hand-written. In the write line counter LCNT, as an initial value, "2" is set. The write line counter LCNT is incremented at every timing that the data for one line is written into the line buffer 34 (FIG. 5). In addition, a reason why "2" is set in the write line counter LCNT as its initial value is that the image data obtained by reading the hand-written addressing information is prevented from being written in a first line of the line buffer 34 as shown in FIG. 5. Furthermore, with referring to the write line counter LCNT, a line position at which the image data lastly written in the line buffer 68 can be recognized.

Then, in the step S301, an initial value of "0" is set in the valid line counter BCNT. The valid line counter BCNT is utilized for noise processing. That is, if there are two or more successive black dots in one line, the line is deterrnined as a valid line at which the addressing information is hand-written. In contrast, if there are no successive black dots in one line, it is determined that only one black dot is due to dirt or dust of the original, and therefore, the line is not regarded as the valid line. Then, the valid line counter BCNT counts the number of successive valid lines. That is, if the valid lines do not succeed for 15 lines (in a case of the fine mode, equal to a length of 2 mm on the original), it is determined that valid addressing information is not written on the original. The valid line counter BCNT is utilized for such determination. That is, if a count value of the valid line counter BCNT does not exceed "15", the recognition of the hand-written addressing information is not performed. In other words, the characters of the addressing information having a size smaller than 2 mm in the sub-scanning direction of the original is removed from the target for recognition.

In the step S301, the valid image area flag AF is resel The flag AF is a flag representing whether or not the CIS 66 reads the area into which the addressing information is hand-written, and when the area is read, the flag AF is set as "1", and otherwise reset as "0".

In a next step S302 in FIG. 11, the CPU 26 sets-up a read system including the CIS 66 and the transmission motor 56. More specifically, in the step S302, the CPU 26 drives the transmission motor 56 by applying the order signal to the motor control circuit 54, and sets the CIS 66 and the image processing circuit 64 in the fine mode. That is, in a case where the hand-written addressing information is to be recognized, the fine mode is forcedly set in the step S302 irrespective which mode is set by the operator with utilizing the image quality selection key 20.

Then, in a step S303, the image data from the CIS 66 is written in the line buffer 34 at a line designated by the write line counter LCNT. If the first line, the image data from the CIS 66 will be written in the second line of the line buffer 34. In addition, the writing of the image data to the line buffer 34 in the step S303 is actually executed according to the DMA, and therefore, the CPU 26 may designate the address of the line buffer 34 and a data length of the image data to the DMA circuit 52 (FIG. 2) only. Thus, the image data for one line from the CIS 66 is written in the line buffer 34.

In a succeeding step S304, the CPU 26 determines whether or not the stop/clear key 22 (FIG. 1) is operated. If the stop/clear key 22 is operated at this stage, it means the cases (1) that the operator intends to copy the original, but the reading operation of the addressing information has been started, or (2) that the original is not fed normally, and therefore, in response to the operation of the stop/clear key 22, the original is discharged. Therefore, in a case where "YES" is determined in the step S304, the process proceeds to a step S318 wherein the original is discharged.

If "NO" is determined in the step S304, the CPU 26 feeds the original by one line (approximately 0.13 mm) at the fine mode by driving the transmission motor 56 in a step S305. Then, in a step S306, the original feed counter DCNT is incremented.

In a succeeding step S307, it is determined whether or not there are two or more successive black dots in one line on the basis of the image data stored in the line buffer 34 at the previous step S303, that is, it is determined whether or not the one line previously read is the valid line. Specifically, the CPU 26 reads the image data of 200 byte (approximately 200 mm on the original) from the 40-th column to the 2048-th column of the line buffer 34 except the data first 5 byte (approximately 5 mm on the original) from the line buffer 34. In addition, a reason why the image data of the first 5 byte is not read from the line buffer 34 is that there is a possibility that an edge of the original is detected within such a range, and therefore, such the possibility is to be avoided.

Then, the CPU 26 fetches the image data of 200 byte read from the line buffer 34 into an accumulator (not shown). At this time, one byte is first read and the succession of the black dots is determined with utilizing 9 bits in total of the image data of the one byte and the most significant bit of the image data of the next byte. That is, if the succession of the black dots is determined for each byte, even if the least significant bit of the preceding byte and the most significant bit of the succeeding byte are successively black dots, there is a possibility that it can not determine that the black dots are successive. Therefore, the succession of the black dots is determined with utilizing the 9 bits in total including the most significant bit of the image data of the next byte. Specifically, the CPU 26 determines whether or not there are successive "1" of two or more bits by checking a content of the accumulator. Thus, in the step S307, the CPU 26 determines whether or not the image data previously read in the line buffer 34 is the valid line.

If "NO" is deternined in the step S307, in a step S308, the CPU 26 determines whether or not the valid image area flag AF is set. If the flag AF has been set, in a next step S309, the read system is stopped, and thereafter, the process proceeds to the step SS4 of FIG. 10, i. e. the cut-out process.

If "YES" is determined in the previous step S307, that is, if it is determined that the image data of one line stored in the line buffer 34 in the step S303 is the valid line, in a step S310, the CPU 26 increments the write line counter LCNT and the valid line counter BCNT.

Then, in a next step S311, the CPU 26 determines whether or not the count value of the write line counter exceeds "128". That is, in the step S311, it is determined whether or not the image data is written in all of the 128 lines of the line buffer 34 shown in FIG. 5. Therefore, until the line buffer 34 is filled, "NO" is determined in the step S311, and the process proceeds to a step S312.

In the step S312, it is determined whether $_3$or not the valid image area flag AF is set. If the valid line is detected in the previous stp S307, it means that there is the valid image area (writing area of the addressing information), and therefore, in the step S312, it is determined that the flag AF is set. If "NO" is determined in the step S312, in a next step S313, the CPU 26 determines whether or not the count value of the valid line counter BCNT reaches "15". That is, in the step S313, the CPU 26 determines whether or not there are valid lines for successive 15 lines. Then, when "YES" is determined in the step S313, the valid image area flag AF is first set (step S314). As described above, since the character of the addressing information having a size smaller than 2 mm on the original is not to be recognized, only a time that the number of the valid lines exceeds 15 lines the valid image area flag AF is set.

If "NO" is determined in the previous step S308, the process proceeds to a step S315 wherein the CPU 26 sets an initial value of "2" in the write line counter LCNT, and clears the valid line counter BCNT. Thereafter, as similar to a case where "NO" is determined in the step S313, the process proceeds to a next step S316. In the step S316, the CPU 26 determines whether or not the count value of the original feed counter PCNT exceeds "231". That is, in the step S316, it is determined whether or not the original is fed more than 30 mm (=231/7.7). This is based on the assumption that the upper end of the character of the hand-written addressing information exists within 30 mm from an upper end of the original. Therefore, by changing "231" in this step S316, the recognition area of the hand-written addressing information can be enlarged or reduced. If "YES" is determined in the step S316, it means that the character of the addressing information is not hand-written within the range of 30 mm from the upper end of the original. Therefore, in this case, in a step S317, displays the message such as "NO NUMBER" on the LCD 18. Thereafter, in a step S318, the original is discharged by driving the transmission motor 54, and in a step S319, the read system is stopped as similar to the step S309.

In addition, a reason why the write line counter LCNT and the valid line counter BCNT are initialized in the step S315 is that the valid line is not detected in the step S307 and the valid image area flag AF is not set in the step S308. That is, at a time that a white line occurs before the number of the valid lines becomes "15", the counters LCNT and BCNT are initialized.

Furthermore, if it is detected that the line buffer 34 is filled in the previous step S311, the reading system is stopped by the CPU 26 in the previous step S309.

Figure 12:
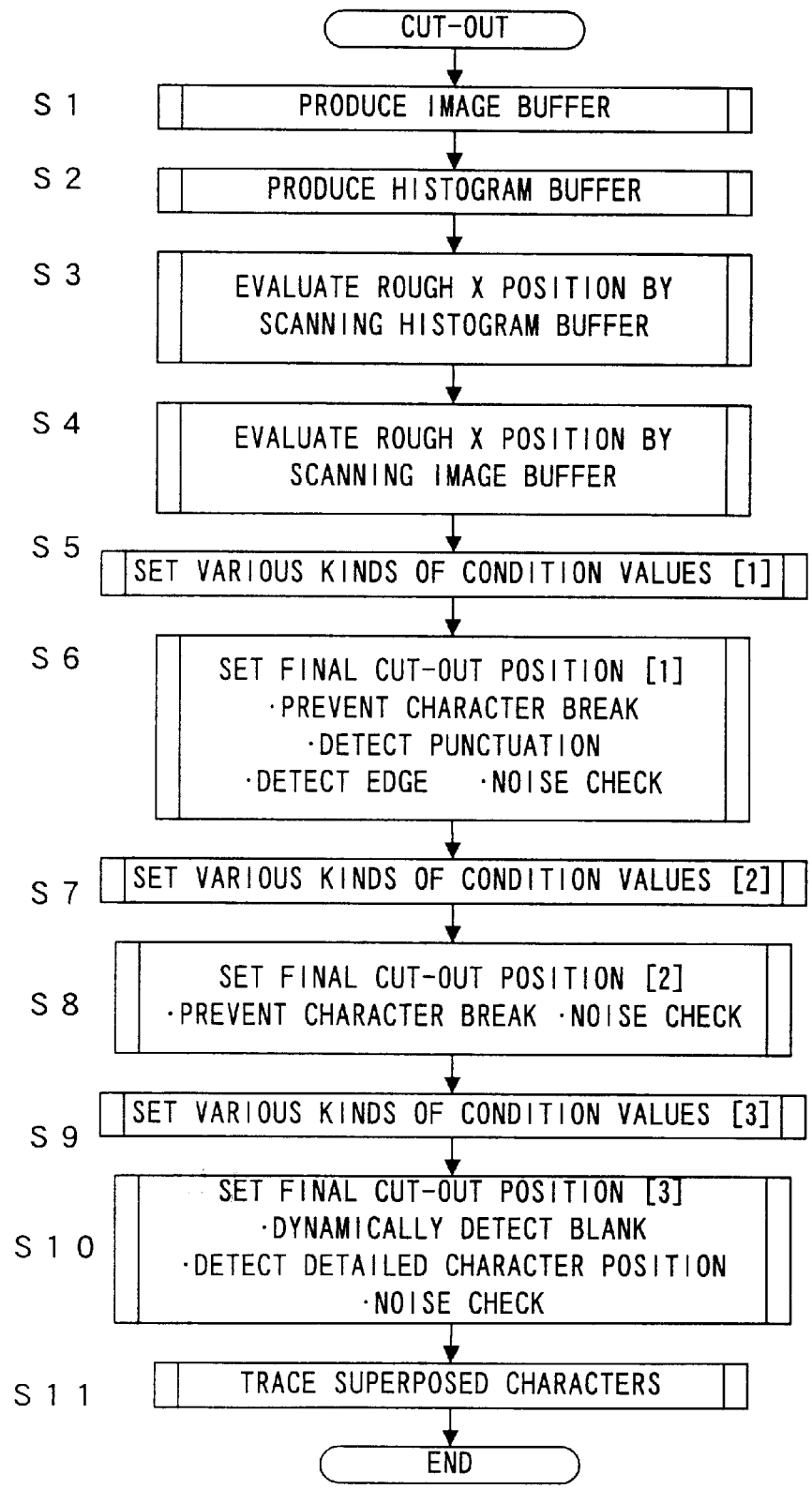
FIG. 12 is a flowchart showing a schematic operation of a character cut-out process in FIG. 10.

If the previous step S309 is executed, it means that the image data of the hand-written addressing information is stored in the line buffer 34 in a recognizable manner, and in this case, the process proceeds to the step SS4 shown in FIG. 10, and therefore, each of the characters hand-written as the addressing information is cut-out. That is, in the step SS4, respective step S1 to S11 shown in FIG. 12 are executed in the step SS4.

In addition, in a case where the addressing telephone number and the date are hand-written on the original as shown in FIG. 13(A), the respective variables "edge-size", "space-max" and "cut-size" described above are as shown in FIG. 13(A). In this case, as shown in FIG. 13(B), the image data of the addressing telephone number and the date are taken into the line buffer 34. In a step S41, the image data of the line buffer 34 is written in the image buffer 38 in a byte-map fashion so as to produce the image buffer.

Figure 14:
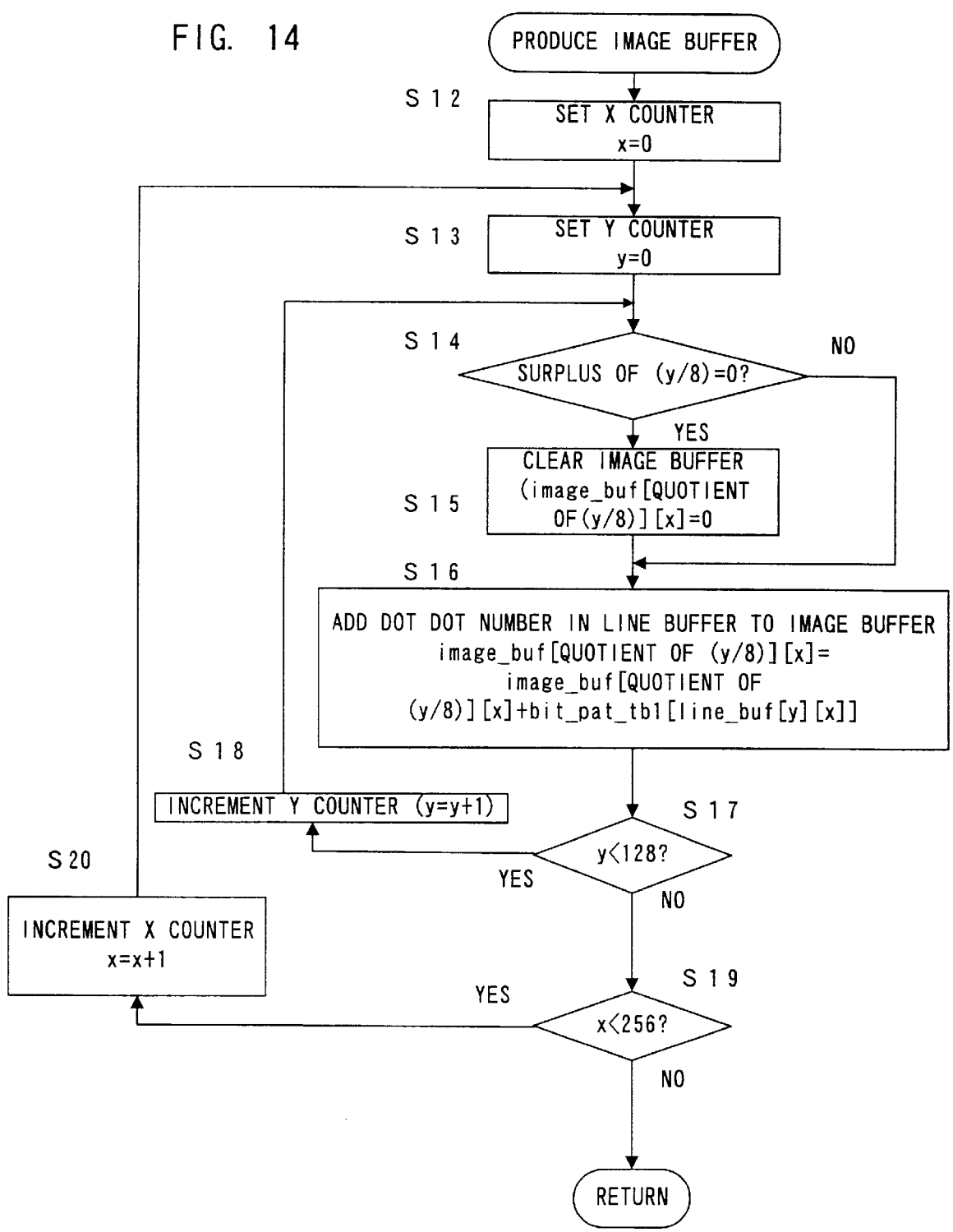
FIG. 14 and FIG. 15 are flowcharts showing an operation for producing an image buffer shown in FIG. 12.

In order to produce the image buffer, specifically, a count value x of the X counter is made "0" in a step S11 of FIG. 14. That is, the X counter is cleared. In a next step S12, a count value y of the Y counter is also made "0". That is, the Y counter is cleared.

Then, in a step S13, the CPU 26 determines whether or not the data for 8 lines of the line buffer 34 is fetched because the image buffer 38 is a memory of a byte-map fashion. That is, in the step S13, the CPU 26 determines whether or not a surplus of "y/8" becomes "0". Therefore, if "YES" is determined in the step S13, in a step S14, the CPU 26 clears a corresponding area of the image buffer 38, i.e. [quotient of (y/8)][x]. Furthermore, if "NO" is determined in the step S13, in a next step S15, the CPU 26 adds the number of the black dots within the X byte in the Y line of the line buffer 34 to the corresponding area of the image buffer 38, i.e. image-buf[quotient of (y/8)][x] with referring to the bit number detection table 30d. That is, in the step S15, the CPU 26 writes the number of the black dots for each byte into a corresponding byte area of the image buffer 38 with referring to the dot number detection table 30d of FIG. 4.

In a next step S16, the CPU 26 determines whether or not the count value y of the Y counter exceeds "128" because the number of the lines of the line buffer 34 is "128" as described above. If "YES" is determined in the step S16, in a next step S17, the Y counter is incremented (y+1), and then, the process proceeds to the step S13 again. That is, until the count value of the Y counter becomes "128", the steps S13 to S16 are repeatedly executed, and therefore, the number of the black dots in the line buffer 34 obtained by referring to the bit number detection table 30d is written in the image buffer 38.

Then, in a step S18, the CPU 26 determines whether or not the count value x of the X counter exceeds "256" because the byte number in one line in the line buffer 34 is "256" as described above. If "YES" is determined in the step S18, in a next step S19, the X counter is incremented (x+1), and the process proceeds to the step S12 again. That is, until the count value of the X counter becomes "256", the steps S12 to S18 are repeatedly executed, and accordingly, the number of the black dots in the line buffer 34 obtained by referring to the bit number detection table 30d is written in the image buffer 38. Thus, the image buffer 38 shown in FIG. 13(C) is produced.

In a next step S2 shown in FIG. 12, a histogram is produced in the histogram buffer 40 on the basis of the image data of the line buffer 34 shown in FIG. 13(B).

Figure 15:
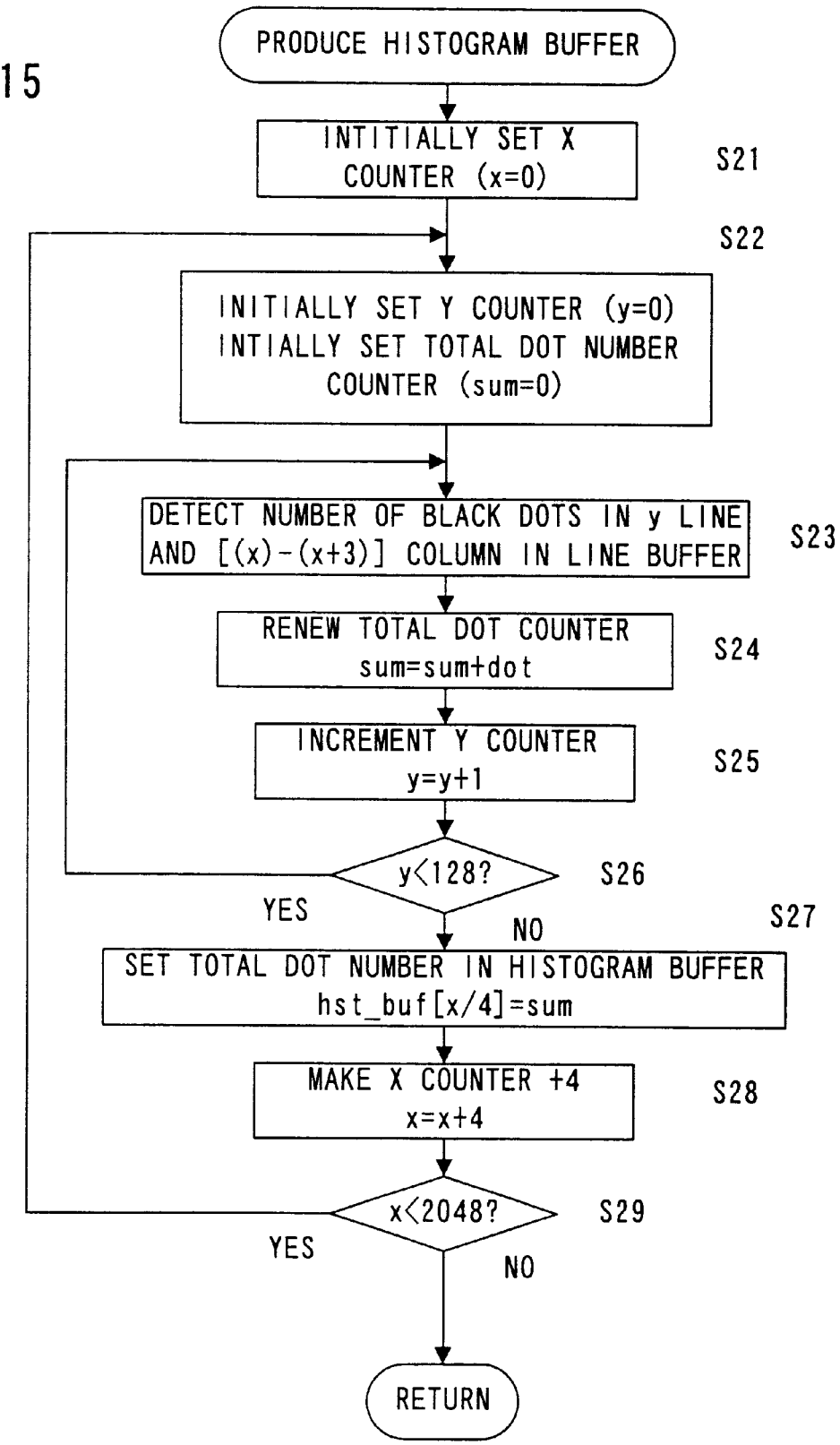

Specifically, in a first step S21 of FIG. 15, the count value x of the X counter is made "0". That is, the X counter is cleared. In a next step S22, the count value y of the Y counter is made "0". That is, the Y counter is cleared. In the step S22, a count value sum of the total dot number counter SUM for counting a total number of the black dots is also cleared.

In a next step S23, the CPU 26 investigates the number of the black dots at a position indicated by the count values x and y of the X counter and the Y counter in the line buffer 34. That is, the number of the black dots in the columns (x)–(x+3) of the Y line in the line buffer 34 is detected. In addition, such a detection is made with utilizing the bit number detection table 30d.

In a step S24, the CPU 26 adds the number of the black dots detected in the previous step S23 to the count value of the total dot number counter SUM so as to renew the count value of the total dot number counter SUM (sum=sum+dot).

Then, in a step S25, the CPU 26 increments the count value y of the Y counter, and in a next step S26, the CPU 26 determines whether or not the count value y exceeds "128" because the number of the lines of the line buffer 34 is "128" as descrbed above. If "NO" is determined in the step S28, the process returns to the previous step S23, and the steps till the step S25 are repeatedly executed.

If "YES" is determined in the step S26, in a next step S27, the CPU 26 writes the count value sum of the total dot number counter SUM into the histogram buffer 40 (hst–buf [x/4]=sum). In the next step S28, the X counter is made +4, and in a next step S29, it is determined whether or not the count value x of the X counter exceeds "2048". If "NO" is determined in the step S29, the process proceeds to the step S22 again. That is, until the count value of the X counter becomes "2048", the steps 22 to S29 are repeatedly executed such that the histogram shown in FIG. 13(D) is produced in the histogram buffer 40 according to the count value of the total dot counter SUM.

Next, as shown in a step S3 of FIG. 12, the rough X position of each of the characters of the addressing number is evaluated on the basis of a content of the histogram buffer 40. Specifically, in a first step S31 of a subroutine shown in FIG. 16, the character number "no" is reset or cleared (no=0), and then, in a step S32, the initialization is made so as to set a start position "x-st" in the X direction as "r" and an end position "x-end" in the X direction as "511". Succeedingly, in a step S13, left and right positions, i.e. a left end x1 and a right end x2 of each of the characters are evaluated. The step S33 is shown in detail in FIG. 17.

Figure 17:
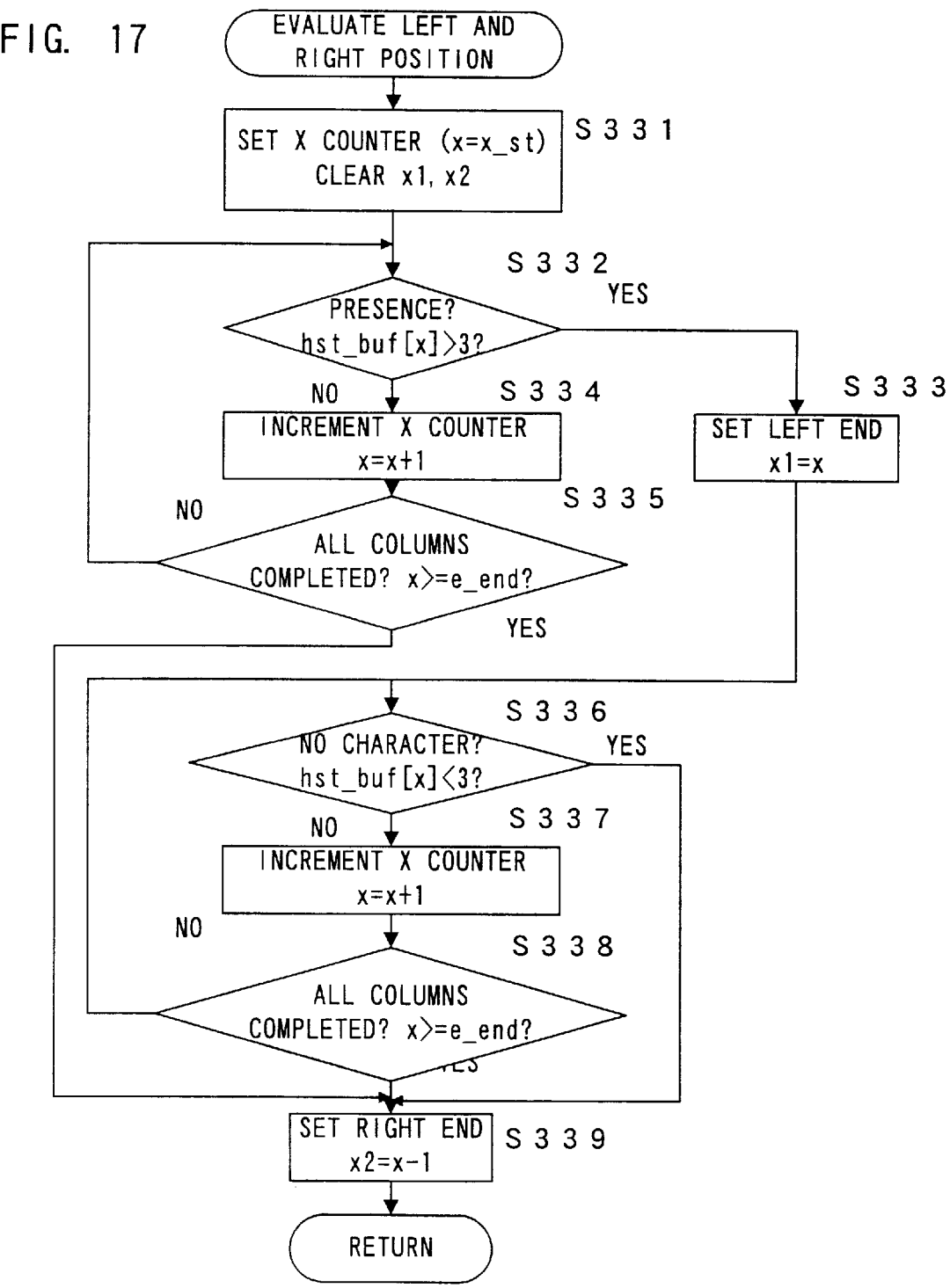
FIG. 17 is a flowchart showing an operation for evaluating a horizontal or row direction position in FIG. 16.

In a first step S331 of FIG. 17, the CPU 26 initially sets the X counter with the start position "x-st" in the X direction, and clears left and right ends x1 and x2 which are variables. Then, in a next step S332, the CPU 26 determines whether or not a character exists at a column position (hst-buf[x]>3). More specifically, since the histogram is stored in the histogram buffer 40 as described above, it is possible to determine the presence or absence of the character by slicing the histogram at a predetermined threshold value such as "3 dots". That is, if the number of the black dots at the column position is larger than "3", it is possible to determined that there is a character at that position However, the threshold value "3" can be arbitrarily changed. If the threshold value is made larger, an influence due to the noise can be reduced, but a possibility that it is determined that no character exist at that position becomes larger. If the threshold value is made smaller, the influence due to the noise is increased, but the possibility that it is determined that no character exists at that position is reduced.

In a case where "presence of the character" is determined in the step S332, in a next step S333, as the left end x1, the column position [x] at the time is set. However, if "NO" is determined in the step S332, after the count value x of the X counter is incremented in a step S334, in a step S335, it is determined whether or not the count value x reaches the end position "x-end" being previously set. If "NO" is determined in the step S335, the previous steps S332 and S334 are executed again. That is, until the count value x of the X counter becomes "x-end", the steps S332 and S334 are repeatedly executed.

On the other hand, after the left end x1 is set in the previous step S333, in a step S336, it is determined whether or not there is a character (hst-buf[x]<3). As similar to the previous step S332, in the step S336, it is possible to determine the presence or absence of the character by slicing the histogram with a predetermined threshold value such as "3 dots". If "YES" is determined in the step S336, after the count value x of the X counter is incremented in a step S337, in a step S338, it is determined whether or not the count value x reaches the end position "x-end". If "NO" is determined in the step S338, the previous step S336 and S337 are executed again. That is, until the count value x of the X counter becomes the end position "x-end", the steps S336 and S337 are repeatedly executed.

Following to step S338 or when "NO" is determined in the step S336, in a step S339, as the right end x2 of the character, the column number before the count value x of the X counter at that time by one, i.e. (x−1) is set. Thus, with referring to the histogram buffer 40, the rough left end x1 and the rough right end x2 of each of the characters of the hand-written addressing number can be evaluated.

Figure 16:
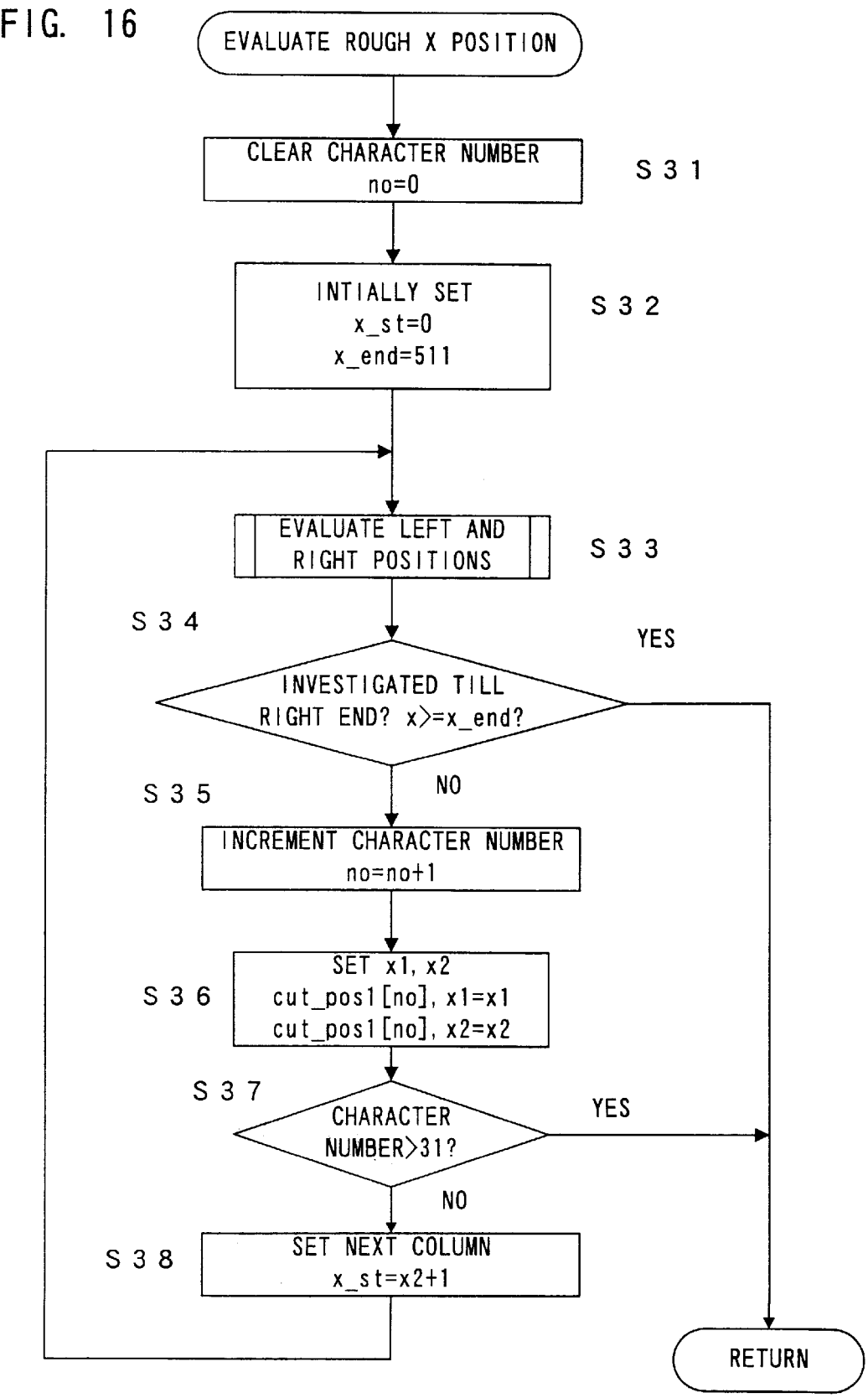
FIG. 16 is a flowchart showing an operation for evaluating a rough X position.

Thereafter, the process returns to step S34 shown in FIG. 16, and in the step S34, the CPU 26 determines whether or not the count value x of the X counter becomes the end position of "511" set in the step S32. If "N0" is determined in the step S34, it means that the investigation has not been completed till the right end shown in FIG. 13(D) in the histogram buffer 40, and in this case, the CPU 26 increments the character number "no" (no=no+1) in a step S35, and in a step S36, the rough positions x1 and x2 evaluated in the step S33 are stored in the first character cut-out buffer 42, and then, the process proceeds to step S37.

In the step S37, the CPU 26 determines whether or not the character number "no" exceeds "31". "32" is a maximum number of the characters capable of being stored in the first character cut-out buffer 42, and therefore, if "YES" is determined in the step S37, it means that the process is need not to be further executed, and therefore, in this case, as similar to a case where "YES" is determined in the step S34, the process proceeds to a next step S4 shown in FIG. 12. However, if "NO" is determined in the step S37, in a next step S38, as the start position "x-st" in the X direction, a column existing the right of the character right end x2 evaluated in the step S33 by one column is set (x-st=x2+1), and the step S33 is executed again such that the left end x1 and the right end x2 of the characters are evaluated.

Figure 18:
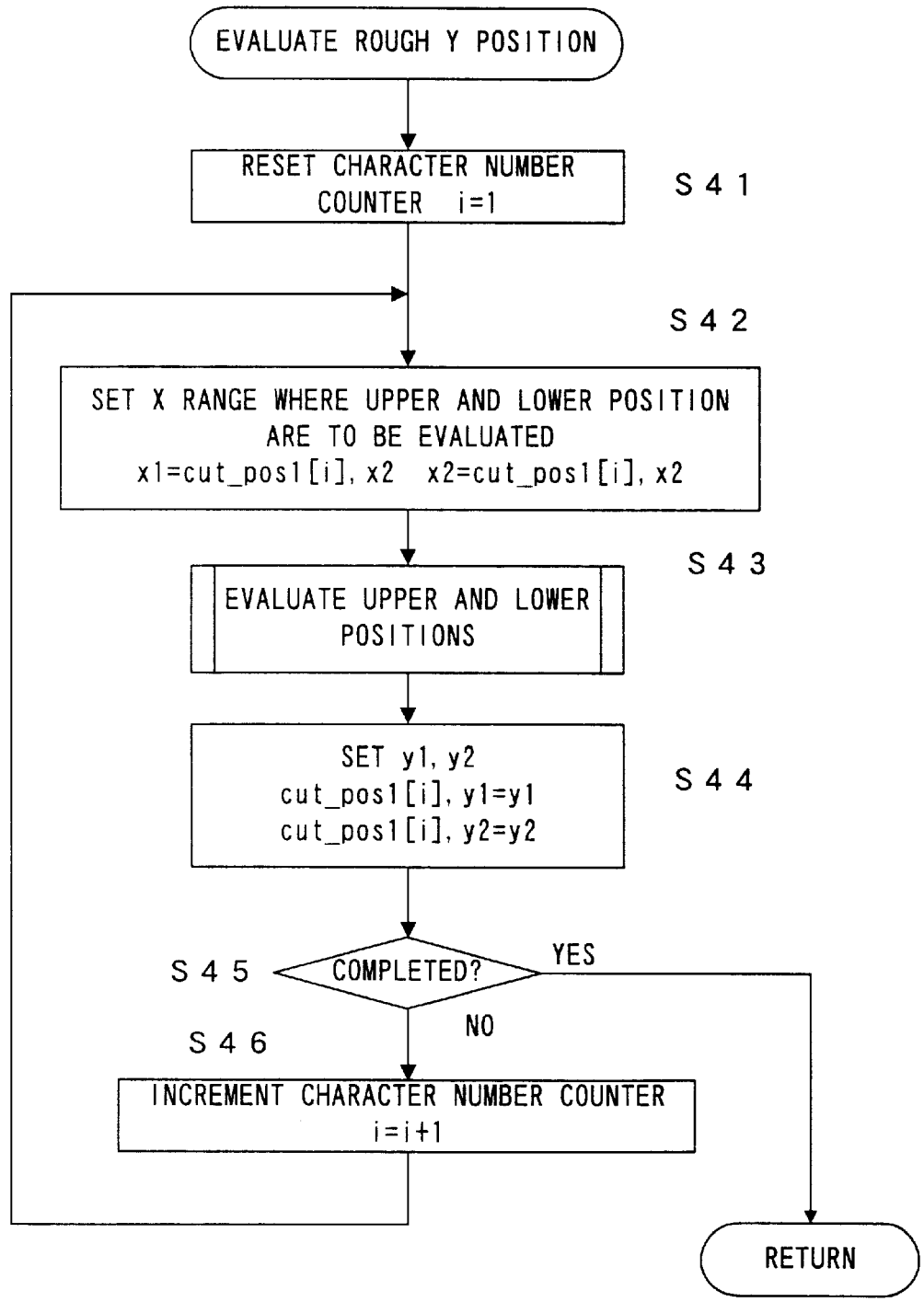
FIG. 18 is a flowchart showing an operation for evaluating a rough Y position.

In a step S4 shown in FIG. 12, the rough Y position of each of the characters, i.e. an upper end y1 and a lower end y2 are evaluated. Specifically, a subroutine shown in FIG. 18 is executed. In a first step S41 of FIG. 18, the count value i of the character number counter MCNT is made "1" to designate a first character being cut-out in the first character cut-out buffer 42 is designated. Then, in a next step S42, a range of columns in which the rough Y position is to be evaluated, that is, the left end position x1 and the right end position x2 of the character are set. Succeedingly, in a step S43, a subroutine shown in FIG. 19 is executed so that the upper end y1 and the lower end y2 can be evaluated.

Figure 19:
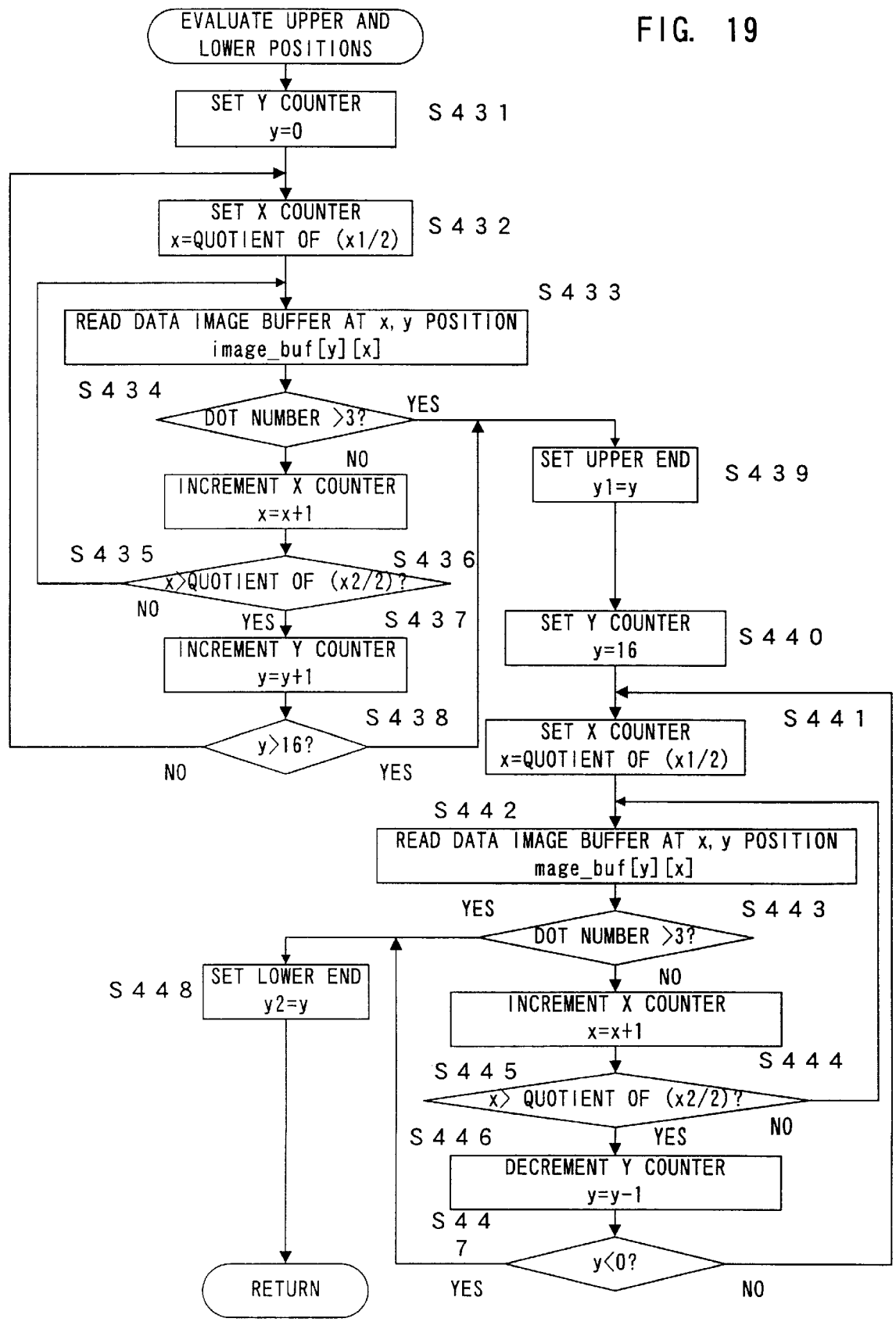
FIG. 19 is a flowchart showing an operation for evaluating a vertical or column direction position in FIG. 18.

In a first step S431 of FIG. 19, the count value y of the Y counter is made "0", and in a step S432, the count value x of the X counter is set with an initial value, i.e. a quotient of (x½).

In a next step S433, the CPU 26 investigates the number of the black dots at the X position and the Y position of the image buffer 38 (image-buf[Y][x]). That is, the dot number data at a position x, y in the image buffer 38 is read.

Then, in a step S434, the CPU 26 determines whether or not the dot number investigated in the step S433 is larger than "3". If "NO" is determined in the step S434, in a next step S435, the X counter is incremented (x=x+1), and in a step S436, it is determined whether or not the count value x exceeds a quotient of (x²⁄²). That is, until the count value x of the X counter exceeds the right end value x2, the steps S433 to S435 are repeatedly executed so as to investigate the number of the black dots.

If the count value x of the X counter exceeds the right end value, in a step S437, the count value y of the Y counter is incremented (y=y+1), and in a next step S438, it is determined whether or not the count value y exceeds "16". If "YES" is determined in the step S438, as similar to a case where "YES" is determined in the previous step S434, in a step S439, the count value y of the Y counter is set as the upper end y1 of the character. Furthermore, in a step S440, the count value y of the Y counter is set as "16".

In a next step S441, the CPU 26 sets the count value x of the X counter as the left end x1 of the character (x=quotient of (x½). Next, in a step S442, as similar to the previous step S433, the number of the black dots at a position x, y at that time is investigated.

In a step S443, the CPU 26 determines whether or not the number of black dots investigated in the step S442 is larger than "3". If "NO" is determined in the step S443, the X counter is incremented in a next step S444, and in a step S445, it is determined whether or not the count value x exceeds the right end value being previously set. That is, until the count value x of the X counter exceeds the right end value, the steps S442 to S444 are repeatedly executed, and therefore, the number of the black dots can be investigated.

If the count value x of the X counter exceeds the right end value, in a step S446, the count value y of the Y counter is decremented (y=y−1), and it is determined whether or not the count value y is less than "0" in a next step S447. If "NO" is determined in the step S447, the process returns to the previous step S442, and therefore, the steps till the step S445 are repeatedly executed. When "YES" is determined in the step S447, as similar to a time that "YES" is determined in the step S443, in a step S448, the count value y of the Y counter at the time is set as the lower end y2 of the character.

Thus, in FIG. 19, the upper end y1 and the lower end y2 are evaluated, and the same are set in the first character cut-out buffer 42.

Returning back to FIG. 18, in a step S44, the upper and lower positions y1 and y2 evaluated in the step S43 are set in the character cut-out table. Then, in a step S45, it is determined whether or not the detection of the upper and lower end positions is completed for all of the rough character positions. If not, the character number counter is incremented (i=i+1) in a step S46, and then, the process returns to the previous step S42. If completed, the process returns to FIG. 12. Thereafter, the process proceeds to a step S5 shown in FIG. 12.

Figure 20:
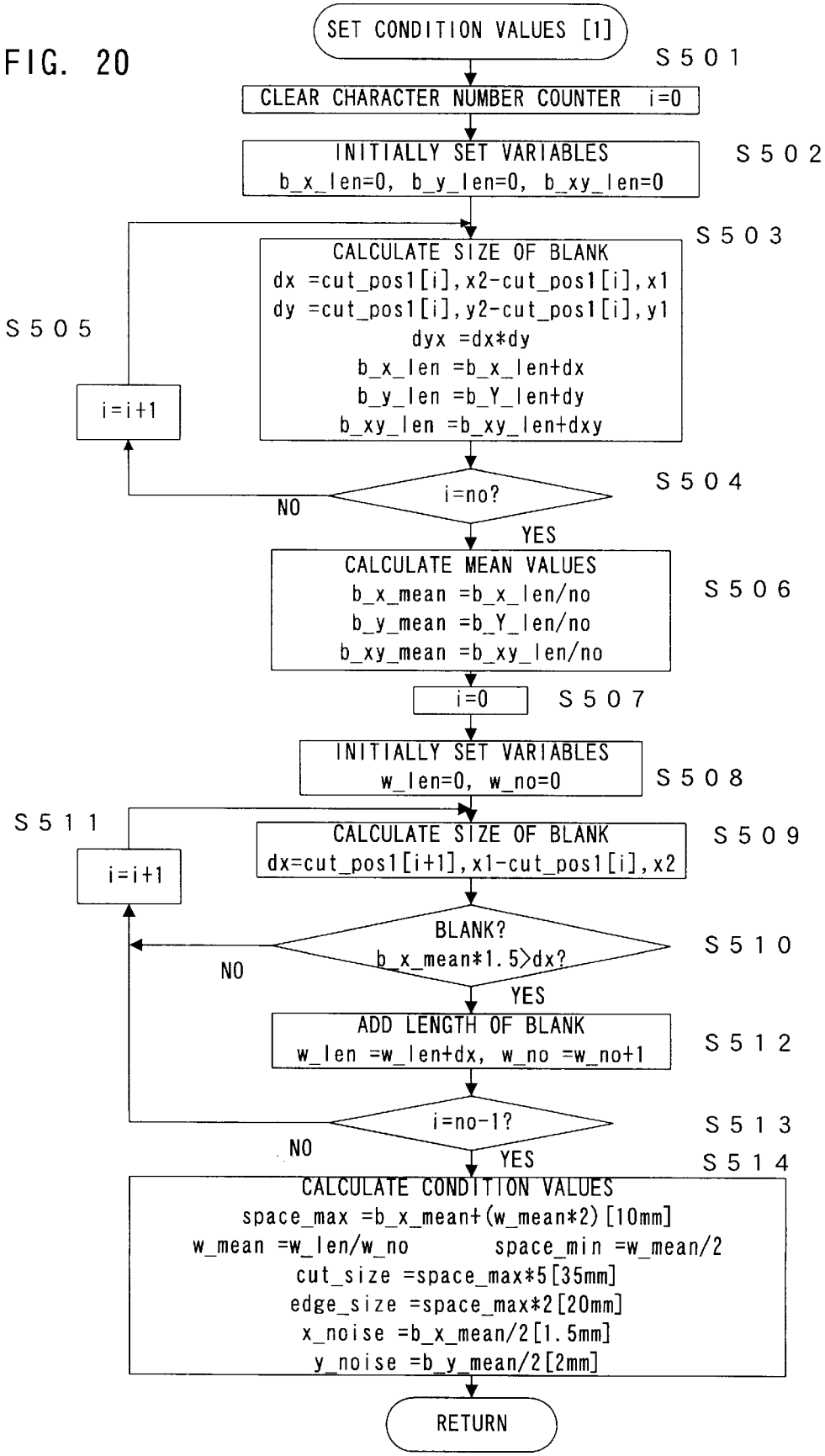
FIG. 20 is a flowchart showing an operation for checking various kinds of condition values.

The step S5 where various kinds of condition values are set is shown in detail in FIG. 20. In a first step S501 of FIG. 20, the CPU 26 clears the count value i of the character number counter MCNT as "0".

In a succeeding step S502, the CPU 26 initially sets the X direction whole length "b-xy-len", the Y direction whole length "b-y-len" and the product "y-xy-len" of the character area, which are all the variables, as "0". Then, in a step S503, the CPU calculates the size of the portion of each of the characters "dx", "dy" and "dxy" and the character area whole length and product "b-x-len", "b-y-len" and "b-xy-len". That is, the size "dx" in the X direction is evaluated by the left end x1 and the right end x2 of each character being set in the first character cut-out buffer 42, and the size "dy" in the Y direction by the upper end y1 and lower end y2 of each character and the product "bxy" is evaluated as "dx× dy". Then, by adding the sizes of the portion of the character "dx", "dy" and "dxy" to the character area whole length "b-x-len", "b-y-len" and "b-xy-len" being initially set in the step S502, respectively, to renew the whole length "b-x-len", "b-y-len" and "b-xy-len".

In a next step S504, it is determined whether or not the count value i of the character number counter MCNT exceeds the total character number "no". If "NO" is determined in the step S504, in a next step S505, the count value i of the character number counter MCNT is incremented, and then, the process returns to the step S502 again. That is, until the count value i of the character number counter MCNT exceeds the total character number "no", the size and the whole length of the portion of each of the characters are calculated for all the characters.

Next, in a step S506, the CPU 26 calculates respective mean values "b-x-mean", "b-y-mean" and "b-xy-mean" on the basis of the character area whole length "b-x-len", "b-y-len" and "b-xy-len" and the character number "no". The mean value can be evaluated with a simple averaging method in which the whole length are divided by the character number "no", respectively.

Then, in a step S507, the count value i of the character number counter MCNT is reset, and in a next step S508, the blank length "w-len" and the blank number "w-no" both being the variables are initially. set as "0", respectively. In a succeeding step S509, the size "dx" in the X direction of the blank portion is evaluated with referring to the first character cut-out buffer 42. That is, the size "dx" of the blank portion can be evaluated as a difference between the right end x2 of the character and the left end x1 of a next character in the first character cut-out buffer 42.

In a next step S510, the CPU 26 determines whether or not there is a blank, that is, whether or not the size "dx" in the X direction of the blank portion is smaller than 1.5 times the mean value "b-x-mean" of the X direction length of the character portion. If "NO" is determined in the step S510, after the count value i of the character number counter MCNT is incremented in a step S511, the step S509 is executed again. If "YES" is determined in the step S510, in a step S512, the blank portion length "dx" is added to the blank length "w-len" being initially set in the step S508, and the blank number "w-no" is incremented. That is, the blank portion smaller than 1.5 times the mean value "b-x-mean" of the X direction length of the character portion is handled as the space between characters.

Then, in a step S513, it is determined whether or not the count value i of the character number counter MCNT reaches the character number "no" being set. Therefore, if "NO" is determined in the step S513, after the count value i is incremented in the previous step S511, the process returns to the step S509. That is, by repeatedly executing the steps S509 to S512, each of the space between the characters can be specified.

ID a last step S514 in the various kinds of conditions setting process, the CPU 26 sets respective variables for a next character cut-out process, i.e. step S6 of FIG. 12. More specifically, a mean value "w-mean" of the blank portion is set as a value obtained by dividing the blank portion length by the number of the blank portions (w-len/w-no). The blank size "space-max" is set as a value obtained by adding double the mean value "w-mean" of the blank portion to the X direction length of the character, i.e. "b-y-mean +(w-mean× 2)". The Character break size "space-min" is set as a value obtained by the mean value of the blank portion by "2" (w-mean/2). The punctuation size "cut-size" is set as 5 times the size of the blank, i.e. "space-max×5". The edge size "edge-size" is set as double the size of the blank, i.e. "space-max×2". The noise size "x noise" in the X direction is set as the value obtained by dividing the character length in the X direction by "2", i.e. "b-x-mean/2". The noise size "y-noise" in the Y direction is set as a value obtained by dividing the character length in the Y direction by "2", i.e. "b-y-mean/2".

Thereafter, the process proceeds to a setting step for setting the character cut-positions shown in FIG. 14. The step S46 is shown in detail in FIG. 28 and thereafter.

Figure 28:
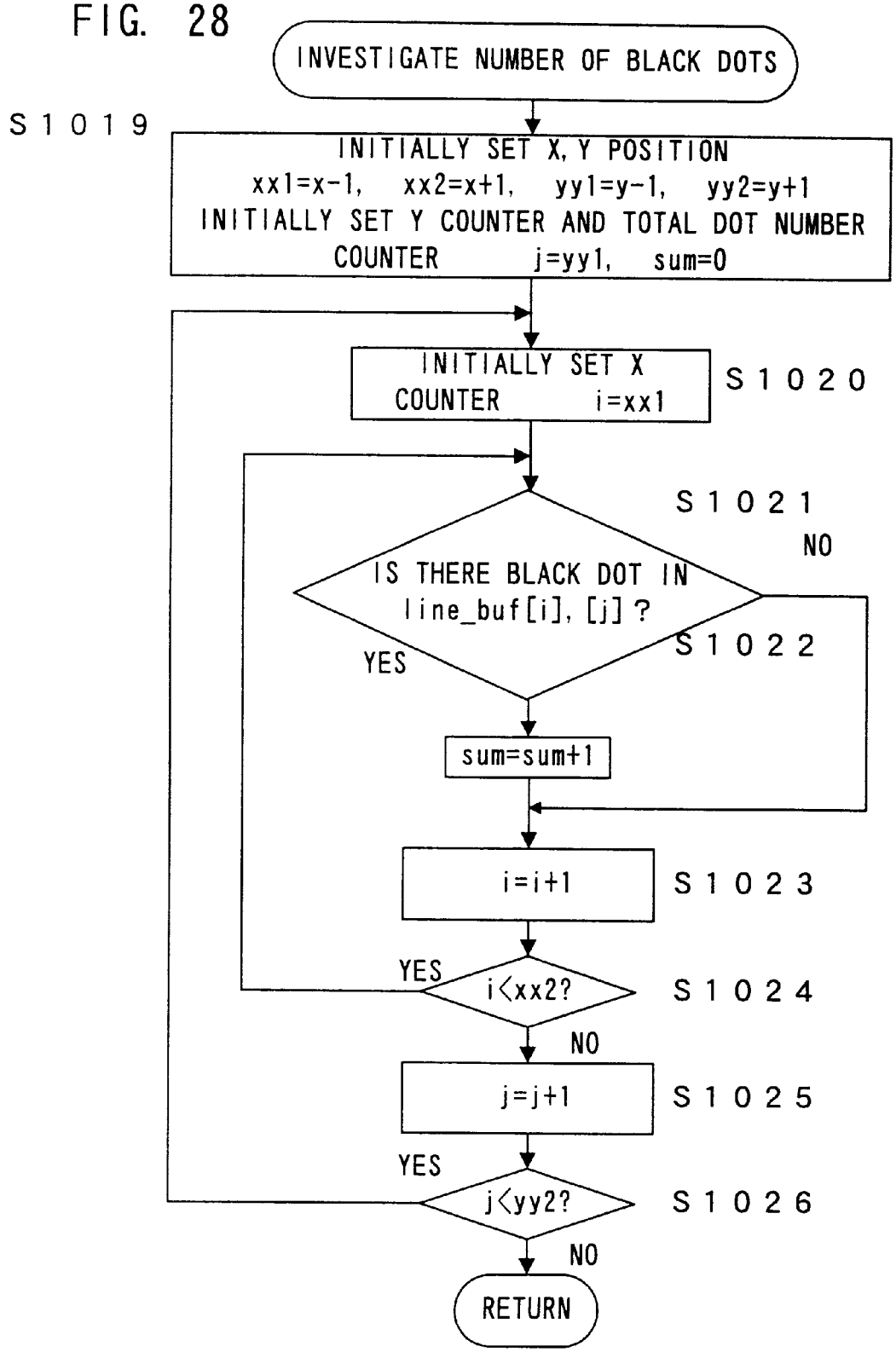
FIG. 28 is a flowchart showing an operation for investigating the number of black dots.

More specifically, in a first step S4601 of FIG. 28, the CPU 26 resets (clears) the count values i and j of the two character number counter MCNT1 and MCNT2, and in a next step S4602, the CPU 26 reads the left end position x1, the right end position x2, the upper end position y1 and the lower end position y2 of each of the characters from the first cut-out buffer 42 so as to calculate the X direction length "dx" and the Y direction length "dy" of each of the characters.

However, in the step S514, as the respective variables, fixed values indicated by [ ] shown in the step S514 may be set.

In a step S6 of FIG. 12, the final character cut-out position is set according to the various conditions [1] set in the previous step S5. Specifically, a subroutine shown in FIG. 21 is executed.

Figure 21:
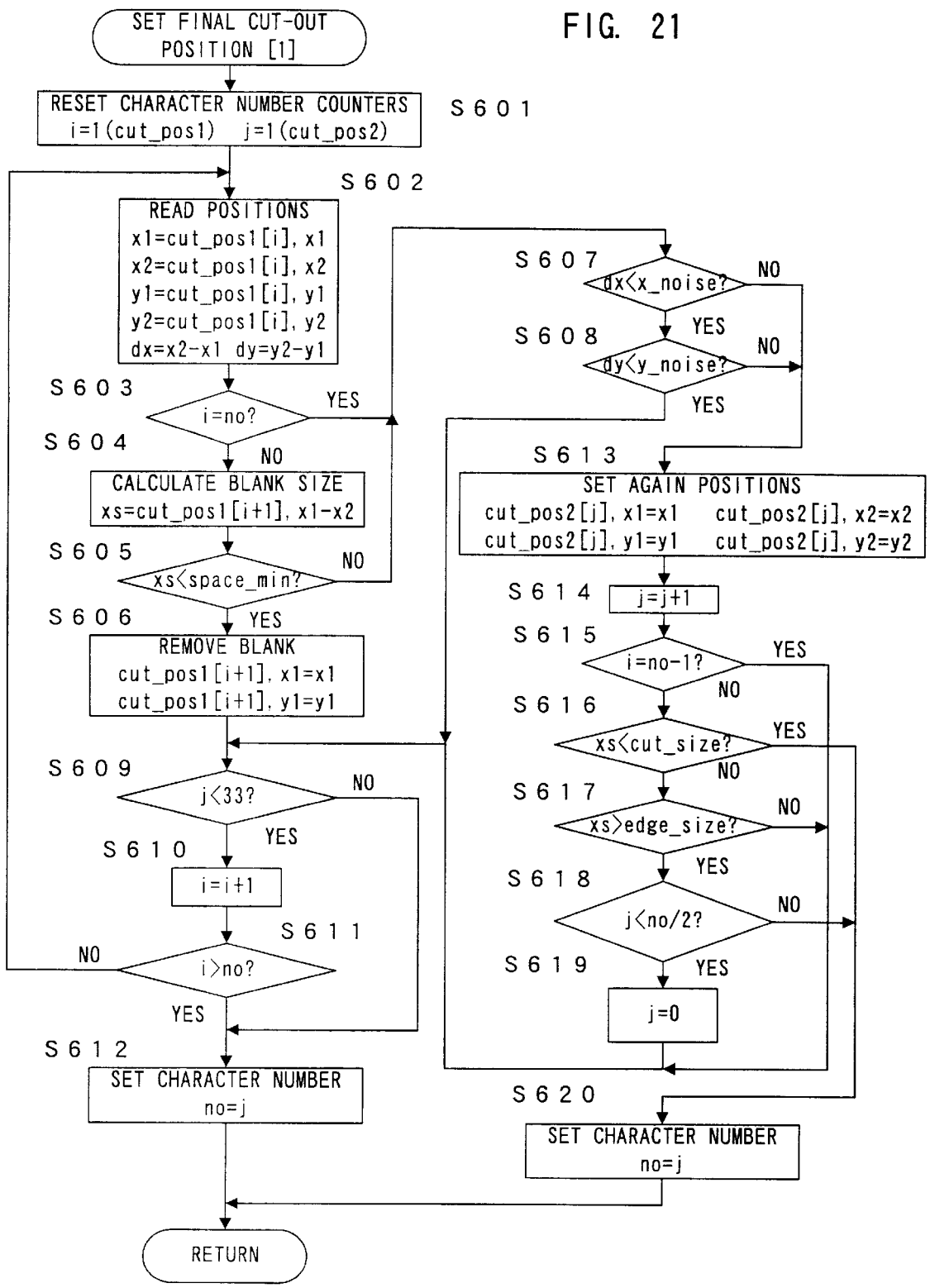
FIG. 21 is a flowchart showing an operation for setting a final character cut-out position.

In a first step S601 of FIG. 21, the count values i and j of the first character number counter and the second character number counter are respectively reset. In addition, the former is utilized for the first character cut-out table, and the latter is utilized for the second character cut-out table. Then, in a step S602, the CPU 26 withdraws the character positions x1, x2, y1 and y2 being previously set from the first character cut-out table (cut-pos1).

In a succeeding step S603, it is determined whether or not the count value i of the first character number counter MCNT1 does not exceed the total character number "no". If "NO" is determined in the step S603, it means that the data to be set in the second character cut-out buffer 44 remains in the first character cut-out buffer 42. Then, in a succeeding step S604, the CPU 26 calculates the blank size "xs" between the characters. More specifically, the blank size "xs" can be evaluated by calculating the number of columns from the left end x1 of the character designated by the data (i+1) obtained by adding "1" to the count value i of the first character number counter MCNT1 at that time, i.e. the next character to the right end x2 of the character designated by the count value i of the first character number counter MCNT1.

Then, in a next step S605, it is determined whether or not the blank size "xs" is smaller than the condition value "space-min" for determining whether or not the blank size "xs" is the character break, that is, it is determined whether or not the blank. as detected is a break between two portions constituting one character. If "YES" is determined in the step S605, in a step S609, a process for eliminating the blank is performed. That is, in the step S606, the left end x1 and the upper end y1 of the character designated by the data (i+1) obtained by adding "1" to the count value i of the first character number counter MCNT1, i.e. the next character are regarded as the left end x1 and the upper end y1 of the character designated by the count value i.

On the other hand, if "NO" is determined in the step S605, as similar to a case where "YES" is determined in rhe step S603, steps S607 and S608 are executed. More specifically, it is determined whether or not the X width "dx" and the Y width "dy" calculated in the step S602 are smaller than the noise determination values "x-noise" and "y-noise", respectively. If the X width "dx" and the Y width "dy" are smaller than the noise determination values "x-noise" and "y-noise", respectively, "YES" is determined in each of the both steps S607 and S608, and then, the process proceeds to a step S609. After the previous step S606 is executed, the process also proceeds to the step S609.

In the step S609, the CPU 26 determines whether or not the count value d of the second character number counter MCNT2 for the second character cut-out buffer 44 is smaller than "33", that is, whether or not necessary data are all stored in the areas of the second character cut-out buffer 44. If "YES", in a step S610, the count value i of the first character number counter MCNT1 for the first character cut-out buffer 42 is incremented, and in a next step S611, it is determined whether or not the process is completed, that is, whether or not the count value i of the first character number counter MCNT1 reaches the total character number "no". That is, in the step S611, it is determined whether or not the data to be read remains in the first character cut-out buffer 42. If "NO" is determined in the step S611, it means that the data still remains in the first character cut-out buffer 42, and therefore, the process returns to the previous step S602.

If "YES" is determined in the step S611, the count value i of the second character number counter MCNT2 is set as the total character number "no", and then, the process proceeds to a next step S7 of FIG. 12.

If "NO" is determined in the step S607 or S608, it means that the character width "dx" and "dy" calculated in the step S602 are character width of the character to be cut-out of the addressing information, and therefore, the process proceeds to a step S613 wherein the character position is set again in the second character cut-out table. That is, in the step S613, the positions of the respective characters while the noises removes are set again in the second character cut-out table. Next, in a step S614, the character number j is incremented.

Thereafter, in a step S615, it is determined whether or not the count value i of the first character number counter reaches the total character number "no". Then, in a step S616, it is determined whether or not the blank size "xs" is larger than the break size "cut-size" for separating the addressing information from the other information. That is, in the step S616, it is determined whether the target for recognition is the hand-written addressing information or the other information such as the date. In a step S617, it is determined whether or not the blank size "xs" is larger than the edge width "edge-size". That is, it is determined whether or not the blank is larger than an interval between an edge of the transmission original and the hand-written character. Furthermore, in a step S618, it is determined whether or not the count value j of the second character number counter for the second character cut-out table is in a front half of all the characters (j<no/2).

When "YES" is determined in the step S615, or when "NO" is determined in the step S617, the process returns to the previous step S609. If "YES" is determined in the step S618, after the second character number counter is cleared (j=0) in a step S619, the process also returns to the step S609. Furthermore, if "YES" is determined in the step S616, or if "NO" is determined in the step S618, in a step S620, the count value j of the second character number counter at that time is set as the total character number "no" as similar to the previous step S612. Thereafter, as similar to the step S612, the process returns to a step S7 in FIG. 12.

Figure 22:
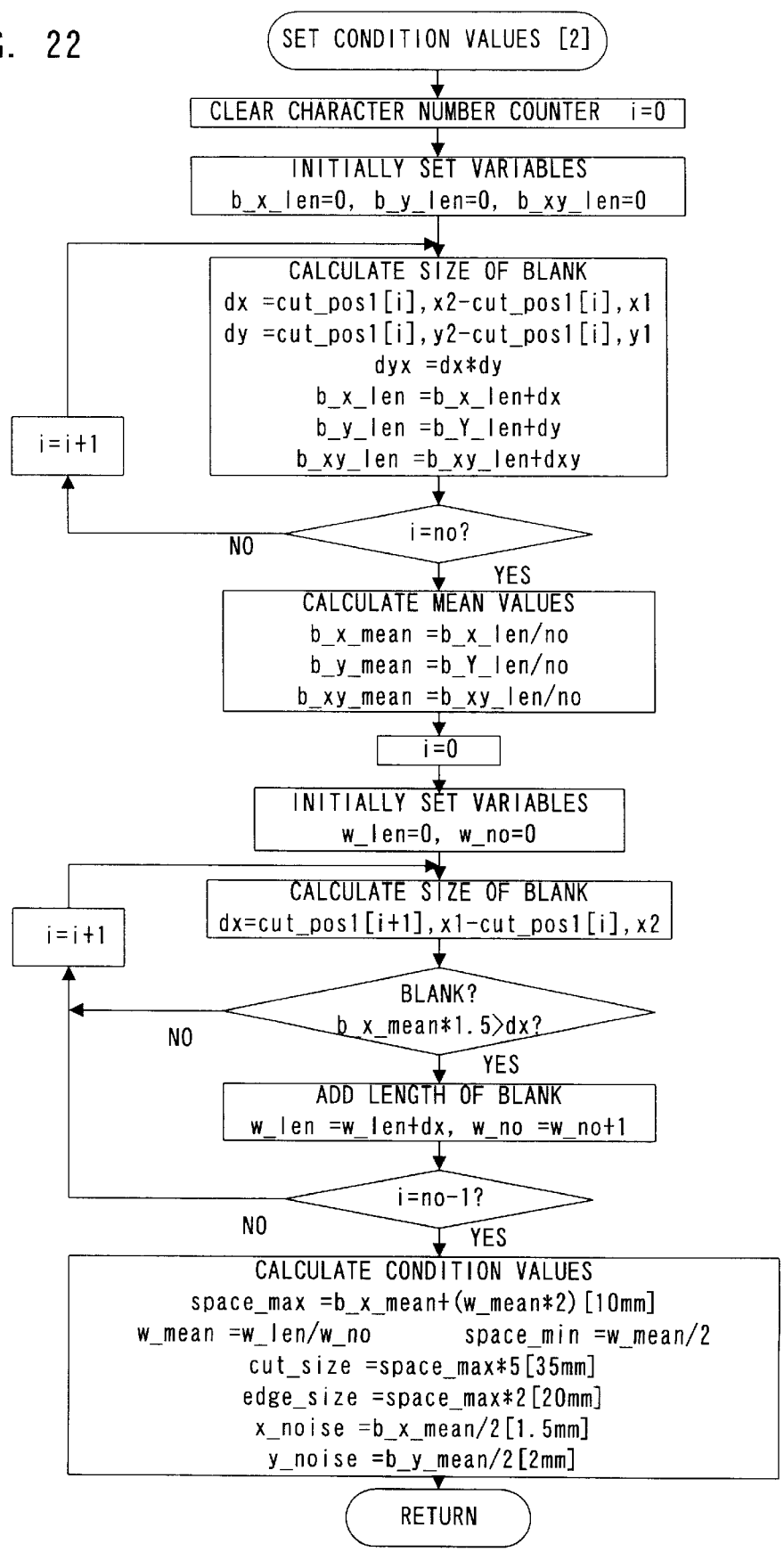
FIG. 22 is a flowchart showing an operation for setting various kinds of condition values.

In the step S7, the step S5, that is, a subroutine for setting the various kinds of condition values [2] shown in FIG. 22, which is the same as FIG. 20, is executed. However, a duplicate description will be omitted here.

Figure 23:
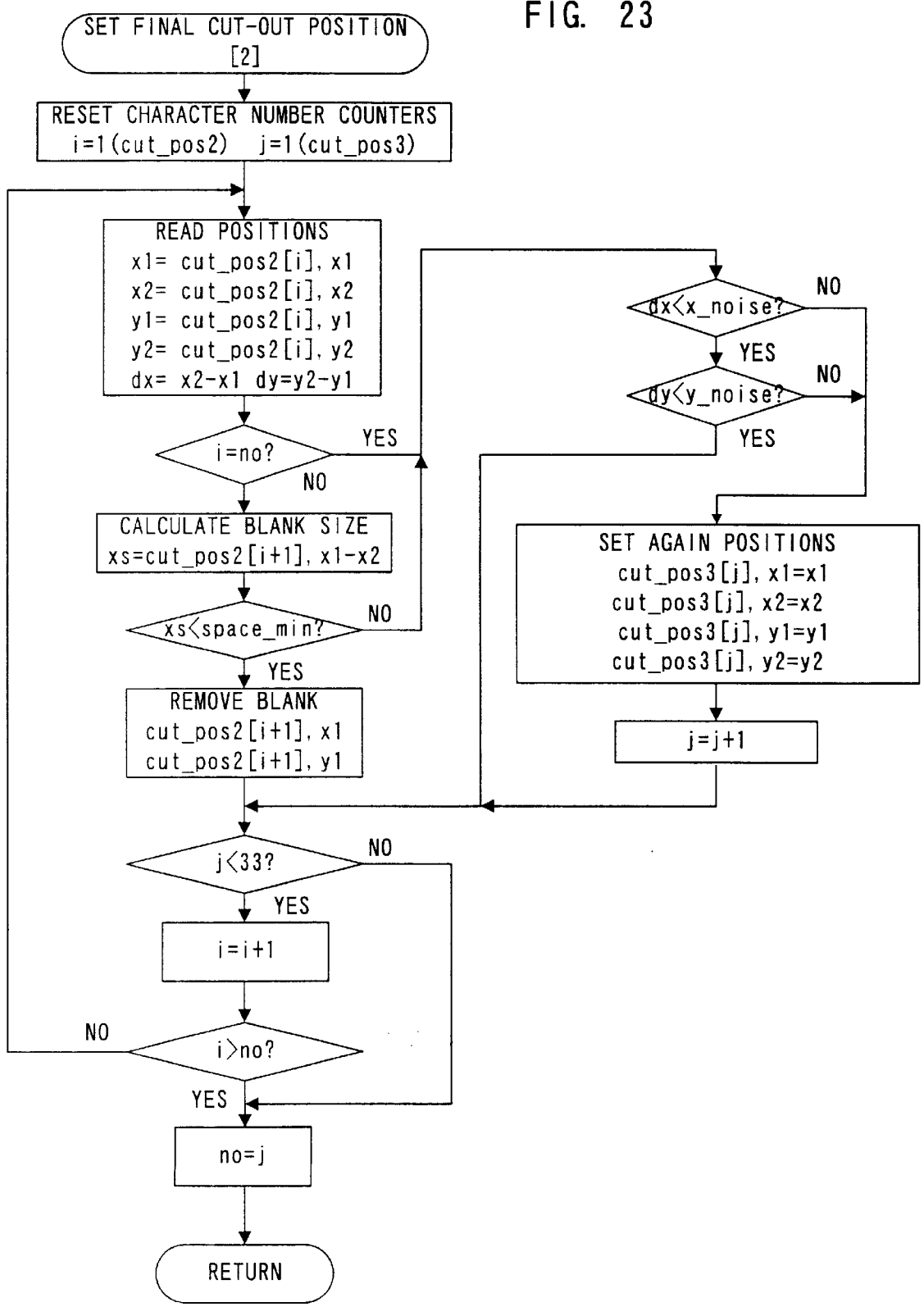
FIG. 23 is a flowchart showing an operation for setting a final character cut-out position.

In a next step S8 in FIG. 12, as similar to the previous step S6, a subroutine for setting a final character cut-out position [2] is executed. Specifically, the subroutine shown in FIG. 23 is executed. However, FIG. 23 subroutine is different from FIG. 21 subroutine in that no break detection and no edge detection are performed. That is, in FIG. 23 subroutine, the steps S615 to S620 of FIG. 21 are omitted because the break detection and the edge detection are not influenced even if the character positions are set again in the third character cut-out table.

Figure 24:
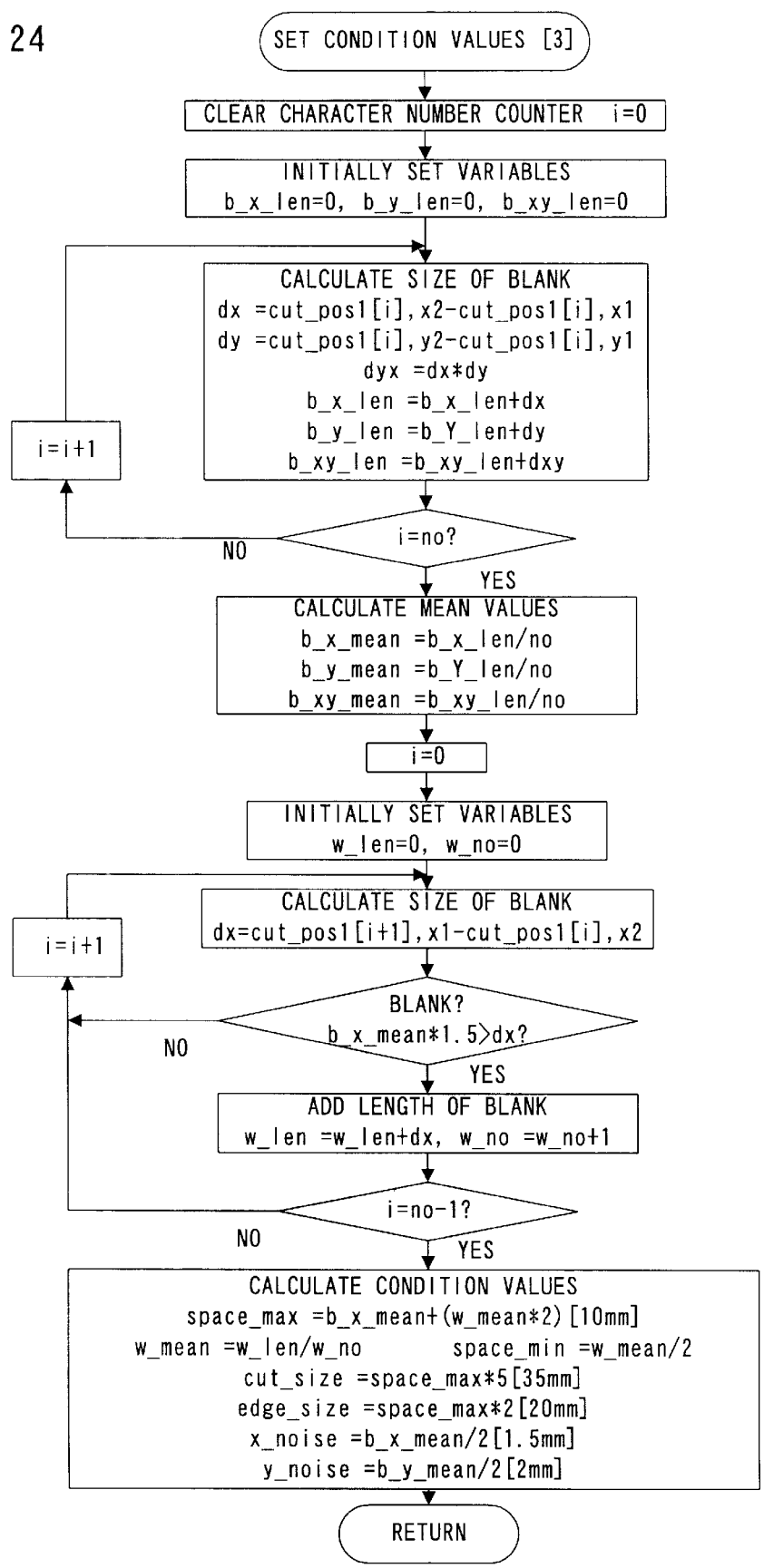
FIG. 24 is a flowchart showing an operation for setting various kinds of condition values.

In a step S9 shown in FIG. 12, a subroutine for setting various kinds of condition values [3] shown in FIG. 24, which is the same as FIG. 20 or FIG. 22, is executed; however, a duplicate description will be omitted here.

Figure 25:
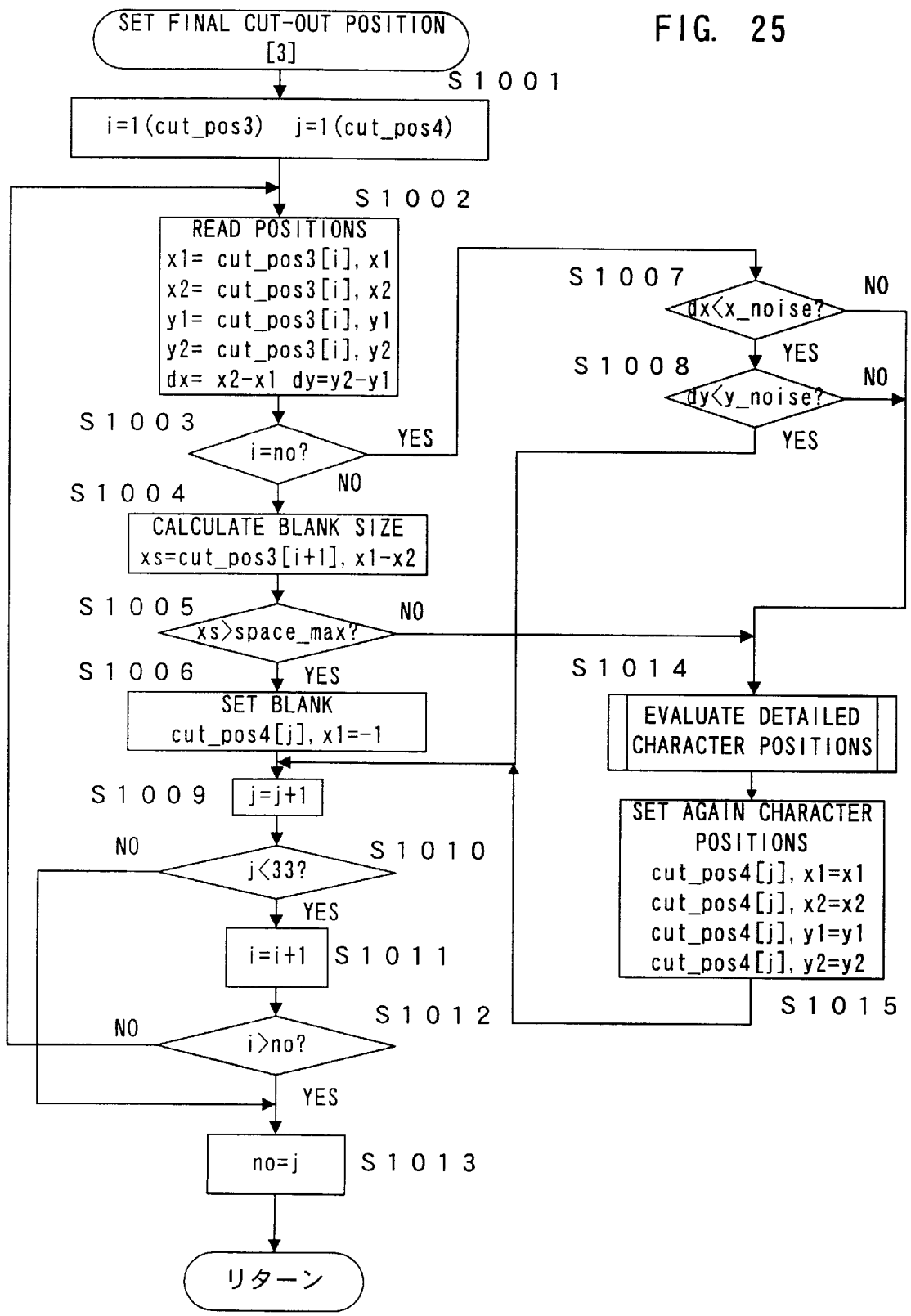
FIG. 25 is a flowchart showing an operation for setting final character cut-out position.

In a next step S10 of FIG. 12, as similar to the previous step S6 and S8, a subroutine for setting a final character cut-out position [3] is executed. Specifically, the subroutine shown in FIG. 25 is executed.

In a first step S1001 of FIG. 5, the count values i and j of the first character number counter and the second character number counter are reset, respectively. In addition, the former utilized for the third character cut-out table (cut-pos3), and the latter is utilized for the fourth character cut-out table (cut-pos4). Then, in a step S1002, the CPU 26 reads the character positions x1, x2, y1 and y2 set in the third character cut-out table (cut-pos3) as described above, and character sizes "dx" and "dy".

In a succeeding step S1003, it is determined whether or not the count value i of the first character number counter MCNT1 becomes equal to the total character number "no". If "NO" is determined in the step S1003, it means that the data to be set in the fourth character cut-out table remains in the third character cut-out table. Then, the CPU 26 calculates the blank size "xs" between characters in a succeeding step S1004. Specifically, the blank size "xs" can be evaluated by calculating the number of the columns from the left end x1 of the character designated by the data (i+1) obtained by adding "1" to the count value i of the first character number counter MCNT1, i.e. the next character to the right end x2 of the character designated by the count value i of the first character number counter, MCNT1.

Then, in a next step S1005, it is determined whether or not the blank size "xs" being calculated is larger than the space between characters "space-max", that is, it is determined whether or not the blank as detected is an interval between the adjacent characters. If "YES" is determined in the step S1005, in a step S1006, "FFFF" indicative of the space, i.e. "−1" is written in the area of the fourth character cut-out table designated by the count value j of the second character number counter MCNT2.

The count value j of the second character number counter is incremented in a next step S1009, and in a succeeding step S1010, the CPU 26 determines whether or not the count value j of the second character number counter MCNT2 for the fourth character cut-out buffer is smaller than "33", that is, whether or not the necessary data are all stored in the areas of the fourth character cut-out buffer. If "YES", in a step S1011, the count value i of the first character number counter MCNT1 for the third character cut-out buffer is incremented, and then, in a next step S1012, it is determined whether or not the process is completed, that is, whether or not the count value i of the first character number counter MCNT1 reaches the total character number "no". That is, it is determined whether or not the data to be read remains in the third character cut-out buffer. If "NO" is determined in the step S1012, it means that the data still remains in the third character cut-out table, and therefore, the process returns to the previous step S1002.

If "YES" is determined in the step S1012, in a step S1013, the count value j of the second character number counter MCNT2 is set as the total character number "no", and then, the process proceeds to a next step S11 shown in FIG. 12.

On the other hand, if "YES" is determined in the step S1003, steps S1007 and S1008 are executed. The steps S1007 and S1008 are similar Lo the steps S607 and S608 in FIG. 21.

If "NO" is determined in the step S1007 or S1008, the process proceeds to a step S1014 wherein the detailed character position is evaluated. In addition, the step S1014 will be described in detail later. Then, in a step S1015, the character position is set again in the fourth character cut-out table. That is, in the step step S0115, the positions of the respective characters while the noise is removed are set again in the fourth character cut-out table.

Figure 26:
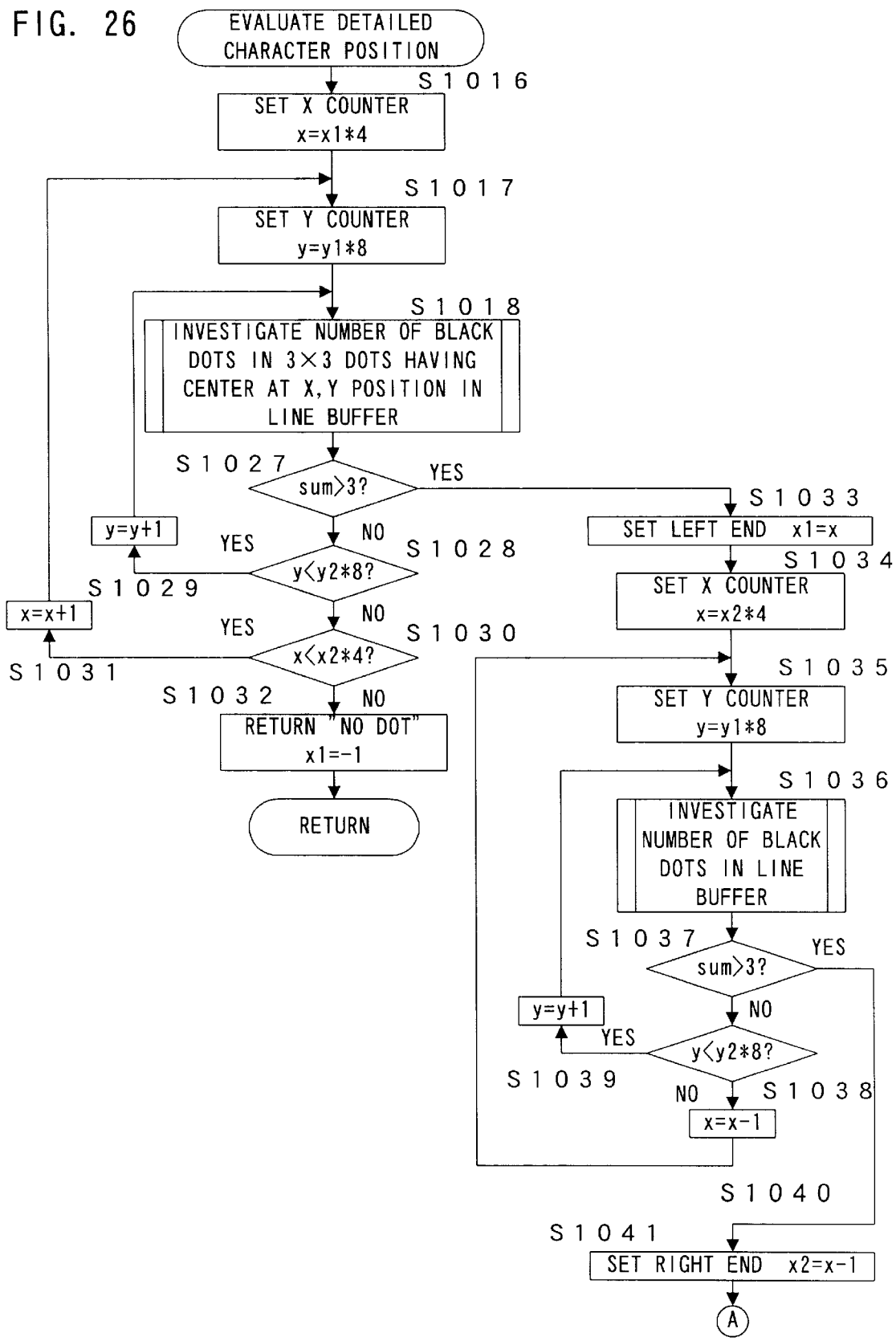
FIG. 26 and FIG. 27 are flowcharts showing an operation for evaluating a detailed character position.
Figure 27:
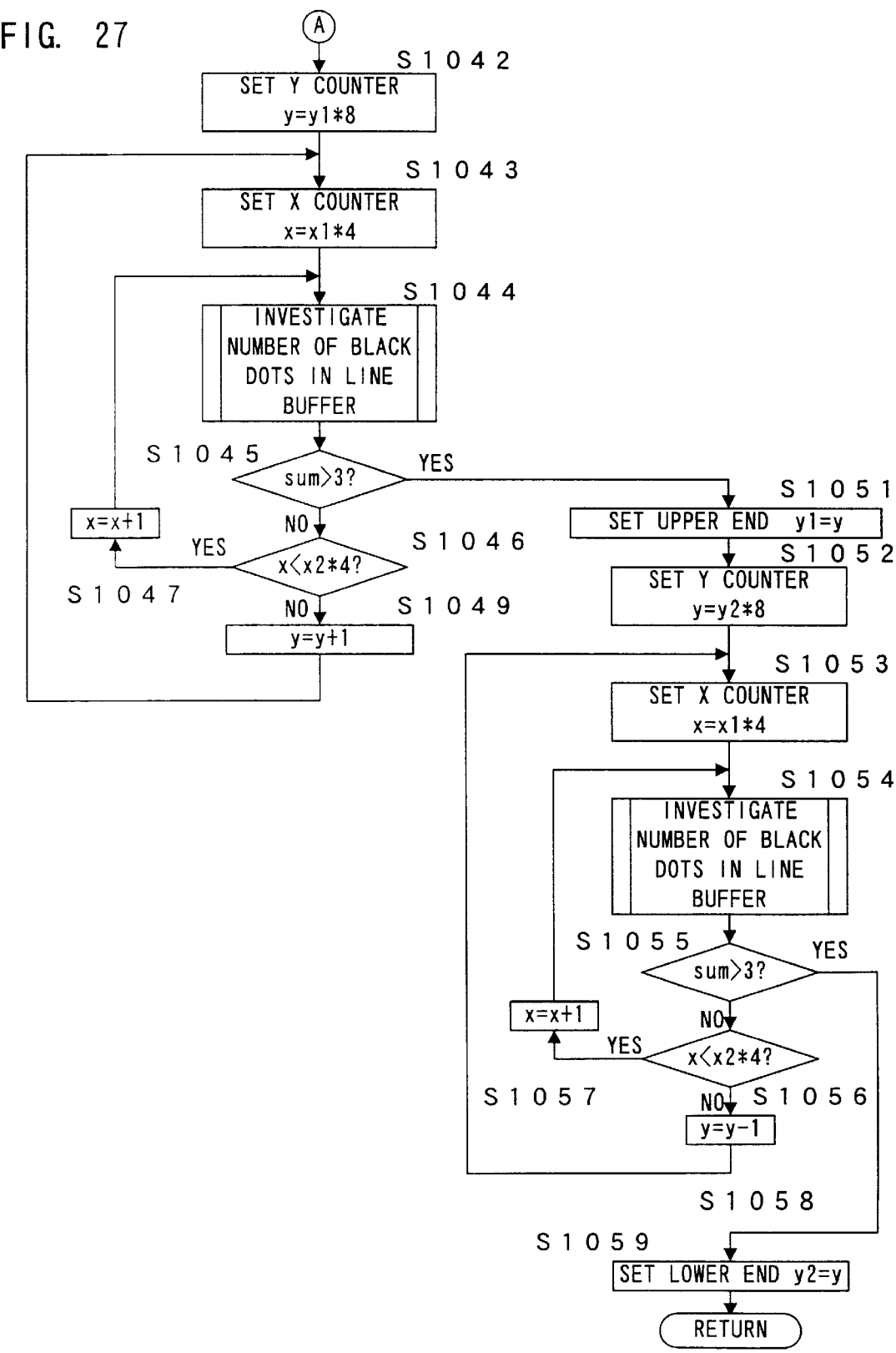

A subroutine for evaluating the detailed character position is shown in FIG. 26 and FIG. 27. In a first step S1016 shown in FIG. 26, the CPU 26 sets data (x1×4) of 4 times the left end x1 of the first character cut-out buffer 42 as the count value x of the X counter XCNT because the column direction of the image buffer is set with a unit of 4 bits. In a succeeding step S1017, data (y1×8) of 8 times the upper end y1 of the third character cut-out buffer as the count value y of the Y counter YCNT because the column direction of the image buffer is set with a unit of 1 byte.

Then, in a step S1018, by executing a subroutine shown in FIG. 28, the number of the black dots in "3×3" dots having a center of the X position and Y position in the line buffer 34 is investigated. Therefore, in the step S1018, it is possible to know the number of the black dots.

More specifically, in a first step S1019 shown in FIG. 28, the X position and the Y position are initialized, and the Y counter and the total dot number counter are initially set. That is, in the step S1019, as the X positions xx1 and xx2 and the Y positions yy1 and yy2, "x−1" and "x+1", and "y−1" and "y+1" are set, respectively, and the Y position yy1 is set as the count value j of the Y counter and the total dot number is cleared (sum=0). In a next step S1020, by initially setting the X counter, i=xx1 is set.

In a succeeding step S1021, it is determined whether or not there is a black dot at a position (i, j) of the line buffer, i.e. line-buf[i][j]. If there is a black dot, in a step S1022, the total dot number counter is incremented (sum=sum+1). If no black dot, as similar to after the step S1022, in a step S1023, the X counter is incremented (i=i+1). Then, in a step S1024, it is determined whether or not the count value i of the X counter is smaller than the X position xx2. If i<xx2, it means that there is a column which has not been investigated in xx1-th column to xx2-th column in j-th line of the line buffer, and therefore, in such a case, the process returns to the previous step S1021. However, if the absence or presence of the black dot is investigated for each of all the columns of the line, in a next step S1025, the Y counter is incremented (j=j+1). Then, in a step S1020, it is determined whether or not the count value j of the Y counter is smaller than the Y position yy2. If j<yy2, it means that there is a line which has not been investigated, and therefore, in this case, the process returns to the previous step S1020. However, the presence or absence of the black dot is investigated for each of all the lines of yy1-th line to yy2-th line, the process returns to a step S1027 shown in FIG. 26. In the step S1027, the CPU 26 determines whether or not the number of the black dots as detected is more than "3". If "NO" is determined in the step S1027, in a next step S1028, it is determined whether or not the count value y of the Y counter YCNT smaller than 8 times (y2×8) the lower end y2 of the third character cut-buffer If "YES", after the count value y of the Y counter YCNT is incremented in a next step S1029, the process returns to the previous step S1018. If "NO" is determined in the step S1028, in a next step S1030, it is determined whether not not the count value x of the X counter XCNT is smaller than 4 time (x2×4) the right end x2 in the first character cut-out buffer 42. If "YES" is determined, after the count value x of the X counter XCNT is incremented in a next step S1031, the process returns to the previous step S1017.

If "NO" is determined in each of the steps S1027, S1028 and S1030, in a step S1032, "dot number=0 " is returned to the step S1014 of FIG. 25.

On the other hand, if "YES" is determined in the step S27, in a step S1033, the CPU 26 sets the count value x of the X counter XCNT at the time as the cut-out position x1 of the character.

After the step S1033, the process proceeds to a step S1034; however, the steps S1034 to S1040 are approximately similar to the above described steps S1016 to S1030 except that the count value x of the X counter XCNT is set as the right end x2 in the step S1041, and therefore, a duplicate description will be omitted here.

Thus, by executing the step S1014 of FIG. 25, it is possible to obtain the position data within the line buffer for the character, of the addressing information. Therefore, in a next step S1015, the CPU 26 stores the cut-out position data x1, x2, y1 and y2 of the each of the characters evaluated in the step S1014.

Next, with referring to FIG. 29, a method for cutting-out the character will be described. In a first step D1 of FIG. 29, the first and second character number counters are initially set (noc=1, chno=1). Now, the variable "noc" is a counter for counting the number of the rough characters "no" evaluated in the step S10 in FIG. 12, and the variable "chno" is a counter for counting the number of the characters actually included in the respective characters evaluated in the same step S10.

In a next step D2, the obscuration buffer (bokashi-buf) is produced. The obscuration buffer holds byte-mapped data (9 gradations) obtained by obscuring the bit image data in each of the rough character areas evaluated in the step S10 (superposition character area) with a size of "3×3" dots. The obscuration buffer is an image area of 40×64 bytes, for example, for cutting-out the characters; however, an obscuration resolution may be dynamically changed according to the size of the character.

Figure 30:
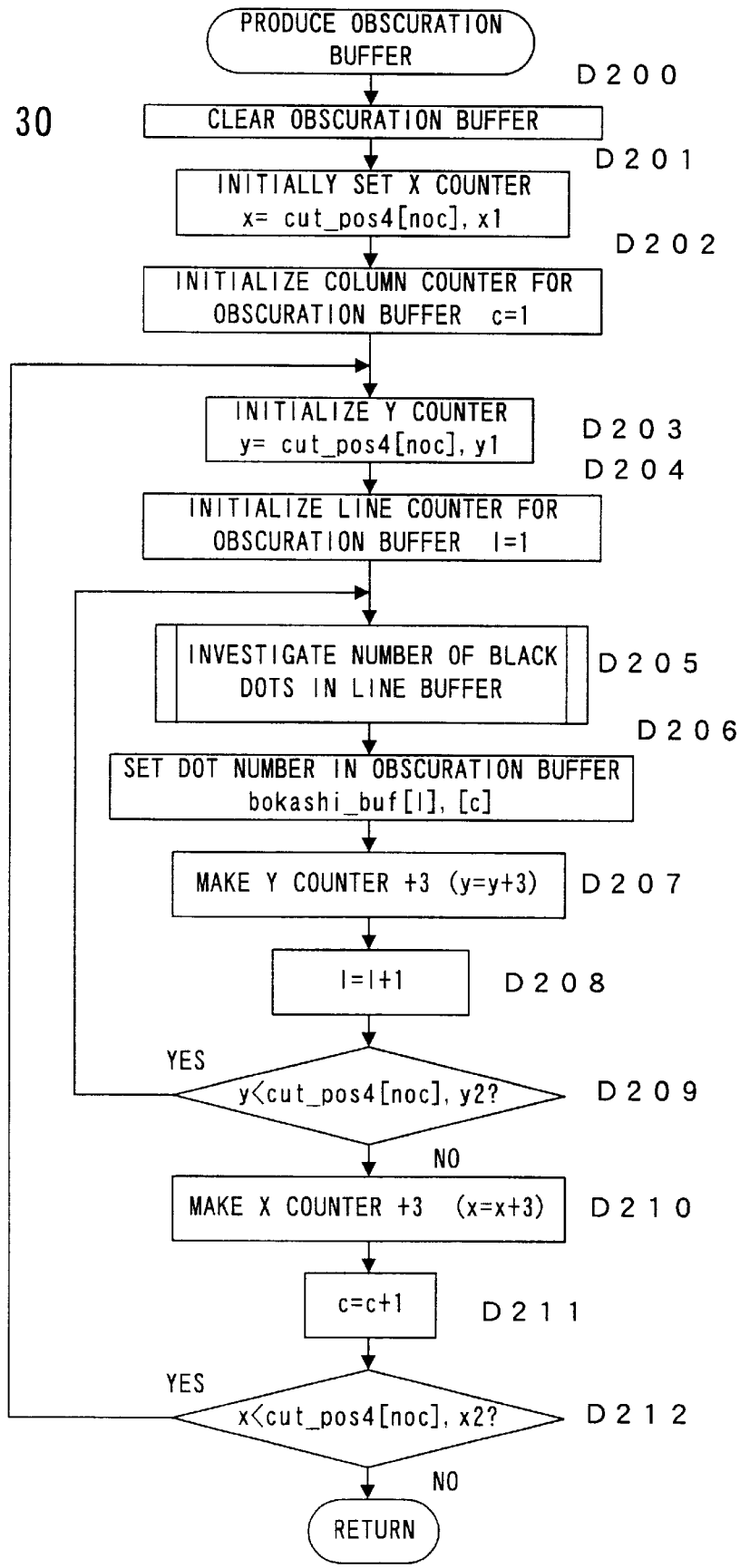
FIG. 30 is a flowchart showing an operation for producing an obscuration buffer.

A specific method for producing such the obscuration buffer is shown in FIG. 30. In a first step D200 of FIG. 30, the obscuration buffer is cleared. In a next step D201, the X counter is initially set with referring to the fourth character cut-out table (x=cut-pos4[noc], x1). That is, the left end position x1 of noc-th character indicated by the counter "noc" in the fourth character cut-out table is set in the X counter. Next, in a step D202, a column counter "c" for designating a column of the obscuration buffer is initially set as "1". In a next step D203, the Y counter is initially set with referring to the fourth character cut-out table (y=cut-pos4[noc], y1). That is, the upper end position y1 of noc-th character indicated by the counter "noc" in the fourth character cut-out table is set in the Y counter. Then, in a step D204, a line counter "1" for designating a line of the obscuration buffer is initially set as "1".

If respective counters are thus initially set, in a next step D205, the number of the black dots within "3×3" dots having a center of a position X, Y in the line buffer is investigated. Specifically, a subroutine shown in FIG. 28 is executed. Therefore, at a time that the step D205 is executed, the number of the black dots in the 3×3 area has been detected Therefore, in a step D206, the number of the black dots is written in an area of the buffer (bokashi-buf[1], [c]) designated by the line counter and the column counter.

The Y counter is incremented in a succeeding step D207, and the line counter is incremented in a step D208. Then, in a step D209, it is determined whether or not one column is completed, that is, it is determined whether or not y<cut-pos4[noc], y2. If "YES" is determined, the process returns to the previous step D205; however, if "NO" is determined, by executing next steps D210 and D211, the X counter and the column counter are incremented, respectively. Then, in a next step D212, it is determined whether or not one character of the rough character has not been completed, that is, it is determined whether or not x<cut-pos4[noc], x2. If "NO", that is, if one character is completed, the process returns to the previous step D3 (FIG. 29); however, if "YES", the process returns to the previous step D203.

Thus, in the step D2, the number of the black dots of the 9-dot area having a center at a reference point which is sequentially deviated in the X direction and the Y direction by 3 bits from a starting point the position X1, Y1 in the line buffer on the basis of the rough positions x1, x2, y1 and y2 of the noc-th character being stored in the fourth character cut-out table, and the data of the number of the black dots is sequentially stored in the obscuration buffer.

Figure 29:
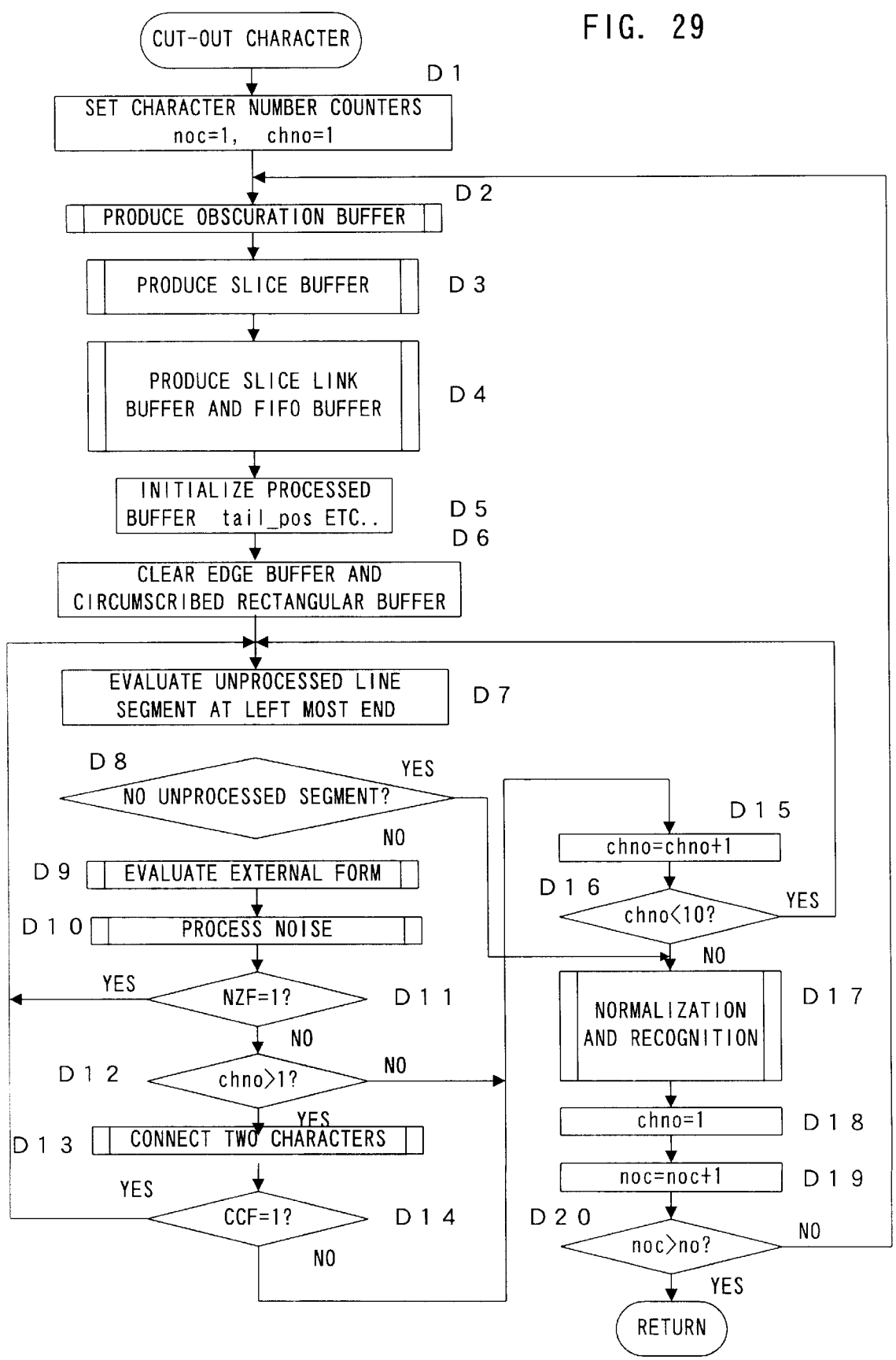
FIG. 29 is a flowchart showing a schematic operation for cutting-out the character.

Succeedingly, in a step D3 of FIG. 29, a slice buffer (slice-buf) is produced. The slice buffer is a buffer of 10×40×6 byte, for example, for holding all the line segments indicated by the black dots by scanning the obscuration buffer in the X direction. Each of the line segments is indicated by the left end position x1, the right end position x2 and the total dot number "sum". A specific method for producing such the slice buffer is shown in FIG. 31.

Figure 31:
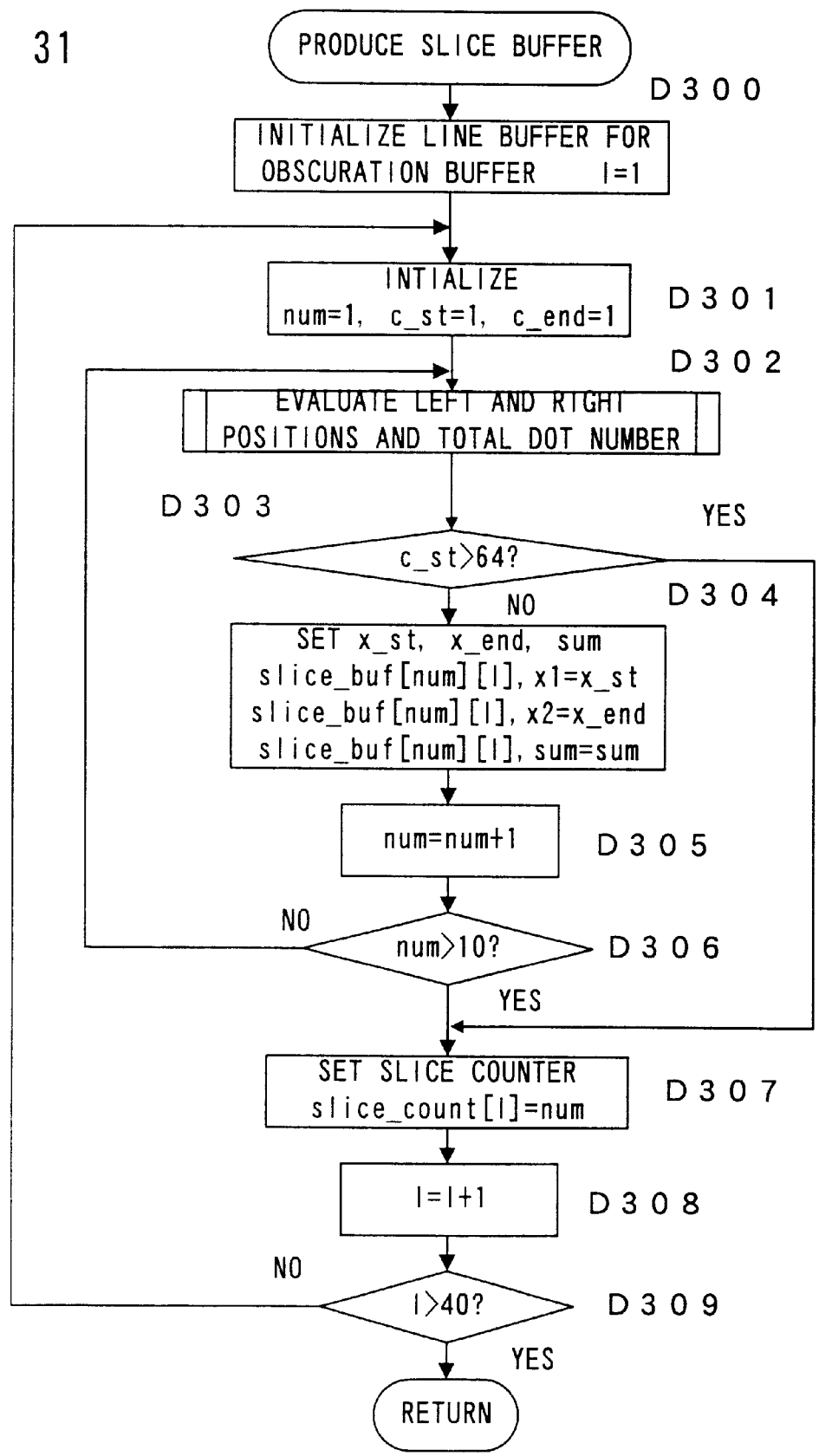
FIG. 31 is a flowchart showing an operation for producing a slice buffer.

In a first step D300 of FIG. 31, the line counter "1" for the obscuration buffer is initially set as "1". In a next step D301, X direction line segment number "num", start column "c-st" and end column "c-end" of the obscuration buffer, which specifies the line segment, are initially set. That is, num=1, c-st=1 and c-end=64 are set.

Figure 32:
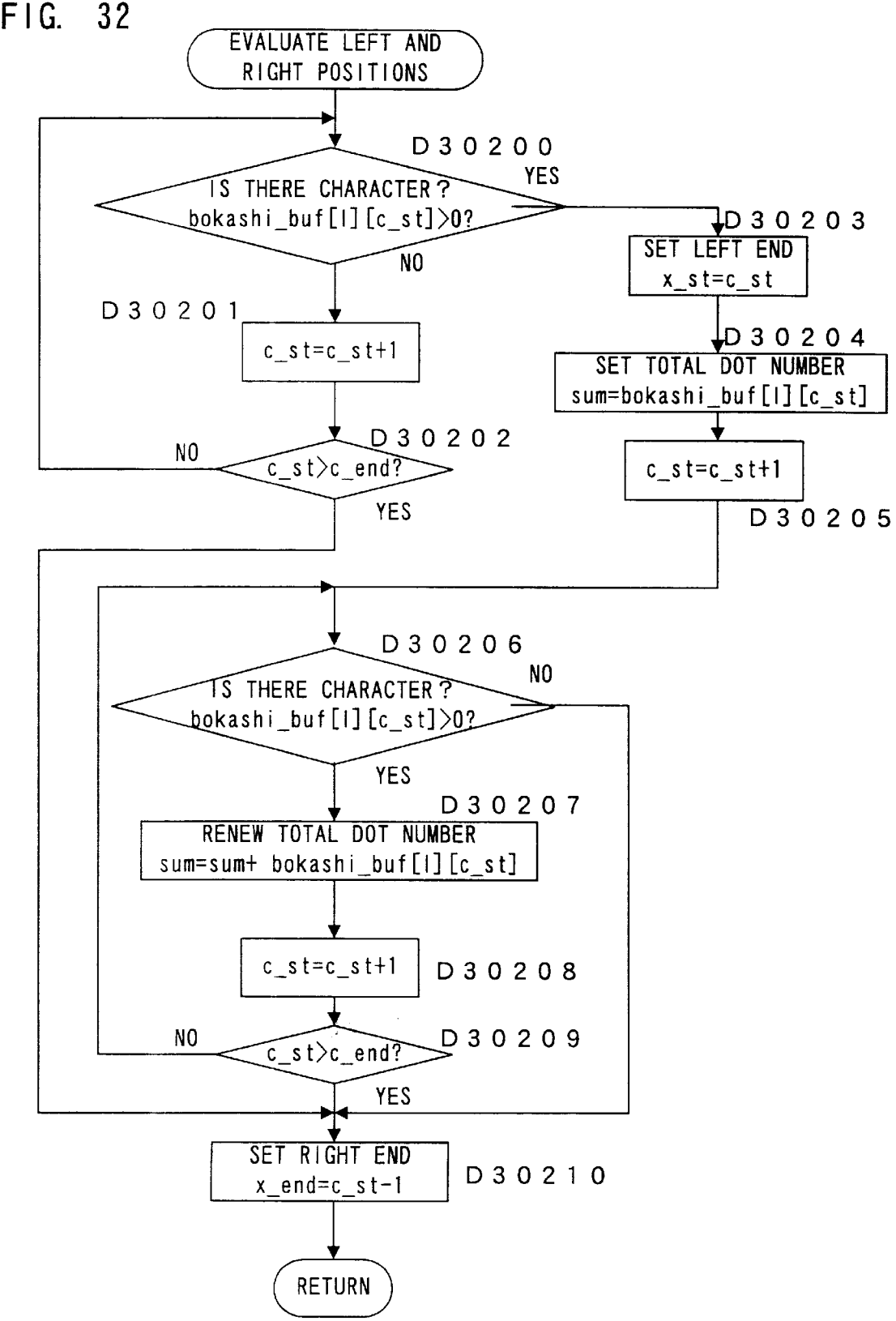
FIG. 32 is a flowchart showing an operation for evaluating the horizontal or row direction position.

In a next step D302, the left and right positions and the total dot number are evaluated. More specifically, in a first step D30200 in a subroutine shown in FIG. 32, it is determined whether or not there is a character in the line and the column of the obscuration buffer set by the step D300 and D301, that is, it is determined whether or not bokashi-buf[1], [c-st]>0. If there is no character, in a succeeding step D30201, the column counter is incremented (c-st=c-st+1), and it is determined whether or not the count value of the column counter exceeds the end column "c-end" in a stop D30202. That is, in the step D30200, it is detected whether or not there is a character from the start column to the end column.

If the character is detected in the step D30200, in a next step D30203, the count value of the column counter at that time is set in "x-st" as the character left end (x-st=c-st). Succeedingly, in a step D30304, the total dot number is set (sum bokashi-buf[1], [c-st]).

In a next step D30205, the column counter is incremented (c-st=cst+1). Then, in a step D30206, as similar to the step D30200, a character is detected. If there is a character, in a next step D30207, data (bokashi[1], [c-st]) at c-th column position of the first line in the obscuration buffer is added to the total dot number "sum", and in a step D30208, the column counter is incremented (c-st=c-st+1). Then, in a step D30209, it is determined whether or not the count value of the column counter exceeds the end column "c-end". That is, in the step D30206, it is detected whether or not there is a character from the start column to the end column.

If "YES" is determined in each of the both steps D30202 and D30209, or if "NO" is determined in the step D30206, in a last step D30210, the character right end is set in "x-end" (x-end=c-st−1).

Thus, in the step D302 (FIG. 31), the left and right positions and the total dot number are detected. Thereafter, in a step D303, it is determined whether or not the columns till the end column, i.e. the right end column in the obscuration buffer have been investigated. If "NO", in a next step D304, the left end "x-st", the right end "x-end" and the total dot number "sum" are set in the slice buffer. Thereafter, in a step D305, the number of the line segments being successive in the X direction, i.e. the line segment number "num" is incremented, and in a step D306, it is determined whether or not the line segment number "num" exceeds "10" that is a maximum number capable of being set. If "NO" is determined in the step D306, the process returns to the step D302.

If "YES" is determined in the step D306, that is, if the line segment number exceeds the maximum number, in a step D307, a slice number of the line segments successive in the X direction, i.e. a slice count "slice-count" is set with respect to the Y positions of the slice buffer according to the line segment number "num". The line counter for the slice buffer is incremented (l=l+1) in a step D302, and in a step D309, it is determined whether or not the count value of the line counter exceeds "40". If the count value does not reach 40-th line, the process returns to the previous step D301, and if reached, a process returns to FIG. 29.

Thus, in the step D, the left end, the right end and the total dot number of each of the line segments specified by the line segment number "num" are stored in the slice buffer.

In a next step D4 of FIG. 29, the superposition in the X direction of the respective line segments are investigated for all the line segments above and below a given line, and a slice link buffer and a FIFO buffer are produced. The FIFO buffer (fifo-buf) is an arrangement of 160×2 byte, for example, by which the position in the slice buffer is indicated, and if there is no data, "x=−1, FF" is set, and if the data has been processed, "x=2, FE" is set. The slice link buffer (slice-lnk) is an arrangement of 10×40×2 byte, for example, and utilized for performing access from the slice buffer to the FIFO buffer.

Figure 33:
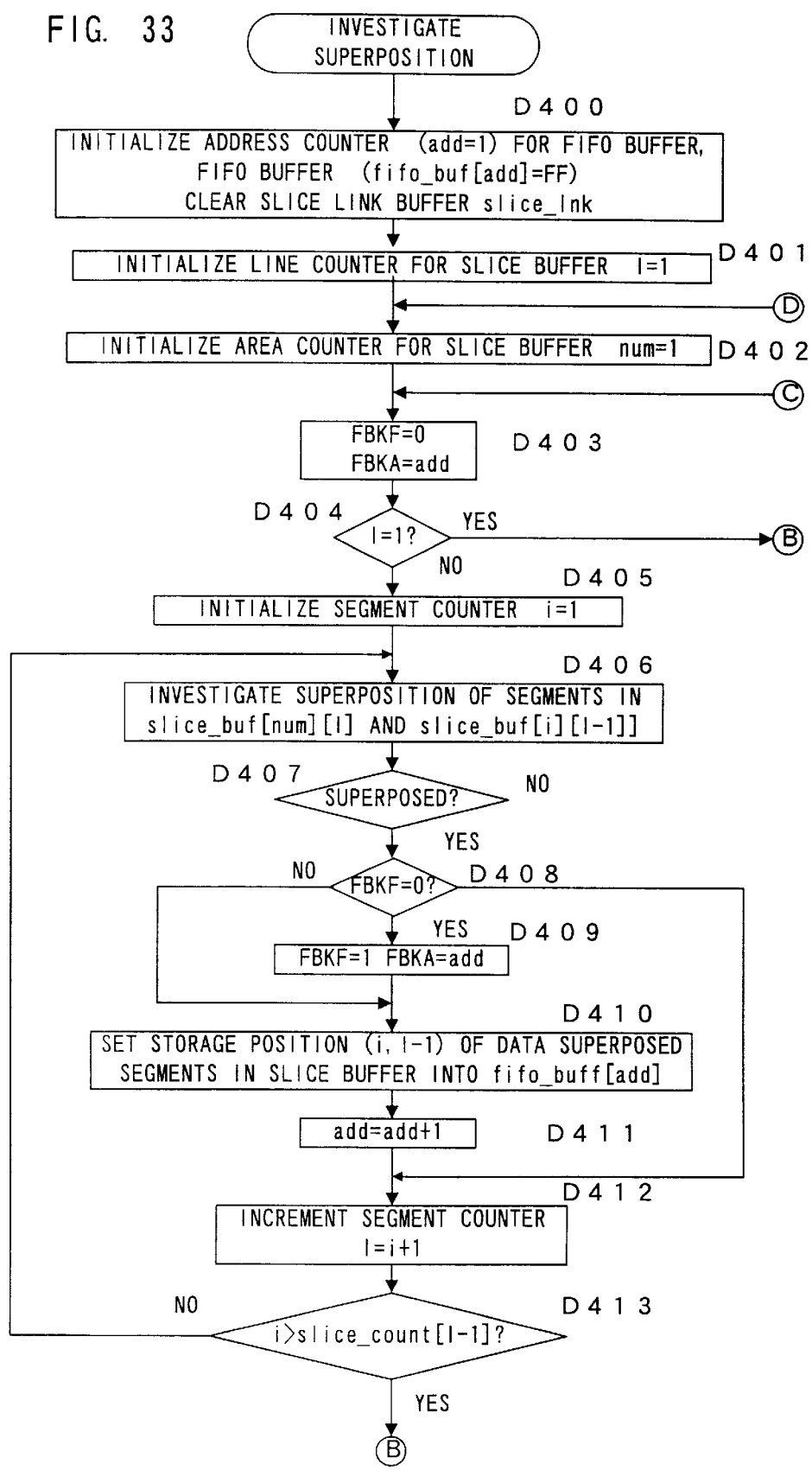
FIG. 33 and FIG. 34 are flowcharts showing an operation for investigating a superposition of segments.

A method for investigating the superposition of the line segment is shown in FIG. 33. In a step D400 in FIG. 33, an address counter "add" for the FIFO buffer is initialized as add=1, and all addresses of the FIFO buffer are initially set as FF (no character), and the slice link buffer (slice-lnk) is cleared. In a next step D401, the line counter "l" for the slice buffer is initially set as "1", and in a step D402, the area counter "num" for the slice buffer is initially set as "1". Then, in a step D403, a FIFO buffer storing flag FBKF is reset, and a FIFO buffer storage starting area FBKA is initially set by the address "add".

In a step D404, it is determined whether or not the line is an uppermost line, i.e. the first line. If the first line, the process proceeds to a step D414 (described later) because there is no line above the line; however, at the line of or after the second line, the process proceeds to a step D405.

In the step D405, the count value i for the X line segment counter which is indicative of the number of the line segments in one line is initially set as "1". Then, in a step D406, the superposition of the line segment in the present line being stored in the slice buffer (slice-buf[num][1]) and the line segment in a line just above the present line (slice-buf[i][l−1]) is investigated. It is possible to simply determine whether or not the line segments are superposed on each other by comparing the column positions of the respective line segments. Then, in a step D407, it is determined whether or not the line segment in the present line and the line segment in the just above line are superposed on each other on the basis of such a comparison result.

If there is the superposition, in a step D408, it is determined whether or not the FIFO buffer storing flag FBKF is reset. If the flag FBKF is reset, in a next step D409, the flag FBKF is set, and the FIFO buffer storage starting area FBKA is set with the address "add". Then, the process proceeds to a next step D410. In addition, if it is determined whether or not there is no superposition in the step D407, the process proceeds to a step D412.

In the step D410, a storage position (i, l−1) in the slice buffer for the line segment data by which the superposition occurs as described above is written in an area designated by the address "add" in the FIFO buffer (fifo-buf[add]). Then, in a step D411, the address "add" is incremented, and the count value i for the X line segment counter is incremented in a step D412. In a next step D413, on the basis of the count value, it is determined whether or not the count value of the X line segment counter becomes larger than the slice count slice-count [l−1], that is, it is determined whether or not the check of the superposition for all the line segments in the just above line is completed.

Figure 34:
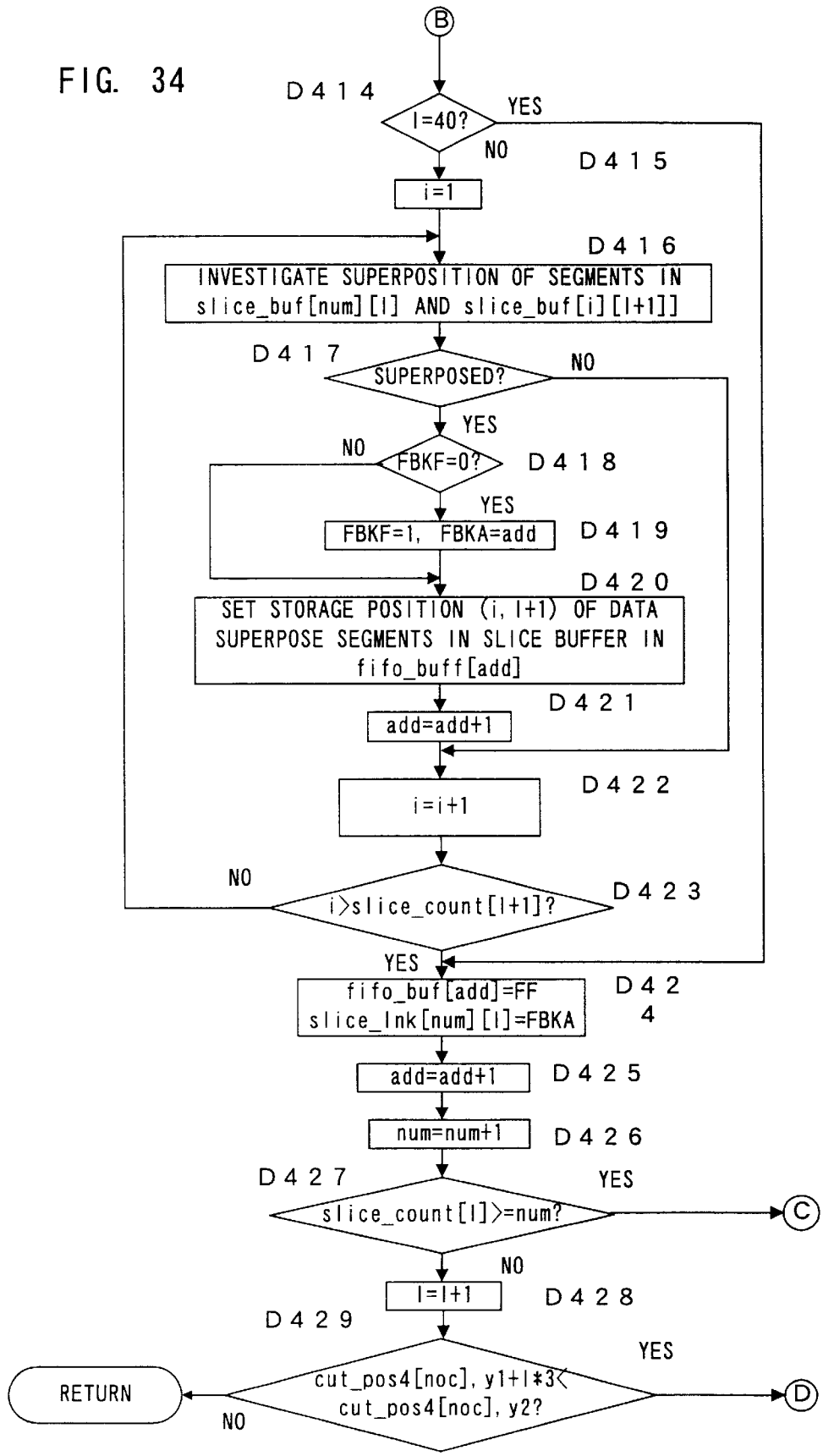

In a step D414 shown in FIG. 34, it is determined whether or not the present line is the lowermost line, i.e. the last line. If the present line is not the last line, by executing steps D415 to D423, the superposition of the line segments in the present line and the line segment in a just below line (slice-buf[i][l+1]) is investigated. That is, the steps D415 to D423 are the same as the steps D405 to D423 except that the line in which the superposition is to be investigated is the just below line. Therefore, a duplicate description will be omitted here.

After the step D423, a step D424 is executed. In addition, if it is determined that the present line is the last line in the step D414, the process proceeds to a step D424 without executing the steps D415 to D423 because there is no line below that line.

In the step D424, "FF (no character)" is written in a corresponding address of the FIFO buffer as the punctuation, and a head position of the slice link buffer is set (slice-lnk [num][1]=FBKA). Thereafter, the address "add" is incremented in a step D425, and the count value "num" of the area counter is incremented in a step D426.

In a step D427, it is determined whether or not the detection of the superposition of the line segment exists at the right end in the target line, i.e. the present line is completed, that is, it is determined whether or not slice-count[1]≧num. If the detection of the superposition for the right end line segment in the present line is not completed, the process returns to the step D403, and by repeatedly executing the above described steps, the detection of the superposition with respect to a next line segment in the target line (present line) is performed.

If the check of the superposition for the right end line segment in the target line is completed, in a next step D428, the line counter is incremented (l=l+1).

Then, in a next step D429, it is determined whether or not the process has been completed till the lower end of the superposition area, that is, it is determined whether or not cut-pos4[noc], y1+1×3<cut-pos4[noc], y2. If the process did not proceed to the lower end of the superposition area, the process returns to the previous step D402, and the area counter "num" is initialized. However, if the process proceeds to the lower end of the superposition area, the process returns to a step D5 shown in FIG. 29.

In the step D5 of FIG. 29, a processed buffer (tail-pos) and etc. are initialized. In addition, in the processed buffer (tail-pos[1]), a processed X direction position for each line within the obscuration buffer at a time that a connection processing (step D13: described later) has been completed is stored.

In a step D6, an edge buffer and a circumscribed rectangular buffer are cleared. The edge buffer is indicated by edge-pos[1][chno], and the circumscribed rectangular buffer is indicated by rect-pos[chno]. The edge buffer is of 10×40×6 byte, and in the edge buffer, the left and right end positions (x1, x2) of the black dots for each line within the obscuration buffer of a series of line segments constituted by the line segments being in a connection relationship, that is, the line segments determined to constitute one character and the total dot number "sum" within the range of the line segments are stored. The circumscribed rectangular buffer is of 10×40×10 bytes, for example, and in the rectangular buffer, left and right sides (XL, XR) and upper and lower sides (XU, XL) of the circumscribed rectangular within the obscuration buffer of the line segments that are determined to constitute one character, and the total dot number "sum" of the series of the line segments, and a lowermost end positions (y-min, y-max) at which the black dot exists in the left and right sides are stored.

Then, in a step D7, with utilizing the processed buffer (tail-pos), the line segment which exists a most left end and has not been processed (unprocessed line segment) is evaluated from the slice buffer. In a next step D8, it is determined whether or not there is an unprocessed line segment. In a case where there is no unprocessed line segment, the process proceeds to a step D17 (described later); however, if there is an unprocessed line segment, in a next step D9, an external form of the character constituted by the line segrnent is evaluated.

Figure 35:
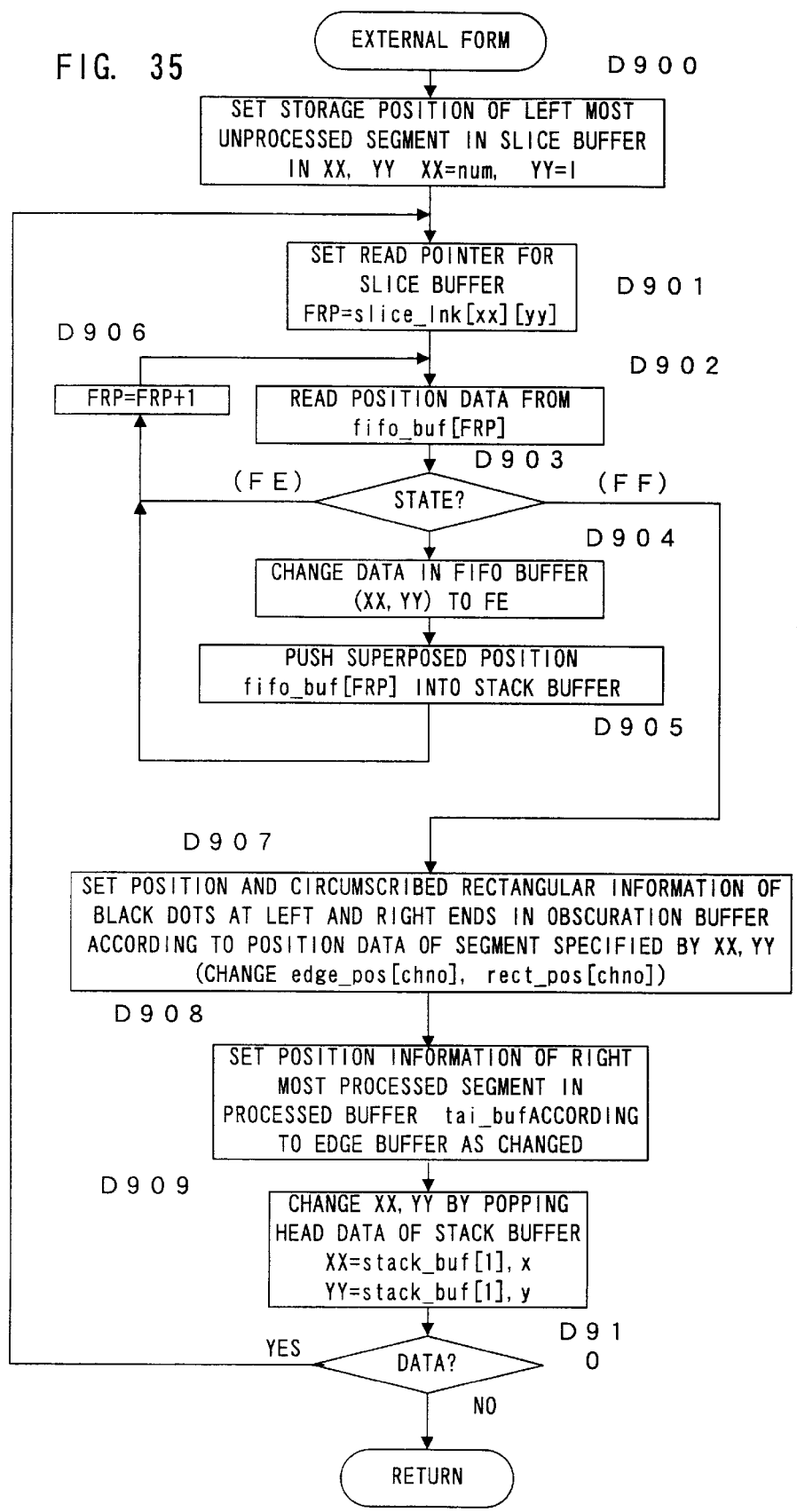
FIG. 35 is a flowchart showing an operation for evaluating an external form of the character.

Specifically, in a step D900 of FIG. 35, first, storage positions of the unprocessed line segment in the slice buffer are set in the X, Y positions xx, yy. That is, "num" for the slice buffer is set as "xx" and "1" for the slice buffer is set as "yy". In a step D901, a read pointer FRP for the FIFO buffer is set (FRP=slice-link[xx][yy]). The read pointer FRP is a head address of the FIFO buffer into which the data of the line segment superposed on the unprocessed line segment is stored. Then, in a step D902, the position data of the FIFO buffer designated by the read pointer FRP is read. In a next step D903, a state of the superposition is checked. if there is data of the superposed fine segment, in a step D904, the data at the position (xx, yy) of the FIFO buffer is changed to "FE" indicating that the data has been processed, and in a step D905, the position at which the superposition of the line segments occurs is pushed into a stack buffer. In addition, the stack buffer is a buffer of a FILO (First-In-Last-Out), and indicated by (stack-buf). The stack buffer stores an arrangement indicative of the positions of the slice buffer with 64×2 byte, for example.

In addition, if the step D905 is completed, the read pointer FRP is incremented in a step D906, and the process returns to the step D902 as similar to a case where the process for the superposition has been completed (FE)

If "FF (no data)" is detected in the step D903, in a step D907, the black dot positions at the left and right ends in each line in the obscuration buffer and the information of the circumscribed rectangular are set according to the position data of the line segment specified by xx, yy at that time. That is, "edge-pos[chno]" and "rect-pos[chno]" are changed. Then, in a step D908, on the basis of a content of the edge buffer being changed, a position of the line segnent which has been processed and exists at a most right end in each line is set in the processed buffer (tail-pos).

Next, in a step D909, the data at a head of the stack buffer is popped to change xx, yy. That is, (xx=stack-buf[1], x) and (yy=stack-buf[1], y) are set. In a next step D910, it is determined whether or not there is data from the stack buffer being popped. Then, if there is data, the process returns to the step D901 for repeating the above described process, and otherwise, the process returns to FIG. 29.

Thus, in the step D9, by searching a series of line segments having the connection relationship with respect to the line segment existing at the most left end (basic line segment) out of the unprocessed line segments found in the step D7 in the FIFO buffer, the information of the storage position [num][1] of the line segment in the slice buffer is sequentially stored in the stack buffer, and the storage position data specifying the above described basic line segment is changed to "FE (processed)", and further, on the basis of the xx, yy values at the present time, the edge buffer and the circumscribed rectangular buffer are modified.

Figure 36:
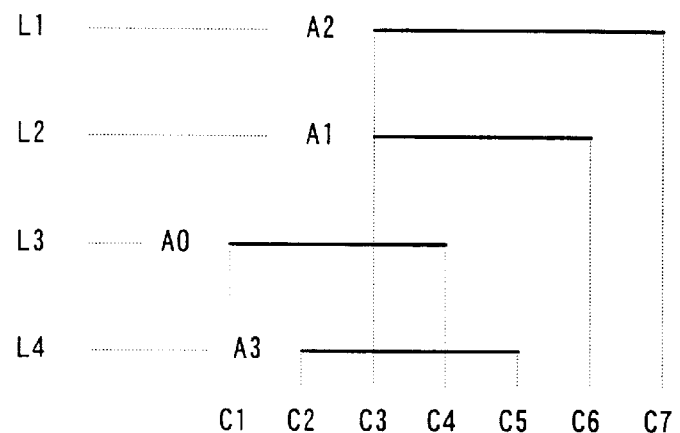
FIG. 36 to FIG. 41 are illustrative views respectively showing specific operations for evaluating the external form of the character.
Figure 37:
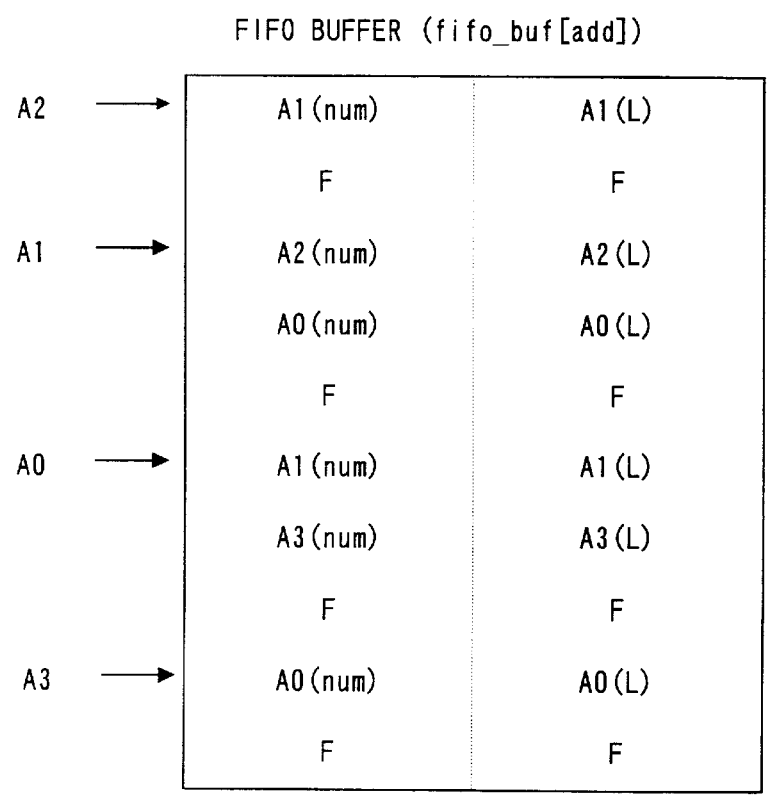

Now, with referring to a specific example of FIG. 36, a way how the respective buffers are changed. FIG. 36 indicates the respective line segments in the obscuration buffer, and when the respective line segments A0, A1, A2 and A3 are in such a positional relationship, data shown in FIG. 37 are stored in the FIFO buffer. Now, the line segment A0 is "basic line segment". If the steps D902 to D910 are executed, the buffers are changed as described below, and a new stack buffer is produced.

Figure 38:
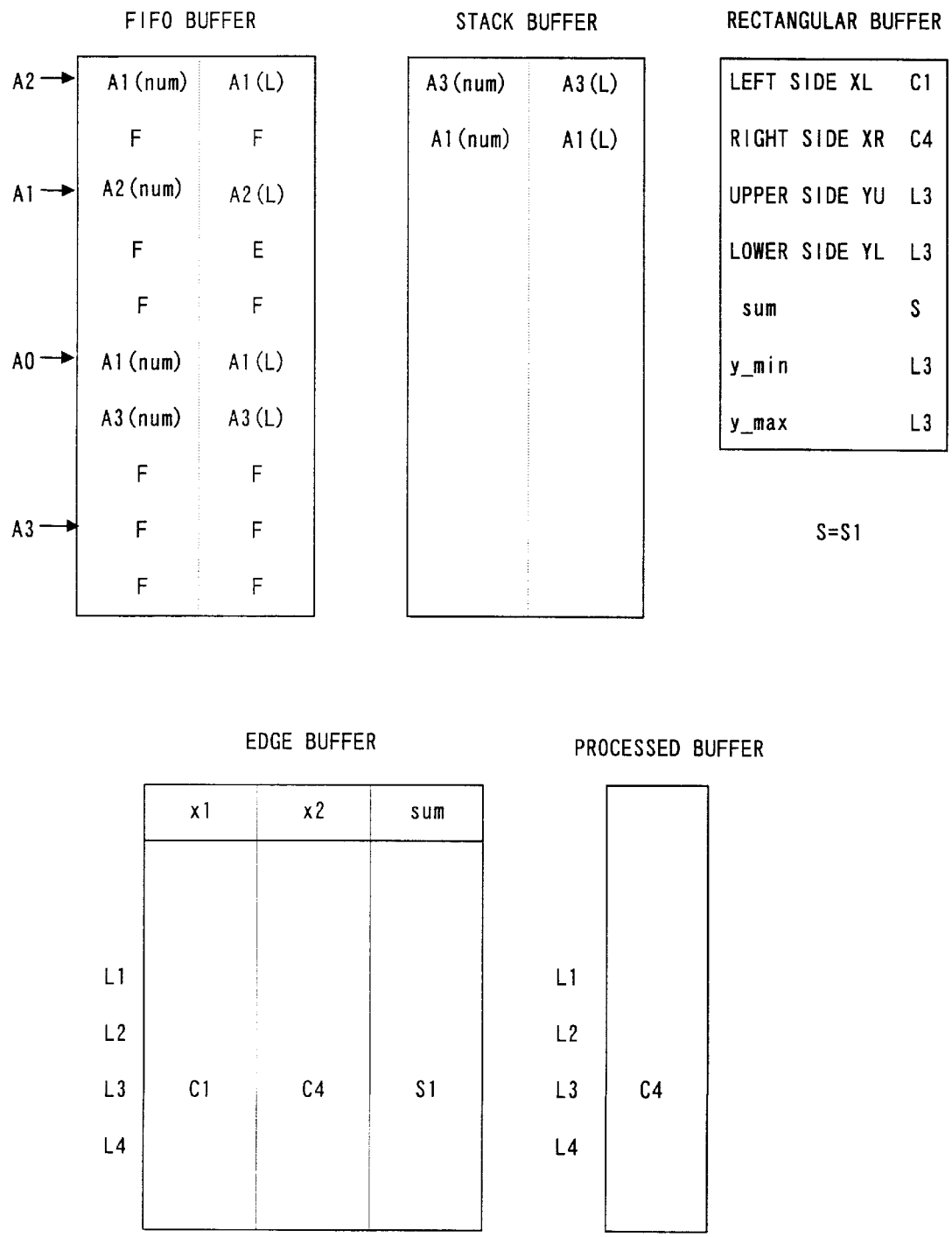

FIG. 38 shows contents of the respective buffers at a time that the data stored in the FIFO buffer in corresponding to the basic line segment A0 are stacked into the stack buffer through the execution of the steps D902 to D906, and thereafter, the steps D907 and D908 are executed. Now, the data specifying the basic line segment A0 in the FIFO buffer is changed to "FE" indicative of the processed data. Furthermore, the left side XL and the right side XR of the circumscribed rectangular buffer are set with the start end and the end end of the line segment A0, and the upperside YU and the lower-side YL are set with the line position of the line segment A0. Then, in the processed buffer, the right end of the line segment A0 in the third line is set.

Figure 39:
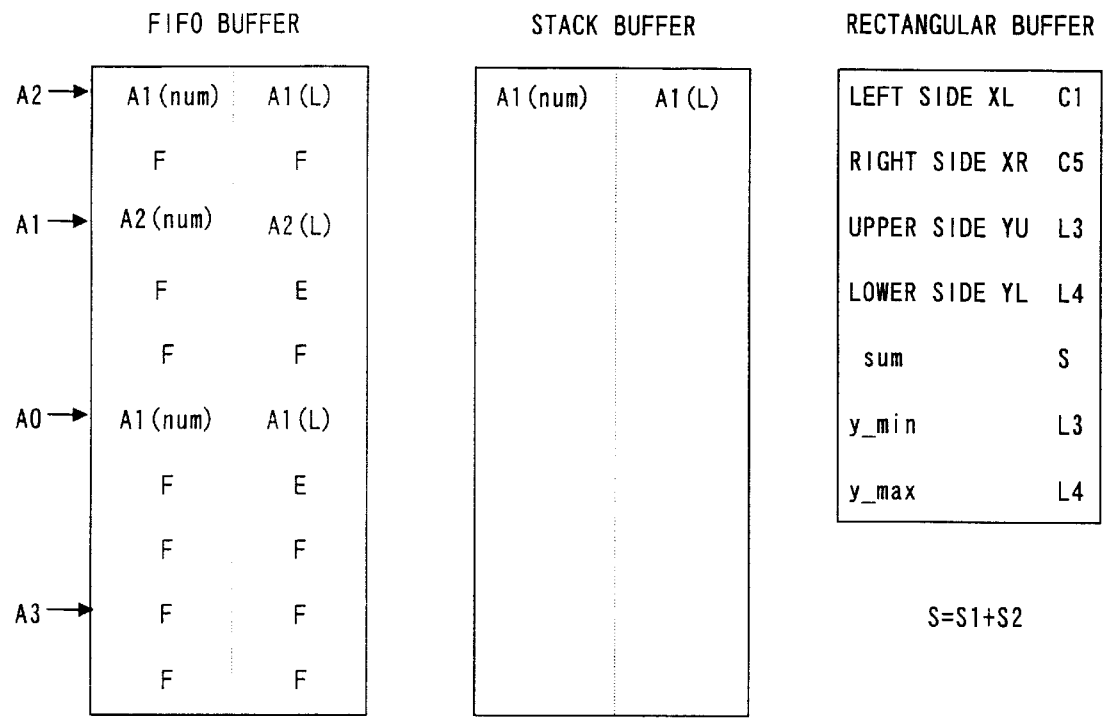

FIG. 39 shows the contents of the respective buffers at a time that after the processing of FIG. 38, xx, yy are changed with the data corresponding to the line segment A3 at the head of the stack buffer in the step D909, and thereafter, the steps D907 and D908 are executed again. Now, the data specifying the line segment A3 having the connection relationship to the basic line segment A0 in the FIFO buffer is changed to "FE" indicating that the data has been processed. Furthermore, in the right side XR of the circumscribed rectangular buffer, the end end of the line segment A3 is set, and the line position of the line segment A3 is set in the lowerside YL. Then, in the processed buffer, the right end of the line segment A3 in the fourth line is set. In the fourth line of the edge buffer, the left and right ends of the line segment A3 are set.

Figure 40:
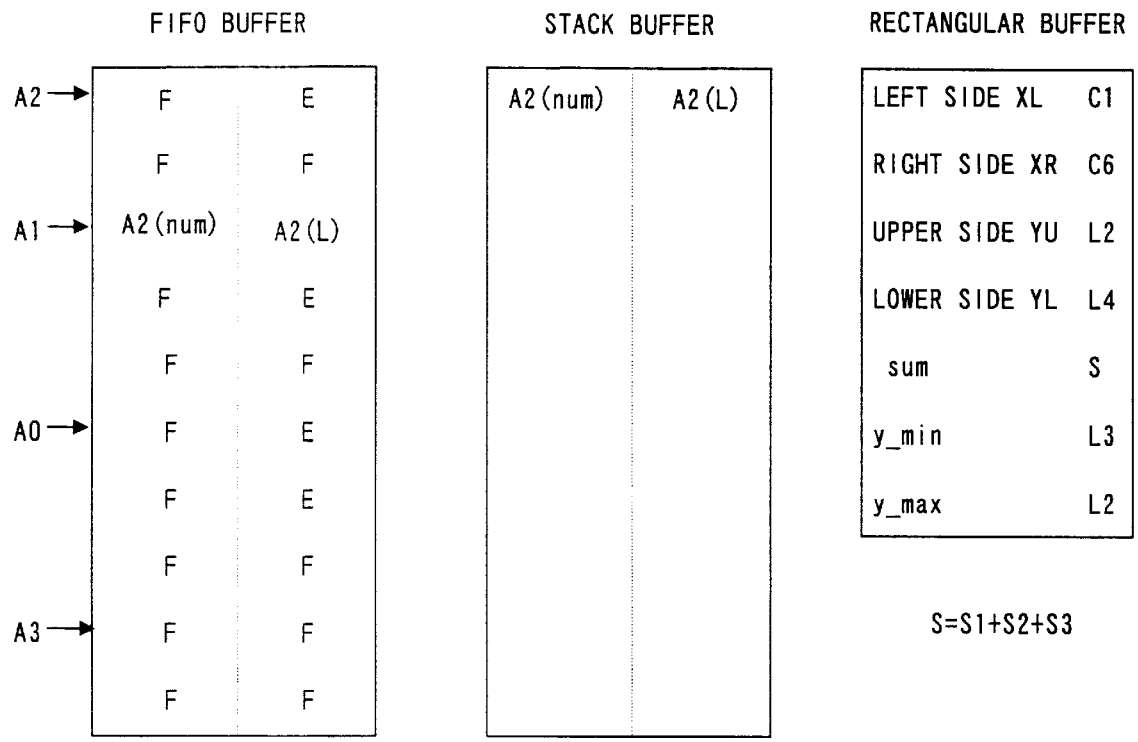

FIG. 40 shows the contents of the respective buffers at a time that after the processing of FIG. 39, xx, yy are changed with the data corresponding to the line segment A1 at the head of the stack buffer in the step D909, and thereafter, the steps D907 and D908 are executed again. Now, the data specifying the line segment A1 having the connection relationship to the basic line segment A0 in the FIFO buffer is changed to "FE" indicating that the data has been processed. Furthermore, in the right side XR of the circumscribed rectangular buffer, the end end of the line segment A1 is set, and the line position of the line segment A1 is set in the upperside YU. Then, in the processed buffer, the right end of the line segment A1 in the second line is set. In the second line of the edge buffer, the left and right ends of the line segment A1 are set.

Figure 41:
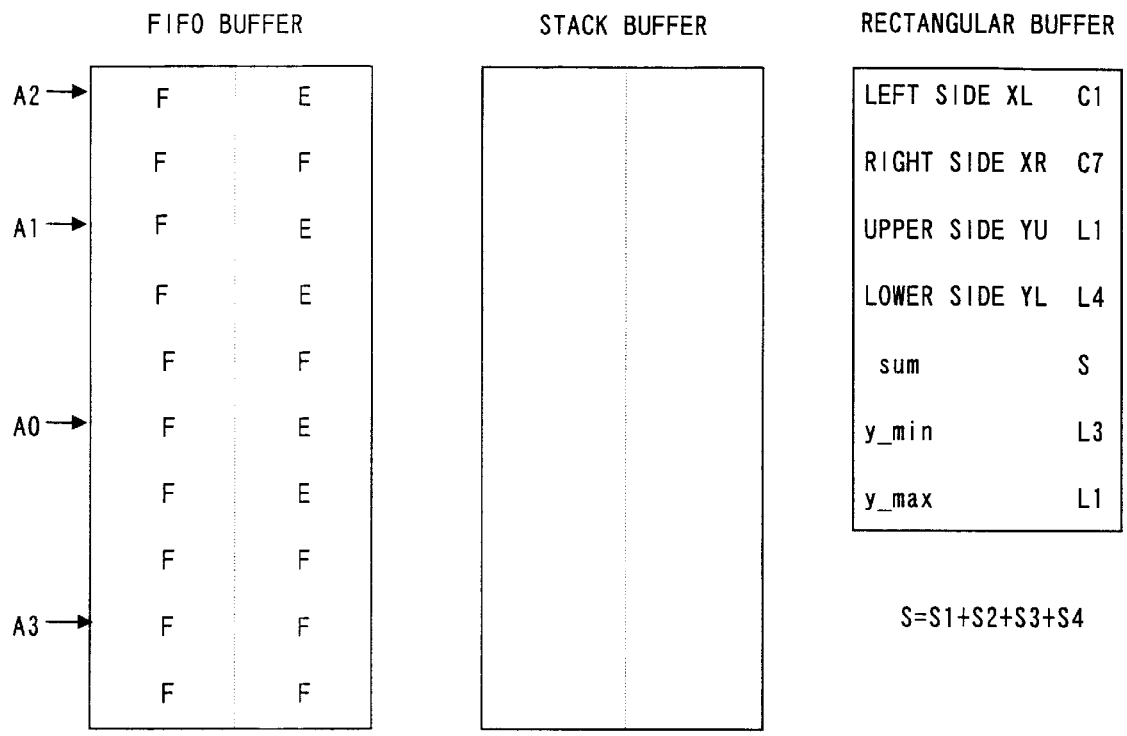

FIG. 41 shows the contents of the respective buffers at a time that after the processing of FIG. 40, xx, yy are changed with the data corresponding to the line segment A2 at the head of the stack buffer in the step D909, and thereafter, the steps D907 and D908 are executed again. Now, the data specifying the line segment A2 having the connection relationship to the basic line segment A0 in the FIFO buffer is changed to "FE" indicating that the data has been processed. Furthermore, in the right side XR of the circumscribed rectangular buffer, the end end of the line segment A2 is set, and the line position of the line segment A2 is set in the upperside YU. Then, in the processed buffer, the right end of the line segment A2 in the first line is set. In the first line of the edge buffer, the left and right ends of the line segment A2 are set.

Figure 42:
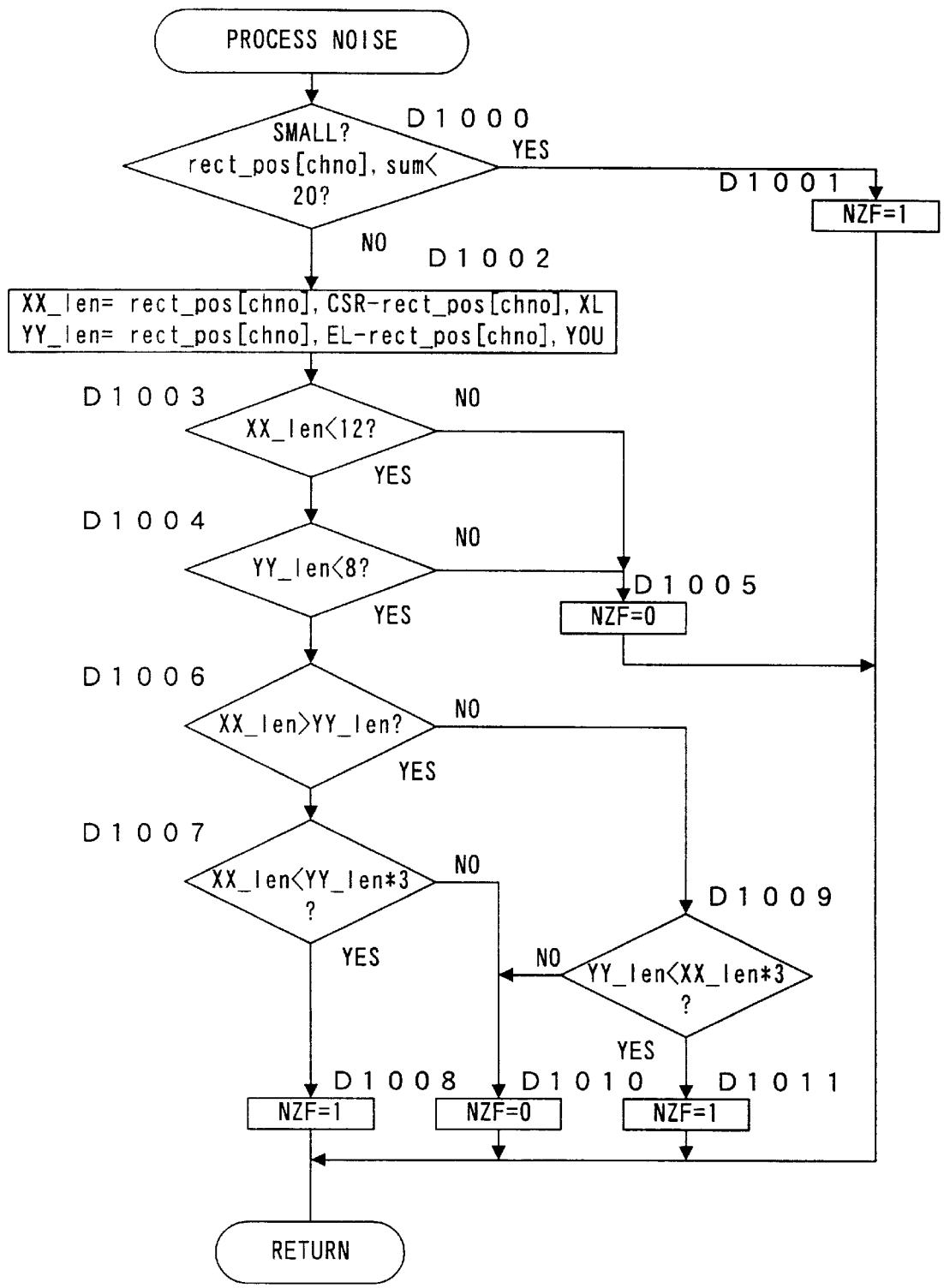
FIG. 42 is a flowchart showing an operation for processing a noise of one character.

In a step D10 shown in FIG. 29, a noise processing for one character is performed. More specifically, in a subroutine shown in FIG. 42 in which the noise processing is shown in detail, it is determined whether or not a character candidacy constituted by the series of the line segments having the connection relationship and processed in the step D9 is a noise, and if the noise is determined, in a step D1001, D1008 or D1011, a noise flag NZF is set, and if not noise, in a step D1005 or D1010, the noise flag NZF is reset, and then, the process returns to FIG. 29 routine.

Specifically, it is determined whether or not the character is a small character having the total dot number "sum" less than 20 dots in a step D1000, and on the basis of the data of the circumscribed rectangular buffer read in a step D1002, in steps D1003 and D1004, it is determined whether or not a horizontal or row direction width and the vertical or column direction width are less than predetermined values, respectively, and in steps D1006, D1007 and D1009, it is determined whether or not the character is a character having extremely long horizontal or row direction length or a character having extremely long vertical or column direction length. Then, in a case where the total dot number is less than the predetermined value or a case where the width are less than the predetermined values and the character is not a character having extremely long horizontal length or extremely long vertical length, the data is determined as the noise.

In a step D11 shown in FIG. 29, it is determined whether or not the noise flag NZF is set, if "YES", the process returns to the previous step D7. If "NO", in a succeeding step D12, it is determined whether or not the area is the superposed character area. If the area includes only one character, "NO" is determined in the step D12, and in a case where two or more characters are included in the area, "YES" is determined in the step D12, and therefore, process proceeds to a connection process of a next step D13.

In the connection process, the circumscribed rectangular buffer and the edge buffer are utilized. In a step D1300 shown in FIG. 43, it is determined whether or not a present character designated by the character number "chno" is smaller than a just before character designated by the character number "chno−1", being simply called as "before character". If the before character is smaller than the present character, the process proceeds to a step D1324 shown in FIG. 47 (described later). If the present character is larger than the before character, in a next step D1301, it is determined whether or not the present character exists above the before character. If "YES" is determined in the step D1301, the process proceeds to a step D1308 shown in FIG. 44 (described later). In a case where the present character does not exist above the before character in the step D1301, in a next step 31302, it is further determined whether or not the present character exists above a half of the before character. If "NO" is determined in the step D1302, the process proceeds to a step D1312 shown in FIG. 45 (described later). If "YES" is determined in the step D1302, in a succeeding step D1303, it is determined whether or not the left end of the present character exists at right side from the left end of the before character. If "NO", the process proceeds to a step D1317 shown in FIG. 46 (described later), and if "YES" is determined, the process proceeds to a step D1304.

In the step D1304, it is determined whether or not the circumscribed rectangular area including the before character and the present character is an area having the horizontal length longer than the vertical length. In a case of the area having long horizontal length, it is unnecessary to perform the connection process, and therefore, a connection flag CCF is reset in a step D1321 in FIG. 46, and then, the process returns to the main routine. In a case where the circumscribed rectangular area is the area having long vertical length, in a step D1305, it is determined whether or not the length of the circumscribed rectangular area by adding the present character and the before character to each other is equal to or less than double the average character length "b-x-mean". If "YES" is determined in the step D1305, the process proceeds to the step D1321 because the present character and the before character are to be separated from each other.

In a case where the length of the circumscribed rectangular area including the present character and the before character is equal to or smaller than double the average character length "b-x-mean", in a stop D1306, it is further determined whether or not the present character and the before character are superposed on each other by more than ¼ of the character. If "YES" is determined in the step D1306, that is, if the before character and the present character are superposed on each other by more than ¼, the process proceeds to a step D1322 of FIG. 46 (described later) because the both characters are to be connected to each other. Since the two characters are connected to each other, in the step D1322, it is necessary to modify the edge buffer and the circumscribed rectangular buffer.

Furthermore, if "NO" is determined in the step D1306, in a next step D1307, it is determined whether or not the X direction interval between the before character and the present character is equal to or larger than 1.5 mm. In a case where the interval between the both characters is smaller than 1.5 mm, the process proceeds to the step D1322 because the present character and the before character are to be connected to each other. In addition, if "YES" is determined in the step D1307, the two characters are to be separated from each other because the interval between the both characters is large, and therefore, in this case, the process proceeds to a step D1321.

Figure 44:
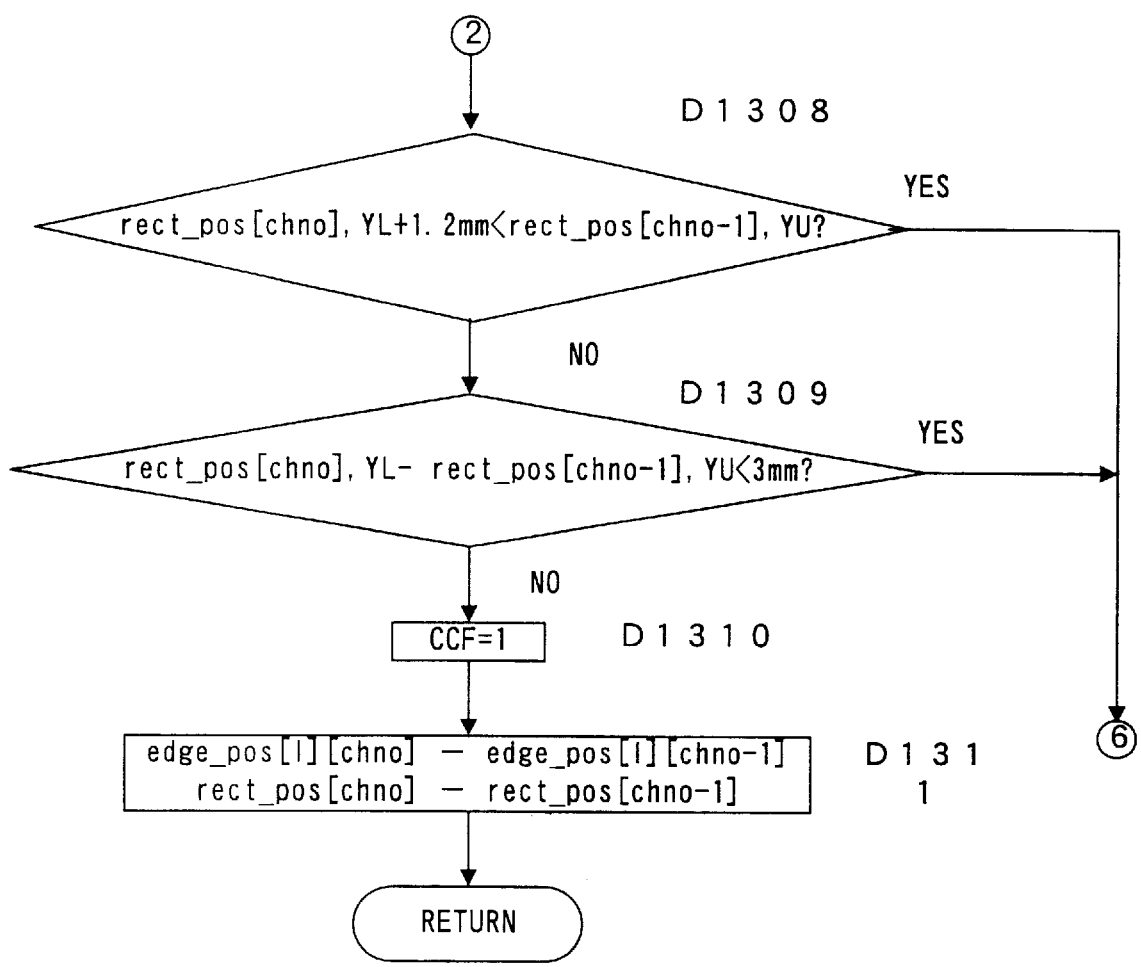

Next, in a step D1308 shown in FIG. 44, it is determined whether or not the present character exists above the before character by 1.2 mm or more. When "YES" is determined in the step D1308, the process proceeds to the step D1322 so as to connect the before character and the present character to each other. Then, if "NO" is determined in the step D1308, in a next step D3309, it is determined whether or not the interval between the before character and the present character is equal to or smaller than 3 mm. That is, it is determined whether or not the Y direction interval between the both characters is equal to or smaller than 24 dots. If "YES" is determined in the step D1309, the process proceeds to the step D1322. If "NO" is determined in the step D1309, the data of the before character, that is, the data of the circumscribed rectangular and the edge are discarded, and the connection flag CCF is set as "1" in a step D1310, and in a step D1311, the data of the present character, that is, the data of the circumscribed rectangular and the edge are re-written, and the process returns to the main routine.

Figure 45:
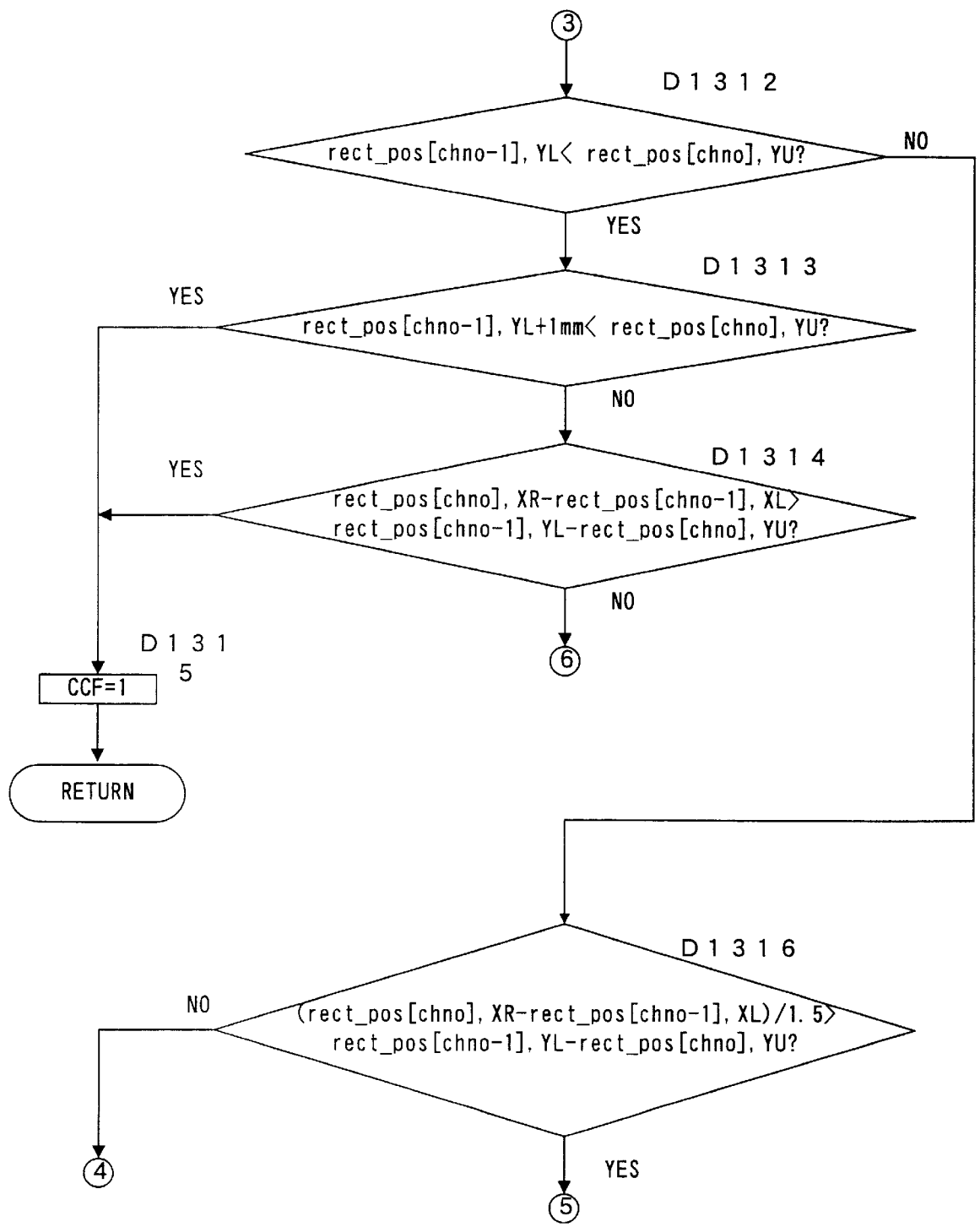
Figure 46:
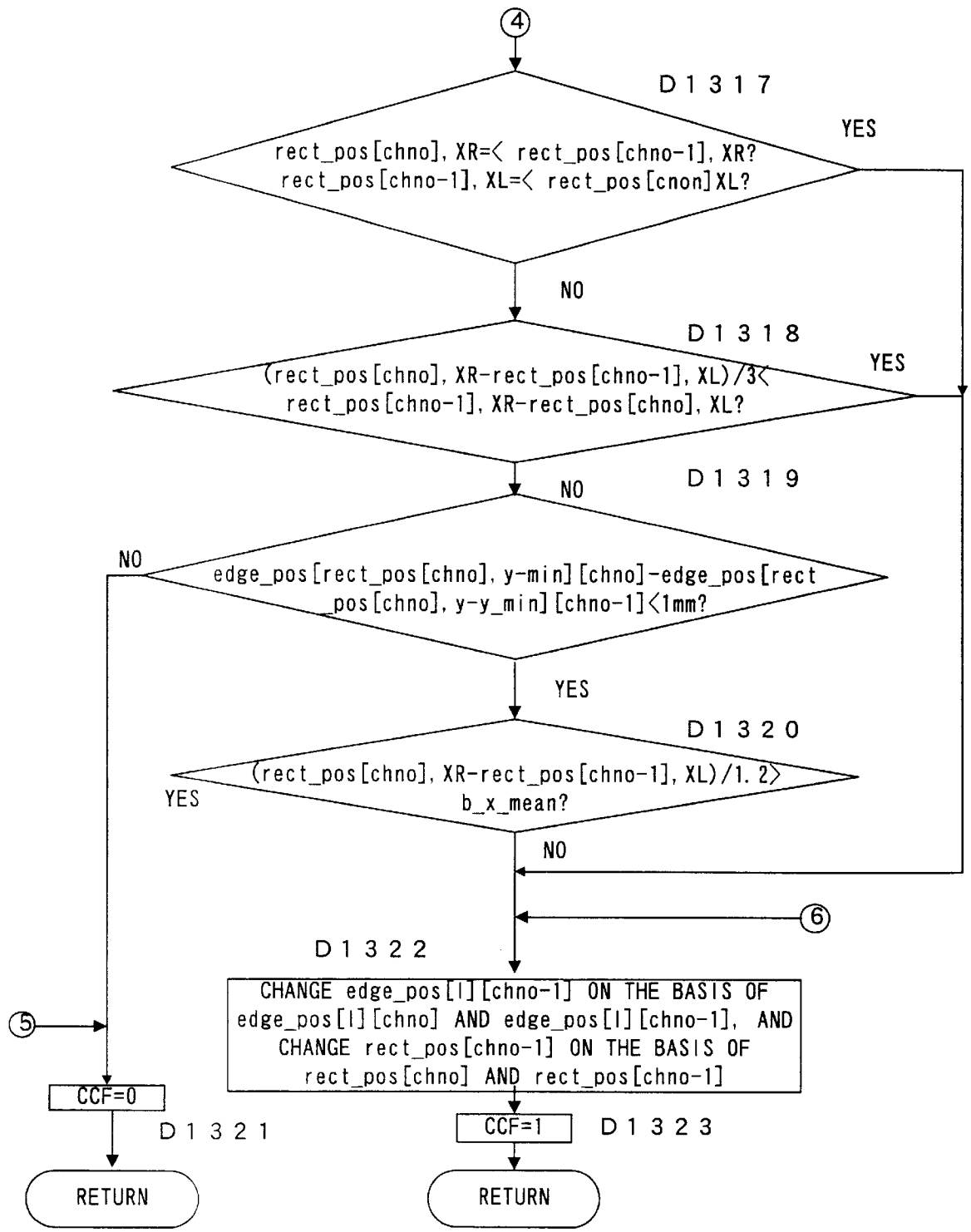

In a step D1312 of FIG. 45, it is determined whether or not the present character exists below the before character. If "YES" is determined in the step D1312, in a step D1313, it is determined whether or not the present character exists below the before character by 1 mm or more. If "YES" is determined in the step D1313, the connection flag CCF is set as "1" so as to discard the data of the edge and the circumscribed rectangular of the present character. If "NO" is determined in the step D1313, in a next step D1314, it is determined whether or not the circumscribed rectangular area including the present character and the before character is an area having the horizontal or X direction length longer than the vertical or Y direction length. If "YES" is determined in the step D1314, the process proceeds to a step D1315 so as to discard the data of the present character. In addition, if "NO" is determined in the step D1314, the process proceeds to the step D1322 so as to connect the present character and the before character to each other.

If "NO" is determined in the step D1312, that is, if it is determined that the present character does not exist below the before character, in a step D1316, it is whether or not the horizontal or X direction length of the circumscribed rectangular area including the present character and the before character exceeds 1.5 times the vertical or Y direction length. If "YES", the present character and the before character are to be separated from each other, and therefore, the process proceeds to the step D1321. In addition, if "NO", the process proceeds to a step D1317 of FIG. 46.

In the step D1317, it is determined whether or not the present character and the before character are superposed on each other in the X direction. If "YES" is determined in the step D1317, the both characters are to be subjected to the connection process, and therefore, the process proceeds to the step D1322 wherein the edge data and the circumscribed rectangular area data of the before character are re-written. Then, in a step D1323, the connection flag CCF is set as "1" to return to the main routine.

If "NO" is determined in the step D1317, in a step D1318, it is determined whether or not the present character and the before character are superposed on each other by ⅓ or more of the character. In a case where "YES" is determined in the step D1318, the connection process is also executed in the step D1322. If "NO", in a step D1319, it is further determined whether or not the Y direction interval between the present character and the before character is equal to or smaller than 1 mm. In a case where "NO" is determined in the step S1319, the both characters are, of course, to be separated from each other, and therefore, the process proceeds to the step D1321. Furthermore, if "YES" is determined in the step D1319, in a step D1320, it is determined whether or not the horizontal or X direction width of the circumscribed rectangular area including the present character and the before character is equal to or smaller than 1.2 times the average character width "b-x-mean". If "YES" is determined in the step D1320, the process proceeds to the step D1321 so that the two characters are separated from each other, and if "NO", in the step D1322, the two characters are connected to each other.

Figure 43:
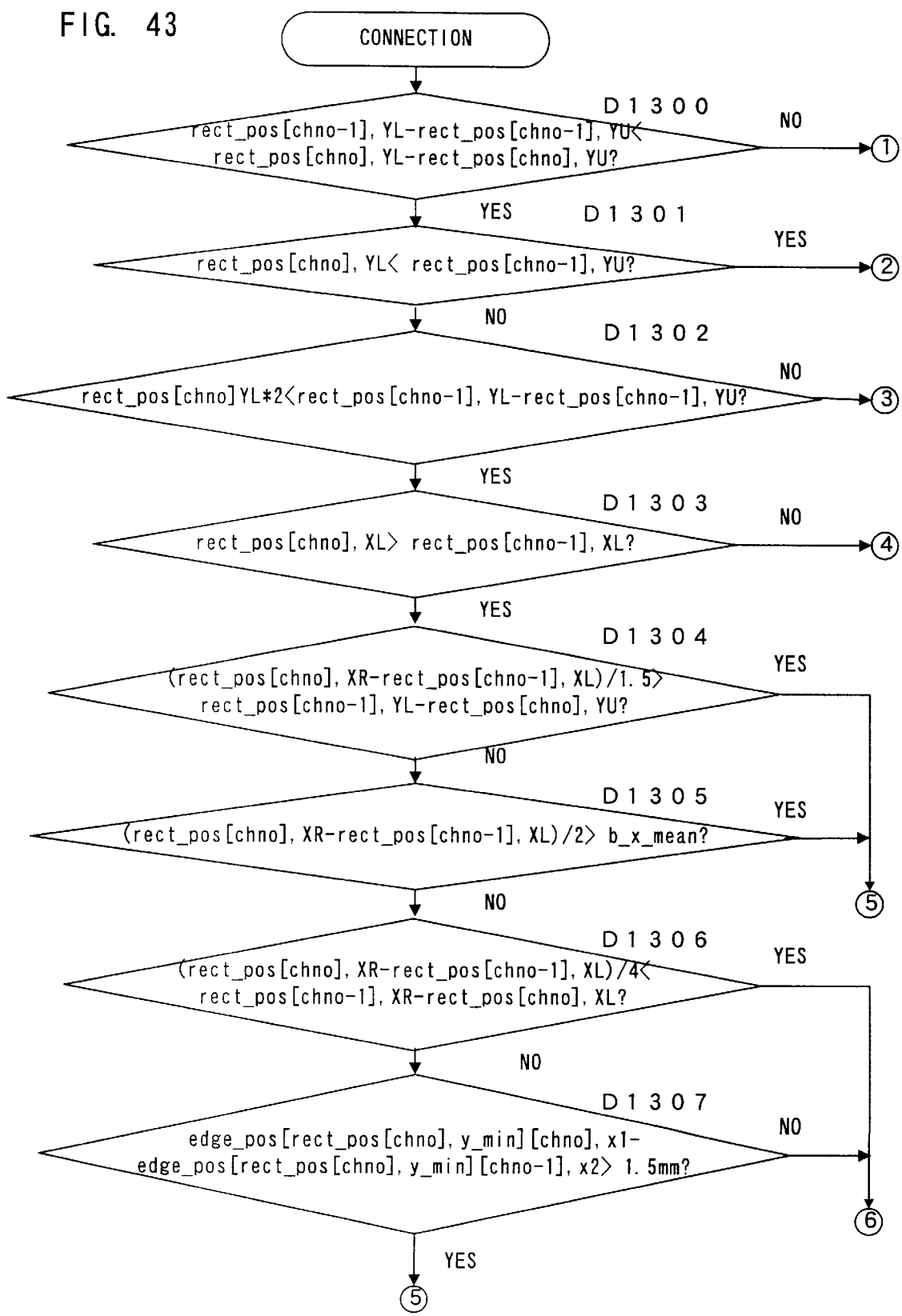
Figure 47:
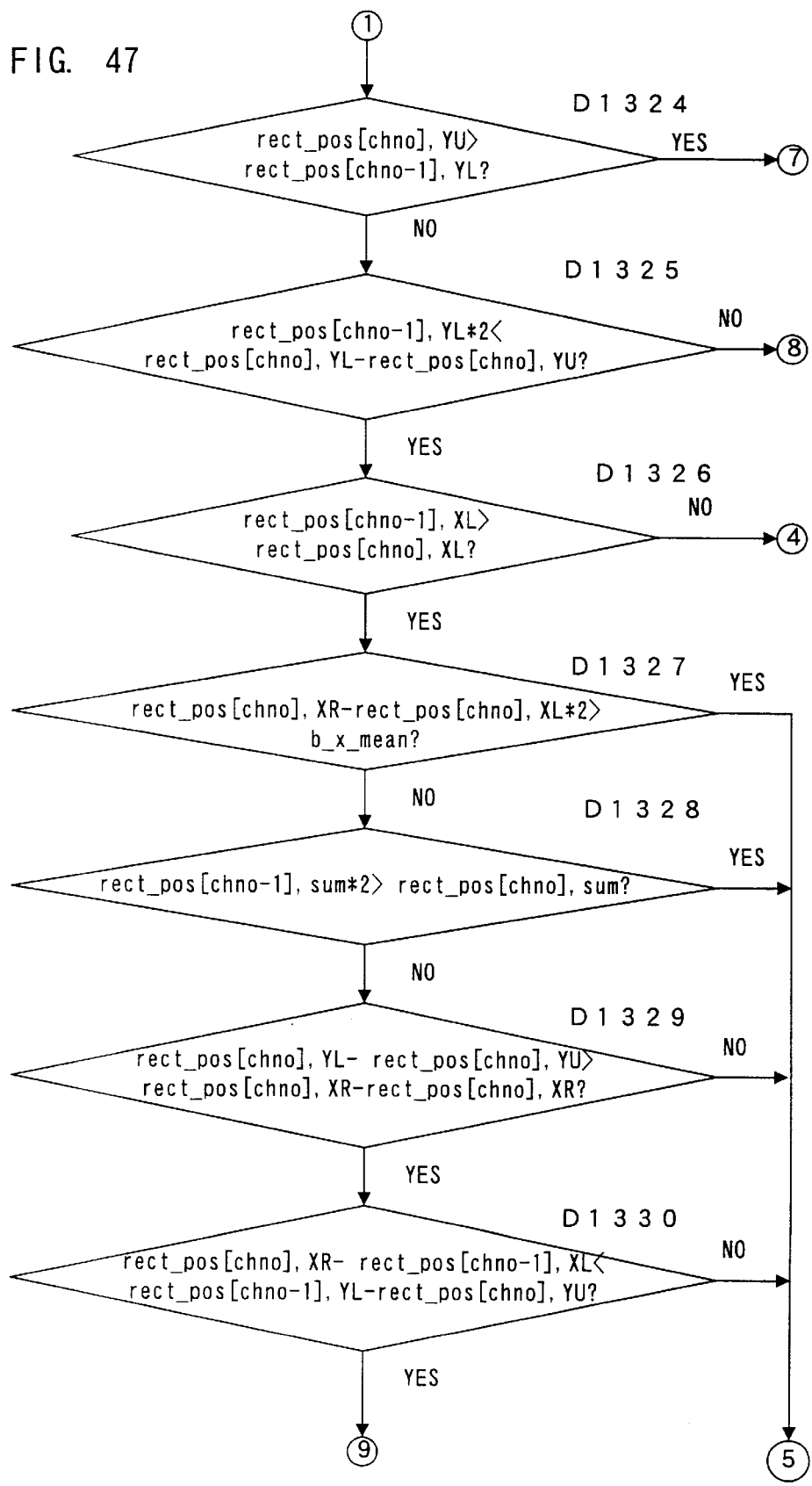

The process is transit to a step D1324 of FIG. 47 from the step D1300 of FIG. 43, and in the step D1324, it is determined whether or not the before character exists above the present character. If "YES" is determined, the process proceeds to a step D1334 of FIG. 49 (described later). If "NO" is determined, in a step D1325, it is further determined whether or not the before character exists above the present character by a half the character. When, the before character exists above the present character by a half the character or more, in a step D1326, it is determined whether or not the left end of the before character exists at left side from the left end of the present character. In a case where the before character does not exist above the present character by a half the character, the process proceeds to a step D1337 of FIG. 50. Furthermore, if "NO" is determined in the step D1326, the process proceeds to the aforementioned step D1317. If "YES" is determined in the step D1326, in a next step D1327, it is determined whether or not the X direction or horizontal width of the present character is equal to or larger than ½ of the average character length "b-x-mean". If "YES" is determined in the step D1327, the process proceeds to the previous step D1322 so as to execute the separation process. If "NO" is determined in the step D1327, in a next step D1328, it is determined whether or not the number of the dots of the before character is equal to or larger than ½ of the number of the dots of the present character. If "YES" is determined in the step D1328, the process proceeds to the step D1321 so that the both characters are separated from each other. If "NO" is determined in the step D1328, in a step D1329, it is further determined whether or not the present character is a character having the vertical or Y direction length longer than the horizontal or X direction length. If the present character does not have longer vertical length, the process proceeds to the step D1321 for executing the separation process. If the present character have the longer vertical length, in a step D1330, it is determined whether or not the circumscribed rectangular area including the present character and the before character is an area having the vertical or Y direction length longer than the horizontal or X direction length. If "YES" is determined in the step D1330, the process proceeds to a step D1331 shown in FIG. 48. Furthermore, if "NO" is determined in the step D1330, the process proceeds to the step D1321 so as to execute the separation process.

Figure 48:
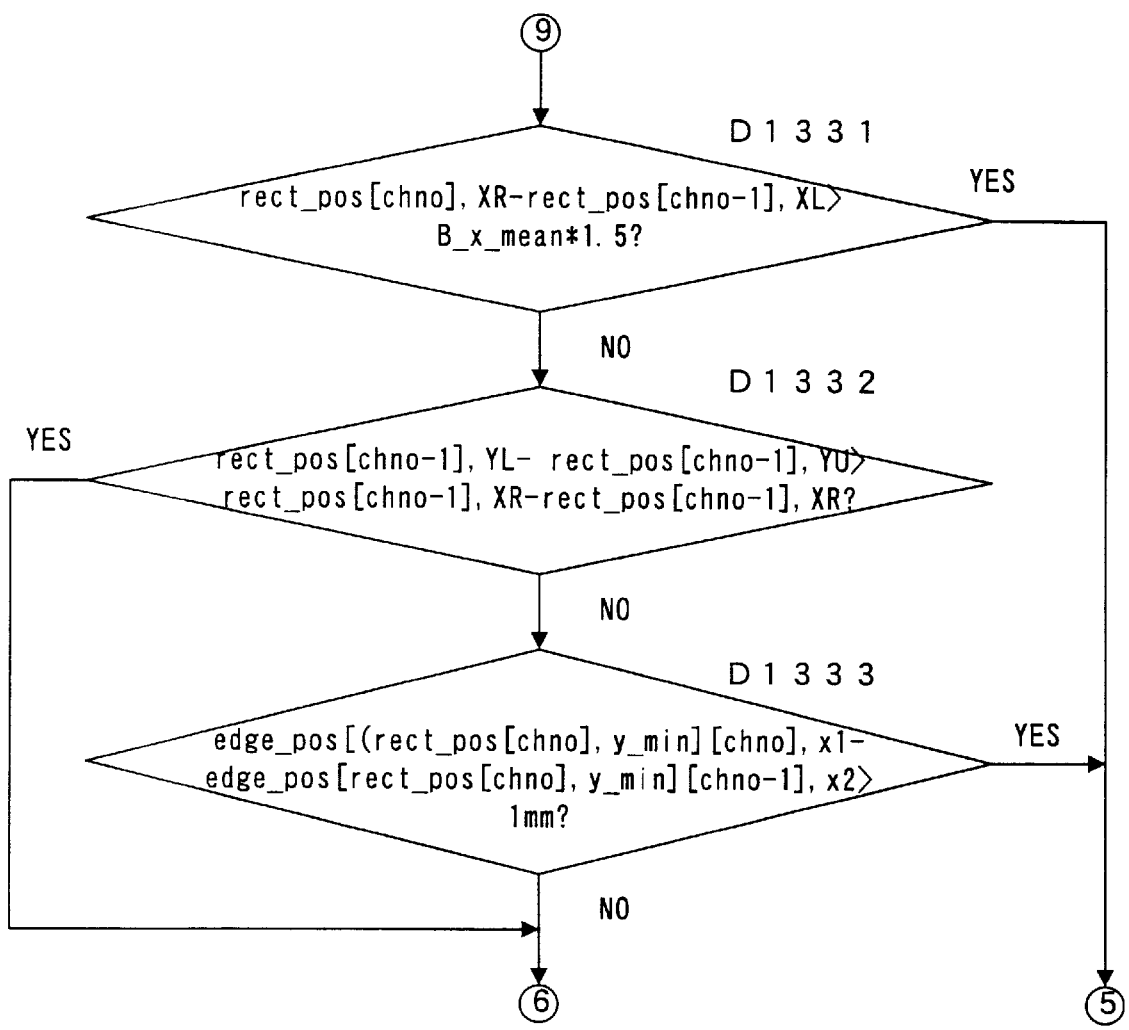

In the step D1331 of FIG. 48, it is determined whether or not the horizontal or X direction width of the circumscribed rectangular area including the present character and the before character is equal to or larger than 1.5 times the average character length "b-x-mean". If "YES" is determined in the step D1331, the separation process is performed in the step D1321. If "NO" is determined in the step D1331, it is determined whether or not the before character is a character having longer vertical or Y direction length. If "NO" is determined, in a step D1333, it is determined whether or not the X direction interval between the present character and the before character is equal to or larger than 1 mm. If "YES" is determined in the step D1333, the process process to the step D1321 for executing separation process. In a case where "NO" is determined in the step D1332 or a case where "NO" is determined in the step D1333, in order to connect the present character and the before character to each other, the process proceeds to the step D1322.

Figure 49:
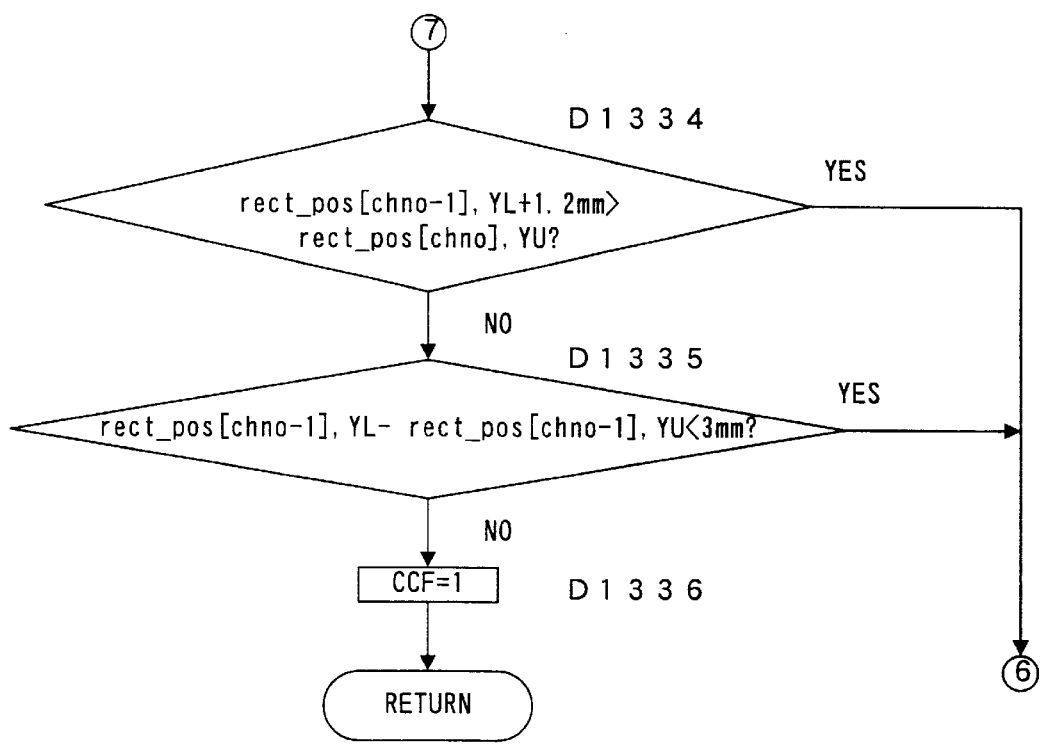

The process is jumped to a step D1334 of FIG. 49 from the step D1324, and in the step D1334, it is determined whether or not the Y or vertical direction interval between the present character and the before character is equal to or smaller than 1.2 mm. If "YES" is determined in the stop D1334, the both characters are subjected to the connection process in the step D1322. If "NO", in a step D1335, it is determined whether or not the before character is small. In a case where the before character is small, the present character and the before character are connected to each other in the step D1332. If the before character is not small, the data of the present character is discarded, and the connection flag CCF is set in a step D336, and then, the process returns to the main routine.

The process is jumped to a step D1337 of FIG. 50 from the step D1325. In the step D1337, it is determined whether or not the before character exists below the present character. If "YES" is determined, in a next step D1338, it is determined whether or not the before character exists below the present character by 1 mm or more. If "NO", in a step D1339, it is further determined whether or not the circumscribed rectangular area including the present character and the before character is an area having the horizontal or X direction length longer than the vertical or Y direction length. If "NO" is determined in the step D1339, in order to connect the present character and the before character to each other, the process proceeds to the step D1322. If "YES" is determined in the step D1338, or if "YES" is determined in the step D1339, in order to discard the data of the before character, the connection flag CCF is set in a step D1340, and therefore, the data of the before character is changed. That is, the character number is changed, and then, the process returns to the main routine.

If "NO" is determined in the step D1337, in a step D1342, the circumscribed rectangular area of the present character and the before character is an area having longer horizontal or X direction length. If "YES" is determined in the step D1342, the separation process is executed in the step D1321. If "NO" is determined, the process proceeds to the step D1317.

Thus, in the two character connection process, that is, in the step D13 of FIG. 29, on the basis of the data in the edge buffer and the circumscribed rectangular buffer for present character and the before character, the data of the edge buffer and the circumscribed rectangular buffer are modified as such manners, (1) the present character and the before character are connected to each other, (2) the present character and the before character are not connected to each other, (3) the data of the present character is discarded, or (4) the data of the before character is discarded. In addition, in a case of (1), (3) and (4), the number of the characters is not increased substantially, and therefore, in this case, "1" is set in the connection flag CCF, and in a case of (2), the connection flag CCf is set with "0".

In a step D14 of FIG. 29, a state of the connection flag CCF is determined, and if "1" is set in the connection flag CCF, the process returns to the step D7 while if "0" is set in the connection flag CCF, the process proceeds to a next step D15.

In the step D15, the character number indicative of the present character is incremented, and in a next step D16, it is determined whether or not the character number exceeds a predetermined value such as "10". If the character number exceeds the predetermined value, the process proceeds to a step D17, and if the character number does not exceed the predetermined value, the process proceeds to the step D7. In addition, the predetermined value is not limited to "10", and an arbitrary value may be set as the predetermined value. That is, in this embodiment shown, on the assumption that the superposed characters are included in each of the rough character area by "10" at maximum, "10" is set as the predetermined value, and therefore, if such an assumption is changed, the predetermined value is also changed.

In the step D17, the data of the edge buffer and the circumscribed rectangular buffer obtained through the execution of the steps D7 to D16 is transferred to a normalization and recognition portion in which the data is subjected to the normalization and the recognition process. Thereafter, the character number "chno" is set as "1" in a step D18, and in a step D19, the character number "noc" is incremented. Then, in a step D20, by comparing the character number "noc" with the character number in the character cut-out table, it is determined whether or not the trace of the superposed characters is completed. If completed, the process returns to the main routine, and otherwise, the process returns to the step D2 again.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Apparatus for processing a document having thereon hand-written information of characters of at least one of irregular position, irregular size, irregular character pitch and irregular in size of character length to width ratio, comprising:

a document reading means which scans the document and reads characters hand-written on said document and outputs image data corresponding thereto;

a line buffer which stores the image data from said document reading means as bit map data;

an image buffer which stores byte map data, said byte data being data obtained by obscuring said bit map data in said line buffer with a unit of a plurality of dots;

a histogram buffer which stores a histogram in a line direction of the image data in said line buffer;

a character width detection means which detects a character width of the hand-written character on the basis of said byte map data and said histogram;

a space width detection means which detects a space width of a space between characters on the basis of said byte map data and said histogram;

a specifying means which specifies the image data of the character to be recognized on the basis of said character width and said space between characters;

a recognition means which recognizes the character specified by said specifying means; and a means initiating a document processing operation in accordance with the result of said recognition means.

2. Apparatus according to claim 1, further comprising:

a line buffer means which stores the image data from said document reading means; and wherein said character width detection means and said space width detection means detect character width and space width respectively, on the basis of the histogram.

3. Apparatus according to claim 2, wherein said specifying means comprises:

a first specifying means which specifies a rough position of the character to be recognized in said image buffer on the basis of said character width and said space between characters;

a second specifying means which specifies a detailed position of the character to be recognized in said line buffer means on the basis of said rough position specified by said first specifying means; and wherein said recognition means recognizes the image data of the character stored in said line buffer means and specified by said second specifying means.

4. Apparatus according to claim 1 wherein said recognition means includes a cut-out means which cuts out the image data of the character.

5. Apparatus according to claim 4, wherein said cut-out means includes:

a character tracing means which respectively traces each of a plurality of characters in a superposition area wherein said plurality of characters are superposed; and a processing means which connects or separates two characters to or from each other on the basis of a trace result by said character tracing means.

6. Apparatus according to claim 5 wherein said character tracing means includes a noise process means for processing the noise of a character that is traced.

7. Apparatus according to claim 1 wherein said character width detection means includes an average character width calculation means which calculates an average value of the character width.

8. Apparatus according to claim 7 wherein said average character width calculation means includes a total character width detection means which detects a total sum of the character width of the hand-written characters existing in said image data, a character number detection means which detects the number of hand-written characters existing in said image data, and a calculation means which calculates said average character width on the basis of said total width and said number of characters.

9. Apparatus according to claim 7, further comprising a noise detection means which detects noise on the basis of the average character width.

10. Apparatus according to claim 1 further comprising a break detection means which detects a break between data of a series of hand-written characters to be recognized and other data, on the basis of said space width of said space between characters of the series.

11. Apparatus according to claim 1, further comprising average space width detection means which detects an average space width of the spaces included in said image data; and a means for determining whether or not adjacent characters are to be separated from or coupled to each other on the basis of said average space width.

12. Apparatus according to claim 1, wherein the apparatus is a facsimile apparatus.

13. Apparatus for processing a document having thereon hand-written information of characters of at least one of irregular position, irregular size, irregular character pitch and irregular in size of character length to width ratio, comprising:

a document reading means which scans the document and reads characters hand-written on said document and outputs image data corresponding thereto;

an image buffer which stores the image data from said document reading means;

a character width detection means which detects a character width of the hand-written character on the basis of the image data stored in said image buffer;

a space width detection means which detects a space width of a space between characters on the basis of the image data stored in said image buffer;

a specifying means which specifies from the image data the character width and said space width between characters;

a recognition means which recognizes the image data of the character specified by said specifying means;

means initiating a document processing operation in accordance with the result of said recognition means wherein said recognition means includes a cut-out means which cuts out the image data of the character; and wherein said cut-out means includes cut-out condition setting means which sets a cut-out condition on the basis of said character width and said space between characters, and detection means which respectively detects a character break, a punctuation and an edge of a sheet on which said hand-written characters are written according to said cut-out condition.

14. Apparatus according to claim 13, wherein said cut-out means includes a second cut-out condition setting means which sets a cut-out condition on the basis of said character width and said space between characters, and a second detection means which detects positions of a blank and the hand-written character according to said cut-out condition.

15. Apparatus for processing a document having thereon hand-written information of characters of at least one of irregular position, irregular size, irregular character pitch and irregular in size of character length to width ratio, comprising:

a document reading means which scans the document and reads characters hand-written on said document and outputs image data corresponding thereto;

an image buffer which stores the image data from said document reading means;

a character width detection means which detects a character width of the hand-written character on the basis of the image data stored in said image buffer;

a space width detection means which detects a space width of a space between characters on the basis of the image data stored in said image buffer;

a specifying means which specifies from the image data the character width and said space width between characters;

a recognition means which recognizes the image data of the character specified by said specifying means;

a means initiating a document processing operation in accordance with the result of said recognition means wherein said recognition means includes a cut-out means which cuts out the image data of the character;

wherein said cut-of means includes:

a character tracing means which respectively traces each of a plurality of characters in a superposition area wherein said plurality of characters are superposed; and a processing means which connects or separates two characters to or from each other on the basis of a trace result by said character tracing means; and wherein said character tracing means includes a means for producing obscuration data and an obscuration buffer in which said image data is obscured with obscuration data in the form of a unit of a plurality of dots, and the character is traced on the basis of data in said obscuration buffer.

16. Apparatus according to claim 15, wherein said character tracing means includes a superposition detection means which detects a superposition of line segments in said obscuration buffer, and the character is traced on the basis of th superposition of the line segments detected by said superposition detection means.

17. Apparatus according to claim 16, wherein said character tracing means includes an external form detection means for evaluating an external form of the character by tracing the superposition of all the line segments.

18. Apparatus according to claim 17, wherein said external form detection means includes a slice buffer which stores the superposition of said line segments while the line segments are associated with each other.

* * * * *